(12) United States Patent
Salvesen et al.

(10) Patent No.: US 10,852,394 B2
(45) Date of Patent: Dec. 1, 2020

(54) HIGH SPEED RADAR TEST SYSTEM PROCESSING AND LOGIC

(71) Applicant: Eastern OptX, Inc., Morrestown, NJ (US)

(72) Inventors: Howard Salvesen, Monroe Township, NJ (US); Edward J. MacMullen, New Egypt, NJ (US); Joseph Mazzochette, Cherry Hill, NJ (US); Jerome Lomurno, Moorestown, NJ (US)

(73) Assignee: Eastern OptX, Inc., Morrestown, NJ (US)

( * ) Notice: Subject to any disclaimer, the term of this patent is extended or adjusted under 35 U.S.C. 154(b) by 305 days.

(21) Appl. No.: 16/046,330

(22) Filed: Jul. 26, 2018

(65) Prior Publication Data
US 2019/0041496 A1 Feb. 7, 2019

Related U.S. Application Data

(60) Provisional application No. 62/540,768, filed on Aug. 3, 2017.

(51) Int. Cl.
*G01S 7/40* (2006.01)
*G01S 7/285* (2006.01)

(52) U.S. Cl.
CPC ............ *G01S 7/4052* (2013.01); *G01S 7/285* (2013.01); *G01S 2007/4065* (2013.01)

(58) Field of Classification Search
CPC ............ G01S 7/4052; G01S 2007/406; G01S 2007/4065; G01S 2007/4069
See application file for complete search history.

(56) References Cited

U.S. PATENT DOCUMENTS 3,745,579 A * 7/1973 Lott .......................... G01S 7/40
342/171
3,906,500 A 9/1975 Redman
(Continued)

OTHER PUBLICATIONS

Abou-Jaoude, R. et al., "Low Cost 76GHz Radar Target Simulator and Test System," http://ieeexplore.ieee.org/document/4139860/?reload=true, Anritsu Company, Microwave Measurements Division, first published in 2000 30th European Microwave Conference, Paris, France, 4 pages, Oct. 2-5, 2000.
(Continued)

*Primary Examiner* — Peter M Bythrow
(74) *Attorney, Agent, or Firm* — Lowenstein Sandler LLP

(57) ABSTRACT

A radar test computing system includes a host interface coupled to a programmable input/output (I/O) controller, which is to interface with propagation path replicator (PPR) circuitry. A processing device is to detect a start signal received from the controller; receive an update request from the controller in response to detection, by the PPR circuitry, of a first radio RF pulse on a RF signal received from the radar system; retrieve scenario data of distance to and speed of the moving target for a second RF pulse expected to follow the first RF pulse; calculate, using retrieved scenario data, values of a frequency shift, a signal delay, and a signal attenuation for the second RF pulse; and send, during a time period between the first and second RF pulses, these values to the controller for use by the PPR circuitry to simulate the moving target for the second RF pulse.

25 Claims, 32 Drawing Sheets

(56) References Cited

U.S. PATENT DOCUMENTS

| | | | | |
|---|---|---|---|---|
| 3,935,573 | A | * | 1/1976 | Johnson ................ G01S 7/4021 342/171 |
| 4,319,247 | A | * | 3/1982 | Warren ..................... G01S 7/40 342/171 |
| 4,499,469 | A | | 2/1985 | Kesterson |
| 4,523,196 | A | | 6/1985 | Gieraths |
| 4,661,818 | A | * | 4/1987 | Riffiod .................. G01S 7/4056 342/172 |
| 4,730,191 | A | | 3/1988 | Groebke |
| 4,737,792 | A | | 4/1988 | Grone |
| 4,944,679 | A | | 7/1990 | Allen et al. |
| 4,982,196 | A | | 1/1991 | Thomas et al. |
| 5,117,230 | A | | 5/1992 | Wedel, Jr. |
| 5,138,325 | A | | 8/1992 | Koury |
| 5,177,488 | A | * | 1/1993 | Wang ..................... G01S 7/4052 250/227.12 |
| 5,431,568 | A | * | 7/1995 | Fey ....................... G01S 7/4052 342/169 |
| 5,457,463 | A | * | 10/1995 | Vencel ................... G01S 7/4052 342/169 |
| 5,528,522 | A | * | 6/1996 | Delguercio .......... G01S 7/4052 703/13 |
| 5,886,663 | A | | 3/1999 | Broxon, II et al. |
| 5,892,479 | A | * | 4/1999 | Mills ..................... G01S 7/4052 342/169 |
| 6,067,041 | A | * | 5/2000 | Kaiser ................... G01S 7/4052 342/171 |
| 6,075,480 | A | * | 6/2000 | Deliberis, Jr. ........ G01S 7/4052 342/169 |
| 6,150,976 | A | | 11/2000 | Cooley |
| 6,384,771 | B1 | * | 5/2002 | Montague ............. G01S 7/4052 342/165 |
| 6,496,139 | B1 | * | 12/2002 | Flacke ................. G01S 7/4052 342/165 |
| 6,710,737 | B1 | | 3/2004 | Cronyn |
| 6,803,877 | B2 | | 10/2004 | Ludewig et al. |
| 7,145,504 | B1 | | 12/2006 | Newberg et al. |
| 7,365,677 | B2 | | 4/2008 | Tsunoda |
| 8,026,844 | B2 | | 9/2011 | Fox et al. |
| 8,334,803 | B1 | | 12/2012 | Urkowitz |
| 9,151,828 | B2 | | 10/2015 | Shipley |
| 9,581,683 | B2 | * | 2/2017 | Choi ..................... G01S 7/4056 |
| 9,689,969 | B2 | * | 6/2017 | Lewis ................... G01S 7/4052 |
| 10,509,107 | B2 | * | 12/2019 | Heuel ................... G01S 7/4052 |
| 10,527,715 | B2 | * | 1/2020 | Ahmed ................. G01S 7/4052 |
| 2014/0152490 | A1 | | 6/2014 | Lehning |
| 2015/0219752 | A1 | * | 8/2015 | Lewis ................... G01S 7/4052 342/104 |
| 2017/0146638 | A1 | | 5/2017 | Aoyama et al. |

OTHER PUBLICATIONS

Anritsu, "Radar Testing with Simulation Signals" available online at https//www.testworld.com/wp-content/uploads/radar-testing-with-simulation-signals.pdf, Anritsu Part No. 11410-00752 Revision A, 32 pages, printed Nov. 2013.

Ergezer H. et al., "Real-Time Radar, Target, and Environment Simulator," https://link.springer.com/chapter/10.1007/978-3-319-26470-7_11, retrieved on Jun. 5, 2017, 4 pages, Jan. 15, 2016.

Mazzochette, Joseph "Doppler Generation for Moving Target Testing" https://www.wirelessdesignmag.com/arteicle/2013/12/doppler-generation-moving-target-testing, 7 pages, Dec. 18, 2013.

"Model 1107 Radar Target Simulator Bringing the Test Range to Your Test Bench," https://webcache.googleusercontent.com/search?q=cache:B7dRDiyZpqUJ;https://www.eastern-optx.com/sites/eastern_optxtiles/product/data-sheet/DS-0024%2520Model%25201107%2520Radar%, 12 pages, retreived on Jun. 5, 2017.

"Real World Dynamic Radar Testing in the Lab," Microwave Journal, www.microwavejournal.com/blogs/19-joe-mazzochette-easternoptx/post/27200-real-world-dynamic-radar-testing-in-the-lab, 7 pages, Sep. 28, 2016.

Sylvain, G. et al., "Multifunction Radar Simulator (MFRSIM)" available online at http://cradpdf.drdc-rddc.gc.ca/PDFS/unc03/p518679.pdf, Defence Research and Development Canada—Ottawa, Technical Memorandum DRDC Ottawa TM2002-165, 55 pages, Dec. 2002.

Thomas, "Doppler Radar System Offers Moving Target Simulation," available online at https://dialog.proquest.com/professional/printviewfile?accountid=157282, 3 pages, Sep. 23, 2013.

\* cited by examiner

[HEADER]    894

PW_s = 5.000000m
PulseWindow_s = 1.000000m
PRI_s = 100.000000m
PulseTimeout_s = 120.000000m
TrigDelay_s = 0.000000
PrePulseUpdateRate_s = 100.000000m
StartPulseWidth_s = 170.000000m
StartPulseWindow_s = 5.000000m
StartPulseRefLevel_dBm = 0.000000
StartPUlseTrigLevel_dBm = -50.000000
CenterFreq_Hz = 9.99900G

FIG. 8F

[SCENARIO SUMMARY]    896

Arm Time = 2018-01-23T12:35:08
Start Time = 2018-01-23T12:36:01
Stop Time = 2018-01-23T12:36:41
Final Status = Complete
Elapsed Time_s = 40.000
Pre-Pulse Updates = 55
Pulse Count = 343
Missing Pulses = 2
Last PW_s = 3.96190E-3
Mean PW_s = 3.99984E-3
StdDev PW_s = 35.9727E-6
Last PRI_s = 99.9414E-3
Mean PRI_s = 99.9997E-3
StdDev PRI_S = 48.5074E-6

FIG. 8G

HIGH SPEED RADAR TEST SYSTEM PROCESSING AND LOGIC

CROSS-REFERENCE TO RELATED APPLICATIONS

This application claims the benefit of U.S. Provisional Patent Application No. 62/540,768, filed Aug. 3, 2017. This application is related to and filed concurrently with U.S. patent application Ser. No. 16/046,096, filed Jul. 26, 2018, entitled "High Speed Radar Test System." The disclosure of each of these applications is incorporated herein by these references in their entirety.

BACKGROUND

As radar systems become more complicated and capable, test system designers have been challenged to keep up, particularly with high speed applications such as in test flight scenarios at multiple times the speed of sound. Designers seek a rapid and convenient test system in order to optimize the radar system design and perform a preliminary qualification prior to expensive and time-consuming field trials.

The need for rapid, pulsed radar testing is currently filled in part by using system emulators. An emulator produces an output that is based on a pre-programmed emulator response, the input signal, and selected emulator setting (distance, environment, other transceivers, etc.). The difficulty with emulators is that emulators require information about the system under test in order to produce the correct output. This causes several problems. First, a new emulator must often be produced for each new modulation scheme type, e.g., device under test (DUT). Second, the emulator may introduce errors that produce false positives or negatives for the performance of the DUT, due to the information fed to the emulator. Finally, the emulator does not replicate the communication environment; as a result, the interaction between multiple signals at different distances and power levels may produce erroneous emulator output.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 8F illustrates an example header of a message or code word between the computing system and either of the signal analyzer circuit or the programmable I/O controller of the radar test system of FIG. 2A, according to one embodiment.

FIG. 8G illustrates an example scenario summary file that may be written to a log file in response to completion (stop or end) of a test scenario, according to various embodiments.

DETAILED DESCRIPTION

Figure 1:
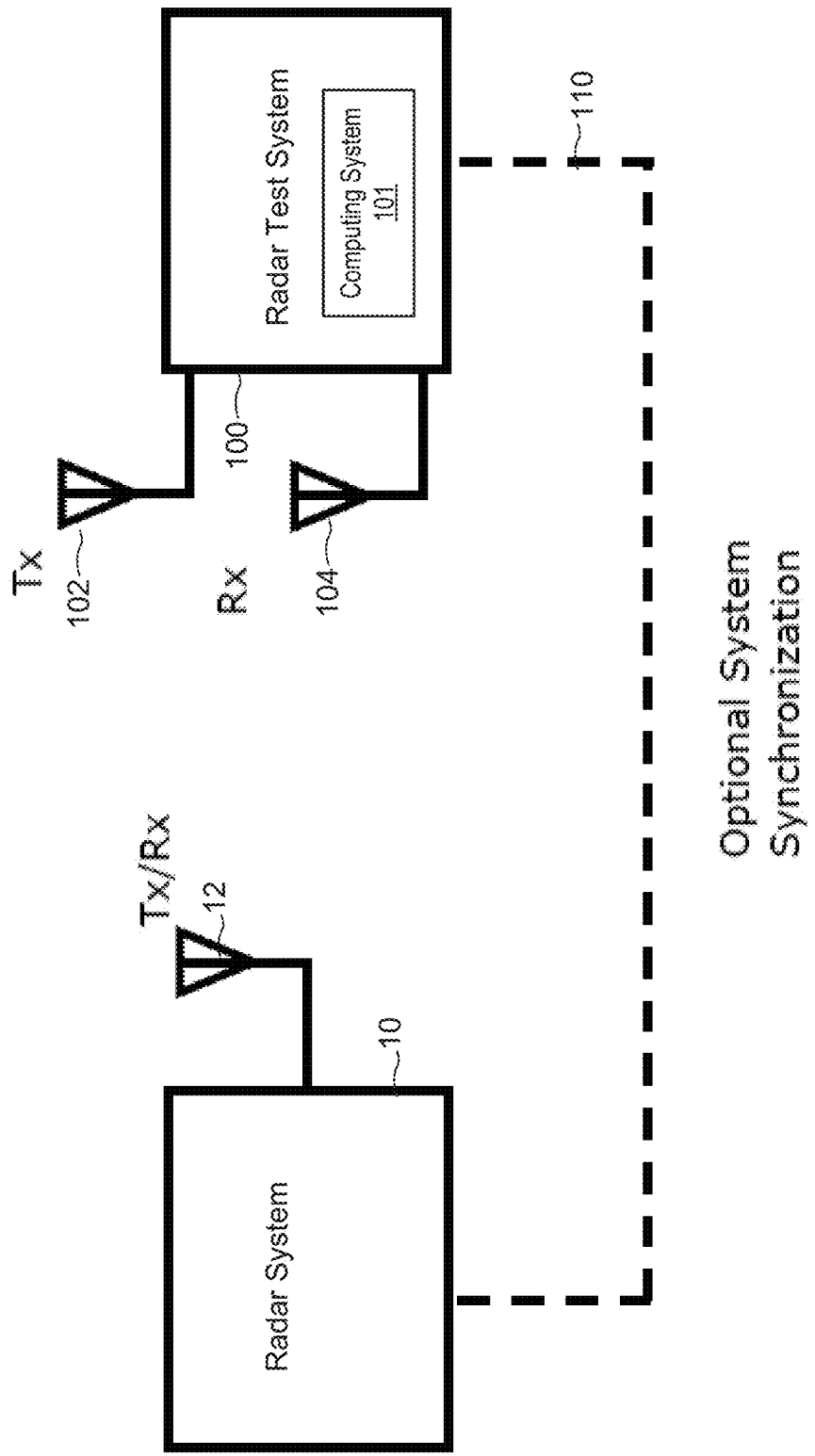
FIG. 1 is a block diagram of an exemplary high speed radar test system (e.g., "radar test system"), according to embodiments of the present disclosure.

Embodiments of the present disclosure employ an exemplary high speed radar test system (e.g., "radar test system") which may be used to test a variety of radar systems with particular attention to systems that employ pulsed signal waveforms. The disclosed radar test system may be a small, compact, laboratory or repeater site instrument, which simulates a radar target including distance, motion, propagation loss, target reflection characteristics, and clutter. The radar target may be an airplane, a missile, or other fast-moving target that may pose a threat. Advantages of this radar test system include reduced test costs and test time, radar system optimization, eliminate the need to radiate in order to test, and provide a controlled and repeatable test target. Compared to existing radar test solutions, the disclosed radar test system exhibits significant advantages in speed that can be detected, real-world world target generation, end-to-end radar system testing including RF antenna sections, high dynamic range, low phase noise, and the ability to execute prescribed target scenarios rapidly with transitions synchronized between the radar system's radio frequency (RF) pulses. In some embodiments, the latter feature may require no connection to the radar system being tested by triggering off the detected radar signal received from the radar system.

Certain embodiments of the radar test system replace a conventional radar test system emulator with a propagation path replicator (PPR). A PPR reproduces the propagation path associated with a particular radar system environment in terms of frequency range, frequency response, delay, propagation loss, multipath signals, interferers, weather, multiple transceivers, and other conditions characteristic of the path between the radar system and a moving target. In addition, a PPR may be compact so that it may be used in a laboratory setting. The cost of the PPR may also be low relative to the expense of time-consuming field trials.

In the disclosed embodiments, the high speed radar test system may perform deterministically in terms of producing real-time data as feedback to pulse-by-pulse scenarios that are provided either by a pre-programmed script, or by manual input at a user interface. The radar test system may use fiber optic transmission lines (FOTL) as an excellent means by which to produce delay for the PPR, which simulates distance from the target. The FOTL may be low loss, allow for a wide range of multiple delays (including down to nearly zero and as high as 600 microseconds), and is available at low cost compared to cost of coaxial cable (or the like) that would simulate similar delays. The distance of simulation corresponding to these delays may be between zero and approximately 200 kilometers, with a target distance resolution of 100 meters, and thus have a far range and accuracy of detection testing. The speeds of simulation for the target may range up to multiple times the speed of sound, e.g., up to 5,000 miles per hour or what is otherwise known in the industry as hypersonic. Furthermore, propagation loses to be simulated (e.g., based on an amount of atmospheric propagation losses) may be corrected based on a delay or distance being simulated, and thus makes the propagation loss simulation more accurate. By producing these types of simulation capabilities, and by making updates to values being simulated within the circuitry between incoming RF pulses, the fastest moving targets of threat today may be replicated for radar system detection testing.

In some embodiments, missiles to be tested include significant circuitry to interface with a conventional radar test systems to enable testing. The present radar test system may, however, eliminate that circuitry, saving weight (and thus giving the missiles longer range) and cost to manufacture the missiles. There are other advantages in time and monetary resources in not having to launch missiles or aircraft to perform field tests that may be eliminated by the present high speed test system, which may perform tests on high speed targets in the laboratory.

In one embodiment, a radar test system is to simulate a moving target for a radar system under test. The radar test system may include a Doppler simulation circuit coupled to an input, the Doppler simulation circuit to apply a frequency shift to radio frequency (RF) pulses received on an RF signal generated by the radar system. The frequency shift may be to simulate speed of a moving target up to multiple times the speed of sound. A signal delay sub-system may be coupled to the Doppler simulation circuit, the signal delay sub-system to produce a delay in the RF pulses to simulate distance to the moving target. A signal attenuator may be coupled to the signal delay sub-system and to the programmable input/output (I/O) controller, the signal attenuator to simulate signal attenuation due to propagation loss of the RF pulses. A pulse detection circuit may be coupled to the input, the pulse detection circuit to detect time of receipt of each of the RF pulses, including a first time of receipt of a trailing edge of a first RF pulse of the RF pulses. A programmable I/O controller may be coupled to the Doppler simulation circuit, to the signal delay sub-system, to the signal attenuator, and to the pulse detection circuit.

The programmable I/O controller may update a value of the frequency shift for the Doppler simulation circuit, of the signal attenuation for the signal attenuator, and of the delay for the signal delay sub-system during a time period between the first RF pulse and one of a second RF pulse or a second time at which the second RF pulse should have been received in case of a missing pulse. Both detected pulses and missing pulses may thus be detected, recorded, and reported. The timing of a timeout period may be based on either a new trailing edge of a received pulse or that of a missing pulse, so that updates to the parameter values of the simulation circuitry may continue to be updated between pulses or between moments in time when pulses are anticipated. This may allow a scenario to stay on track and for tracking of missing pulses to continue through multiple timeout periods before a new pulse is received, the scenario ends, or the scenario is stopped.

FIG. 1 is a circuit block diagram of an exemplary high speed radar test system 100 (e.g., radar test system 100) according to an embodiment of the present disclosure. The radar test system 100 may interface with a radar system 10 that is under test, where the radar system 10 includes a transceiver 12 and an antenna. The radar test system 100 may include a computing system 101, a transmitter 102, and a receiver 104 with which to test radar signals being radiated by the radar system 10.

Alternatively, and preferably if the radar system 10 is to be tested in a lab environment, the radar test system 100 may also be connected via a cable 110 (such as a radio frequency (RF) cable), directly to the radar system 10, thus obviating the need of the radar test system 100 to receive radiation from the radar system 10 or to radiate back to the radar system 10, in response to radiated signals. Accordingly, a user may disconnect the antenna of the radar system 10 and instead connect the RF cable 110 directly to the radar test system 100. The user may also connect the receiver portion of the transceiver 12 of the radar system 10 into an output of the test system (which may also be represented by RF cable 110).

In various embodiments, the test system 100 is designed specifically for pulsed radar systems, in which the position and speed of a target to be detected is updated in between RF input pulses. The radar signals being tested are usually between 1 and 18 GHz, although the test system 100 may handle up to 40 GHz. The radar test system 100 is to simulate the target for purposes of gathering detection capability by the radar system 10 in three main ways, including: (1) position (longitude, latitude, and altitude) from which distance from the target may be determined; (2) speed (which can be at multi-sonic targets, e.g., moving at up to three to four times the speed of sound or faster); and (3) propagation loss (which may depend in part on the distance from the target and the position). In lieu of emulating the target, the radar test system 100 may include a propagation path replicator (PPR) to closely replicate the path between the radar system 10 and the target.

Figure 2A:
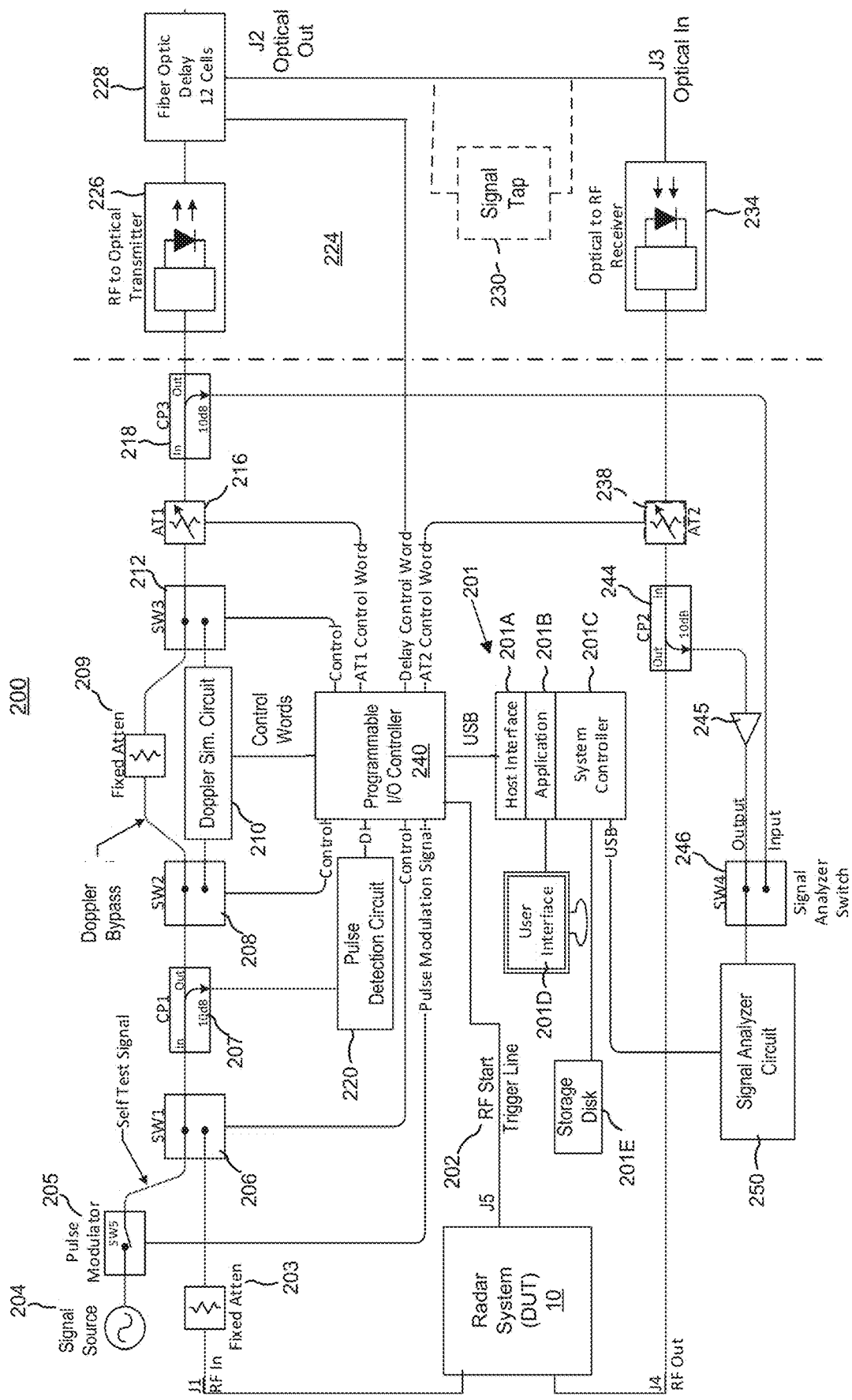
FIG. 2A is a circuit block diagram of a high speed radar test system (e.g., "radar test system"), according to another embodiment of the present disclosure.

FIG. 2A is a circuit block diagram of a high speed radar test system (e.g., radar test system 200), according to another embodiment. In one embodiment, the radar test system 200 is the same as the radar test system 100 of FIG. 1. The radar test system 200 may reproduce the propagation path associated with a particular radar communication system environment in terms of frequency range, frequency response, delay, propagation loss, multipath, interferers, weather, multiple transceivers, and other conditions characteristic of the radar path.

In various embodiments, the radar test system 200 includes a computing system 201 to provide various user, hardware, and software interfaces and functionalities, and that includes a processing device to execute software in support of the radar tests. The radar test system 200 also includes PPR circuitry made up of a number of PPR components to be inserted in or out of an RF signal path between an RF input (J1) and an RF output (J4) that couple to the radar system 10 (DUT), e.g., between an output and a return signal input of the radar system 10. The radar test system 200 also includes a programmable I/O controller 240 to provide I/O control functionality between the computing system 201 and the PPR circuitry, and a signal analyzer circuit 250 that may provide start pulse detection in addition to swept spectrum analysis to incoming RF signals from the radar system 10.

In one embodiment, the computing system 201 includes a host interface 201A, an application 201B, a system controller 201C, a user interface 201D, and a storage disk 201E. The host interface 201A may provide a hardware I/O interface to the programmable I/O controller 240. In one embodiment, the system controller 201C is a Core-i7 Intel® NUC running Windows 10 Professional by Microsoft®. The system controller 201C may run the application 201B, which in one embodiment is a Delay Line Application and may communicate with the programmable I/O controller 240 and the signal analyzer circuit 250 via a Universal Serial Bus (USB) cable, although other types of connectors are envisioned. The storage disk 201E may provide computer storage for the application 201B, scenario data associated with stored scenarios, and results data associated with results of test scenarios already executed by the radar test system 200.

In different embodiments, the programmable I/O controller 240 may be a programmable logic controller, a field programmable gate array (FPGA) component or device, an application specific integrated circuit (ASIC), or other specialized programmable logic device, including a system-on-a-chip (SoC) or controller I/O board. In one embodiment, the programmable I/O controller 240 is a National Instruments USB-7856R Original Equipment Manufacturer (OEM) board. The custom firmware that the programmable I/O controller 240 executes may provide the capability for deterministic measurement and application of status and control signals, as will be explained in more detail.

In various embodiments, the PPR circuitry may include an RF start trigger line 202 coupled directly to the programmable I/O controller 240, which may provide a start pulse to trigger, within the I/O controller 240, the start of a test scenario. The PPR circuitry may further include a first fixed attenuator 203 coupled to the RF input (J1), a signal source 204 coupled to a pulse modulator 205, and a first switch 206 to select between the RF signal from the radar system 10 (from the first fixed attenuator 203) or from the signal source 204 used for testing. The first fixed attenuator 203 may generate an attenuated radio frequency (RF) signal that is capable of conversion to an optical signal. The first switch 206 may be an electromechanical switch in one embodiment, and may be configured select the test RF pulses in lieu of the attenuated RF signal in response to a pulse modulation signal from the programmable I/O controller 240.

The pulse modulator 205 may modulate the signal from the signal source 204 to generate pulses like those that may be received from an actual radar system in order to perform system tests on the radar test system 200. In one embodiment, the signal source 204 is a 10 GHz dielectric resonator oscillator (DRO), which is capable of generating a high-frequency RF signal. The signal source 204 and the pulse modulator 205 (which may be a pin modulator) may also provide randomized, Gaussian noise to the pulse width, to see how well the radar test system 200 may still detect the pulse despite the noise. The programmable I/O controller may control the pulse modulator 205 to generate test RF pulses, to miss pulses during testing, and to ensure the radar test system 200 can detect the missing pulses. The testing may also enable testing the Doppler simulation circuit, delay, and attenuators, which will be discussed shortly.

In embodiments, the PPR circuitry further include a first coupler 207 coupled to the first switch 206, to a pulse detection circuit 220, and to a second switch 208. The first coupler 207 may be a directional coupler with coupled port routed to the pulse detection circuit 220. The through signal at the output of the first coupler 207 may continue to the common port of the second switch 208. The first coupler 207 may allow the sampling of the incoming RF signal for the pulse detection circuit 220 to detect incoming RF pulses on the RF signal on behalf of the programmable I/O controller. The pulse detection circuit 220 is coupled to the programmable I/O controller 240 from which it receives a threshold reference voltage for use in detecting qualified RF pulses, which will be discussed with reference to FIG. 2B.

In embodiments, the PPR circuitry further include a second fixed attenuator 209 on a Doppler bypass, a Doppler simulation circuit 210, and a third switch 212. The second switch 208 and the third switch 212 may both also be electromechanical switches in one embodiment. The second switch 208 may work in conjunction with the third switch 212 to switch the Doppler simulation circuit 210 in or out of the main path RF signal path, where if switched out, the RF signal will pass through the second fixed attenuator 209 in response to a Doppler bypass signal from the programmable I/O controller 240. As mentioned, the Doppler simulation circuit 210 may receive values for a frequency shift before each pulse to be simulated (e.g., via the control words from the programmable I/O controller 240), to simulate speed of a moving target for which the radar system 10 is being tested. The Doppler bypass may allow a user to selectively remove Doppler simulation from a given scenario or script.

In various embodiments, the Doppler simulation may be accomplished by continuous phase rotation of the RF signal. An electronic phase shifter, which is highly optimized for carrier and sideband rejection, may be employed. The phase shifter may have a range of 360° and be controlled by an 8-bit digital word (256 states) and latching bit. The frequency offset produced is equal to the number of 360° rotations per second. The firmware of the programmable I/O controller 240 may sends word to the phase shifter in the correct sequence and rate to produce the desired Doppler frequency. The firmware may perform a clock dithering algorithm to increase the average frequency accuracy over what can be achieved with straight clock division.

In embodiments, the PPR circuitry further include a first signal attenuator 216 (AT1) coupled between the third switch and a second coupler 218. The first signal attenuator 216 may be a pin diode attenuator to simulate path loss. The first signal attenuator 216 may receive a value associated with additional signal attenuation in a (AT1) control word from the programmable I/O controller 240, which variably sets the amplitude of the signal attenuation for a pulse before the pulse is received. The signal attenuation may be a combination of isotropic loss and gain loss. The isotropic loss may simulate atmospheric attenuation, which in one embodiment, depends on the location of the target and thus the path between the radar system and the target. The farther away the target, the more atmosphere exists through which the RF signal passes and during which the RF signal is spreading out on a spherical plane (e.g., over the contour of the earth). Whenever there is a change in delay (through the fiber optics), there is a corresponding change in loss, so the radar test system 200 is to account for this change in loss through additional amplitude modification to the signal attenuation of the first signal attenuator 216. The computing device 201, within the application 201B, may generate vectors that simulate phased-based isotropic loss and distance.

With continued reference to FIG. 2A, the second coupler 218 may be a directional coupler with coupled port routed to the signal analyzer circuit 250 via a fourth switch 246. The main signal may continue from the output port of second coupler 218 to a signal delay sub-system 224, which is another PPR component of the radar test system 200. The second coupler 218 may sample the RF signal exiting the first signal attenuator 216, which allows the sampled RF signal to be analyzed with the spectrum analyzer portion of the signal analyzer circuit 250. In one embodiment, signal analyzer circuit 250 is a Signal Hound USB-SA124B, which may be embedded within the radar test system 200 and controlled by the Delay Line Application (e.g., the application 201B) or the manufacturers software interface, Spike.exe. The Spike.exe program, however, may crash if run over Remote Desktop, and thus in the present system, the proprietary application 201B may perform more reliability for disclosed purposes, which will be explained in more detail.

The basic specifications of the Signal Hound include:
RF Frequency Range: 100 kHz to 12.4 GHz
Wide dynamic range: −151 dBm to +10 dBm
Resolution bandwidths (RBW) of 0.1 Hz to 250 KHz and 6 MHz
0 dBm to −125 dBm, 100 kHz to 1 GHz
0 dBm to −115 dBm, 1 GHz to 4 GHz
I/Q Data up to a 240 KHz bandwidth
Frequency Sweeps up to 140 MHz per second
USB 2.0 communications at 480 MBPS
8 inches long, Weight 12 ounces The signal analyzer circuit 250 may use a double buffered architecture that allows for continuous, gapless streaming and analysis of in-phase quadrature (IQ) data. This feature makes it particularly well suited for low latency, criteria-based event detection. Furthermore, the high dynamic range allows the signal analyzer circuit 250 to detect a very small amplitude pulse in addition to larger amplitude pulses. The signal analyzer circuit 250 may continuously sample indefinitely without missing a sample and without any dead time. This allows the signal analyzer circuit 250 to detect just about any pulse pre-programmed (e.g., through the computing system 201) to be a Start Pulse, which may trigger initiation of a test scenario. In this way, the signal analyzer circuit 250 is programmed to detect the Start Pulse on the RF signal coming from the signal delay sub-system 224.

In various embodiments, the signal delay sub-system 224 is coupled between the second coupler 218 and a second signal attenuator 238 (AT2). In various embodiments, the signal delay sub-system 224 is to produce a delay in the RF pulses to simulate distance to the moving target. The signal delay sub-system 224 may include an RF-to-optical transmitter 226 to convert the RF signal to an optical signal, multiple fiber optic delay cells 228 (each of which may include a fiber optic spool of different length) that are each selectively switchable into a path of the optical signal, and an optical-to-RF receiver 234 to convert the optical signal, after delay, to an updated RF signal. The RF-to-optical transmitter 226 may modulate the incoming RF signal onto an optical carrier (e.g., optical signal) with use of a laser. The wavelength of the laser signal may be in the range of 1,000 to 2,000 nm, and thus the RF signal would be modulated at a much higher frequency to generate the optical signal. Respective ones of the multiple fiber delay cells 228 are combinable to generate a number of delays for a corresponding number of simulated distances, as will be illustrated and discussed in more detail with reference to FIGS. 4A-4E, to generate a delayed optical signal. The optical-to-RF receiver 234 may then convert the delayed optical signal to a simulated RF signal having delayed RF pulses.

Each fiber optic spool of the respective fiber optic delay cells 228 are composed of fiber optic transmission lines (FOTL), which provides an excellent means to produce delay for the PPR circuitry. The FOTL may also include fiber Bragg grating (FBG) and dispersion compensation fiber to account for signal distortion. The FOTL has the following favorable characteristics which provide an advantage for the radar test system 200: (1) low loss (approximately 0.2 dB, single mode, 1550 nm); (2) slow propagation velocity (e.g., approximately 1.5:1, reduced propagation rate requires less fiber for a given delay); (3) low dispersion (e.g., approximately 4 ps/nm-km, single mode, 1550 nm); (4) small size (e.g., approximately 250 micron diameter for single mode fiber); (5) light weight (e.g., approximately 0.5 kg/km); (6) wide bandwidth (down to nearly zero seconds and as high as 600 microseconds); (7) rugged; (8) low cost (e.g., approximately $50/km); and (9) availability of low cost optical signal processing components (OSPC). The distance of simulation corresponding to these delays (between zero and 600 microseconds) may be between zero and 200 kilometers, and thus have a far range of detection testing.

With continued reference to FIG. 2A, the signal delay sub-system 224 may further include an optional signal tap 230, where the radar system 10 may optically tap between an optical output connector (J2) and an optical input connector (J3). The signal tap 230 may enable monitoring of the optical signal and the adding of a Start Pulse onto the optical signal to trigger initiation of a test scenario, in one embodiment discussed below. Furthermore, the second signal attenuator 238 is an optional component that enables separate control of the amplitude of the updated RF signal exiting the signal delay sub-system 224, which may provide an ability to range the updated RF signal for purposes of testing detection, among other reasons.

In embodiments, the PPR circuitry may further include a third coupler 244 coupled between the signal delay sub-system 224, the RF output (J4), and the output pin on the fourth switch 246. The third coupler 244 may be a directional coupler with coupled port connected to the signal analyzer circuit 250 via an amplifier 245 and the fourth switch 246. The third coupler 244 may sample the updated RF signal and direct the signal via the fourth switch 246 to the signal analyzer circuit 250. The fourth switch 246 may alternatively select to send the output of the second coupler 218 to the signal analyzer circuit 250 (discussed previously with respect to the sampled output of the second coupler 218). At the start of a test scenario, the signal analyzer circuit 250 may be switched to the RF output path via the fourth switch 246 and used to detect the Start Pulse. In one embodiment, the amplifier 245 may allow boosting the Start Pulse (which has since been converted to an RF Start Pulse) to a determined strength to trigger detection by the signal analyzer circuit 250 of the Start Pulse on the updated RF signal.

On-board digital and analog I/O components of the programmable I/O controller 240 may be employed to control the RF and optical system components of the PPR circuitry, including to update values sent to switches, pin diode attenuators, the Doppler simulation circuit 210, a pulse detector threshold voltage (see FIG. 2B), the pulse modulator 205, and the multiple fiber optic delay cells 228. In various embodiments, the computing device 201 may update the values for the programmable I/O controller 240 during a time period between incoming RF pulses, e.g., after one RF pulse and in anticipation of a next RF pulse. To do so, the computing device 201 may receive, from the programmable I/O controller 240 for the time period, the first time at which the falling edge of the first RF pulse was detected, and an update request. The computing device 201 may further retrieve scenario data associated with distance from and speed of the moving target for the second RF pulse. The computing device 201 may further calculate, using the scenario data, values of the frequency shift, the signal delay, and the signal attenuation for the second RF pulse. The signal attenuation may be based, at least in part, on the distance to the moving target during the second RF pulse. The computing device 201 may further transmit, during the time period, the values of the frequency shift, the signal delay, and the signal attenuation to the programmable I/O controller 240 for use by the PPR circuitry in simulating the moving target for the second RF pulse (or before a second time when the second RF pulse should have been received in the case of a missing pulse). The timing of these updates will be discussed in more detail with reference to FIGS. 4A-4E.

In embodiments, the scenario data describes how the delay, path loss (e.g., signal attenuation at AT1), Doppler frequency shift, and AT2 attenuation values change over time. Each point in the scenario data contains time and values for each respective parameter at that time. Time is relative to the start of the test scenario. When the test scenario runs, the discrete points in the scenario data are linearly interpolated, except path loss, which uses interpolation (where R is the value of the delay).

In embodiments, the programmable I/O controller 240 may signal the Doppler simulation circuit 210 to change the amount of frequency shift between RF input pulses according to a test scenario or in real time, based on user input, and thus generate frequency-shifted RF pulses. The programmable I/O controller 240 may further be able to suppress the original RF input pulses that are not shifted, e.g., to provide at least 20 dB of separation between the frequency-shifted RF pulses and the original RF input pulses. Because the changes are made between RF input pulses, the Doppler simulation circuit 210 may freeze the Doppler circuitry during the pulse and get an extra 20-30 dB of suppression of the carrier frequency of the original RF input pulses during the pulse. This may avoid the scenario where the radar system 10 gets confused with thinking there are two separate targets instead of a single target that is moving very quickly.

Figure 2B:
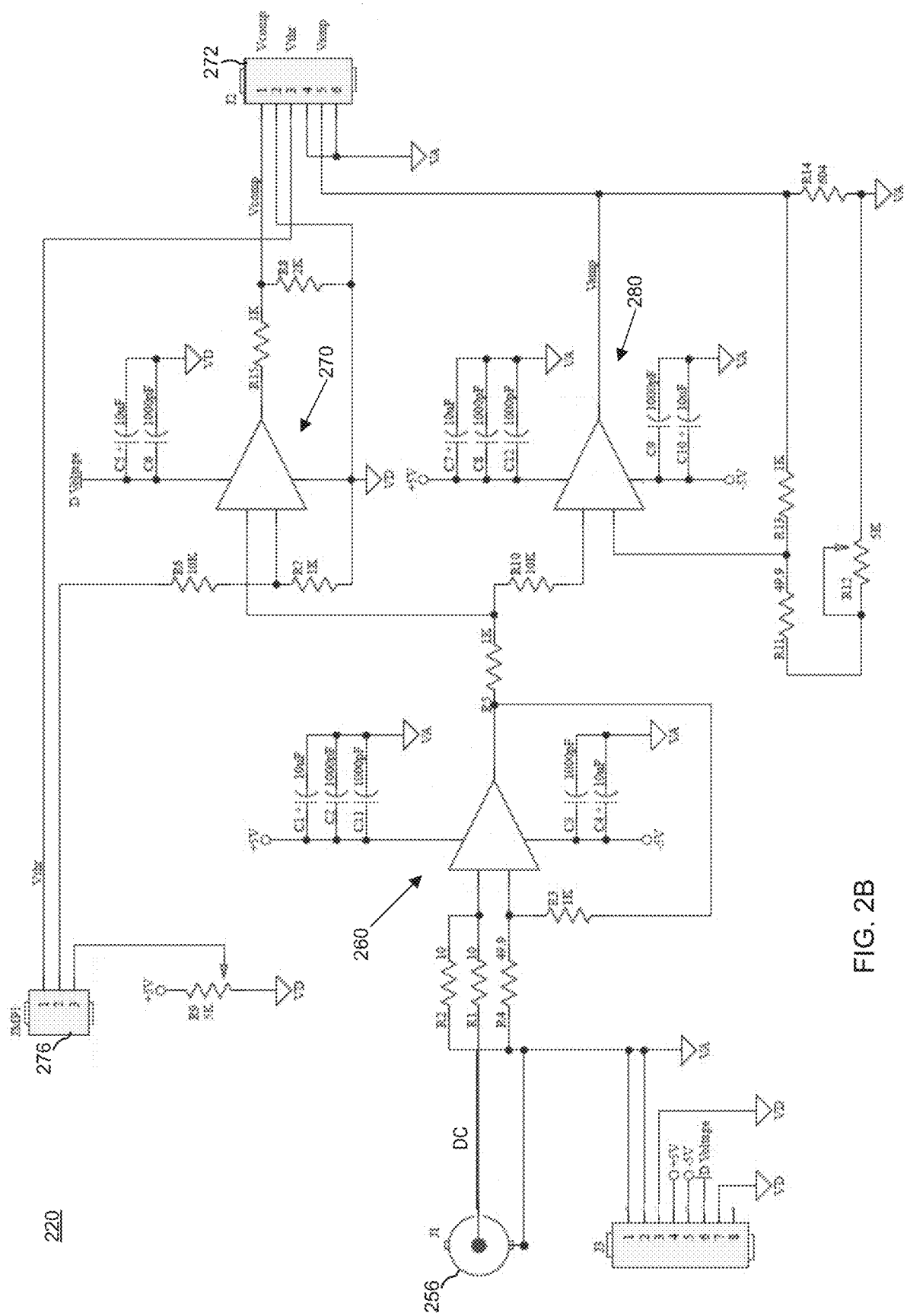
FIG. 2B is a circuit block diagram of a pulse detection circuit of the radar test system of FIG. 2A, according to an embodiment.

FIG. 2B is a circuit block diagram of the pulse detection circuit 220 of the radar test system of FIG. 2A, according to an embodiment. The pulse detection circuit 220 may include, among other illustrated components, a diode detector 256 (D1 in FIG. 4), an optional low pass filter (not illustrated) coupled to the diode detector 256, a first amplifier 260, a comparator 270, and a second amplifier 280. The pulse detection circuit 220 may be a separate circuit board in one embodiment, and may generate a trigger pulse from the input RF signal received from the first coupler 207. In one embodiment, the diode detector 256 may be a coaxial Schottky diode detector connected in line with a coaxial cable connector at the input of the pulse detection circuit 220. The diode detector 256 may perform amplitude (e.g., envelope) detection. The resulting envelope signal may be filtered (by the optional LPF), amplified by the first amplifier 260, to generate amplified RF pulses, and provided to the comparator 270 to determine whether the amplified RF pulses reach or exceed a threshold (reference) voltage. The comparator 270 may output a detection signal to the programmable I/O controller 240 in response to an amplified RF pulse that exceeds the reference voltage.

In various embodiments, the pulse detection circuit 220 may further include a micro-fit connector 272 to interface with the programmable I/O controller 240, through which a reference voltage ($V_{thr}$) may be received from the I/O controller 240 on pin three, and a comparator voltage signal ($V_{comp}$) and amplified voltage signal ($V_{amp}$) may be output. The pulse detection circuit 220 may further include a jumper 276, in which pins one and two may be shorted to pass the reference voltage from the micro-fit connector 272 to the reference voltage pin four of the comparator 270. The reference voltage may be a threshold voltage set by the programmable I/O controller 240, which may be adjusted by a user through the software user interface 201D of the computing system 201. The reference voltage may be set high enough so that noise does not trigger the comparator 270 and low enough to detect an RF Pulse with amplitude of 0.0 dBm±5.0 dB, where "dBm" stands for decibel-milliwatts and "dB" for decibels. The default value is contained in the file System.cfg. The reference voltage was preset to 3.26V at the factory, but as stated, may be adjusted by a system user. The trigger signal from the pulse detection circuit 220 may be used by an algorithm of the programmable I/O controller 240 for timing purposes and to ensure that changes to delay, attenuation, and Doppler occur between incoming RF pulses.

In embodiments, the pulse detection circuit 220 may convert an incoming radar pulse at 11 GHz (or other designed frequency) to a scaled digital pulse that is connected to a high-speed analog input of the programmable I/O controller 240. The programmable I/O controller 240 may then profile the scaled digital pulse and perform one or more functions based on an accurately-produced analog profile from the RF input pulse. The pulse detection circuit 220 may be able to filter out or ignore ambient noise from cell phones and other electromagnetic signals that would otherwise interfere with detection of RF input pulses.

In various embodiments, the pulse detection circuit 220 may be triggered by an incoming pulse based on an Ethernet command (SCPI) or by using the system radar Pulse Detection Mode (PDM). In the PDM mode, the radar test system 200 looks for the first RF input pulse (based on user-defined pulse parameters) from the radar system 10 and initiates a "Target Flight Scenario" on the detected pulse. The radar test system 200 may also maintain synchronization with the radar system by continually monitoring the RF pulse train and updating the target position and speed in between pulses, thus allowing the radar system 10 to see the target as continuously moving in a smooth path. By changing target position, delay, Doppler, and speed (among other parameters programmed by a flight scenario) between RF input pulses, the radar test system 200 may avoid confusing the radar system 10, which may think it has detected two targets based on anomalies generated when making changes during the periods of the RF input pulses.

Figure 3:
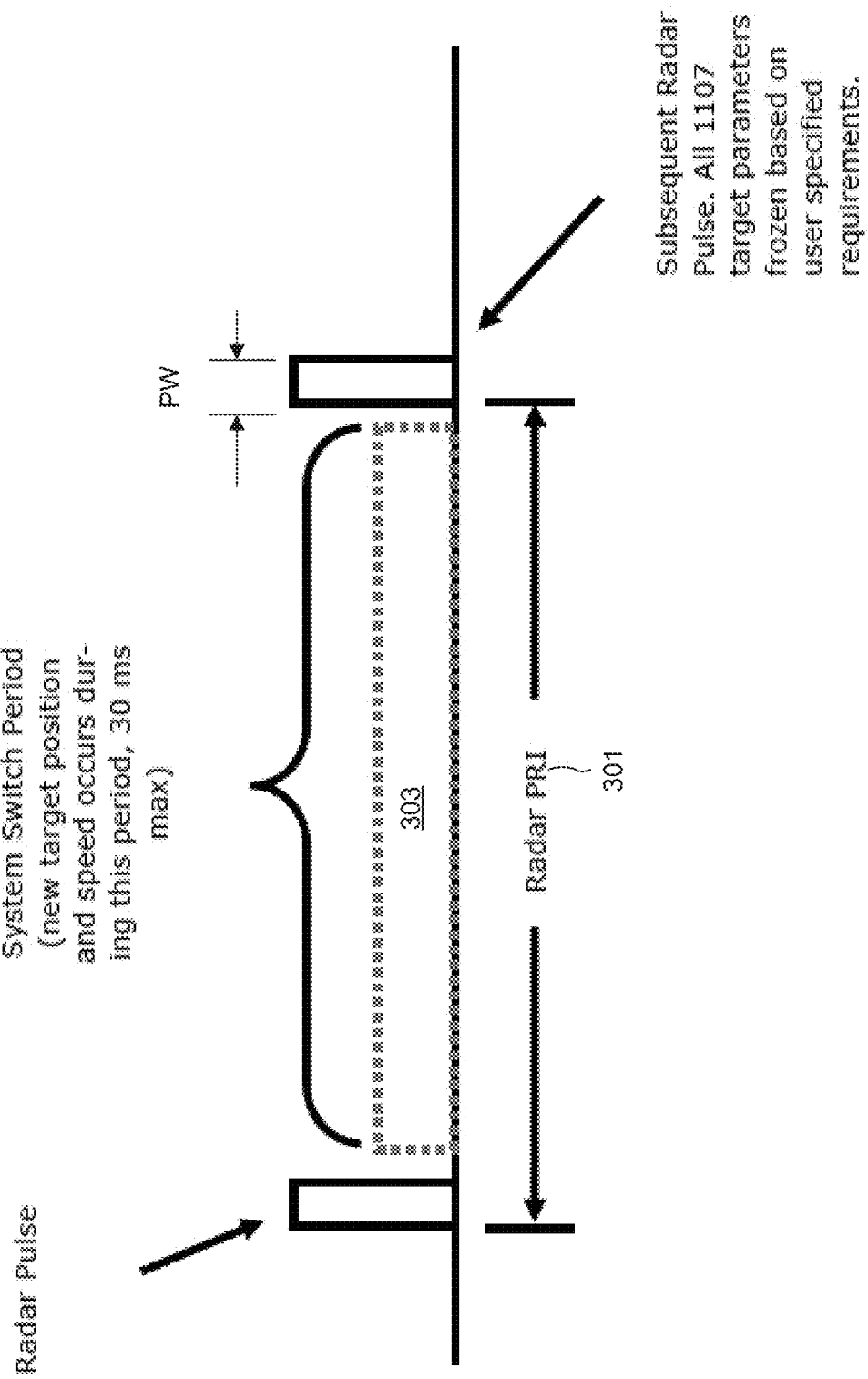
FIG. 3 illustrates a pair of radar frequency (RF) pulses from a radar system under test, according to an embodiment.

FIG. 3 illustrates a pair of radar frequency (RF) pulses from the radar system 10 under test, according to an embodiment. The radar pulse repeating interval (PRI) 301 defines a period of time between radar pulses and a pulse width (PW) defines a width of each pulse. The dashed boxed region indicates a system switch period 303 between two pulses, e.g., between a trailing edge of a first pulse and a rising edge of a second pulse, which may be calculated as the PRI-PW. It is during this time period (generally a maximum of 30 ms) that the radar test system 200 is to update a new target position, speed, and other characteristics (like Doppler, loss) of the target object for which radar performance is being replicated. Accordingly, the PPR circuitry hold (or freeze) the generated target characteristics during the next pulse and then switch to pre-programmed subsequent characteristics of the target prior to the subsequent radar pulse, as directed by the programmable I/O controller 240. The pre-programmed subsequent characteristics (e.g., a scenario) may be defined with software (e.g., by a script) at the time of testing, during testing, or with use of a pre-loaded file containing a list of commands that set the testing parameters.

FIGS. 4A-4E illustrate a more-detailed circuit diagram of the radar test system 200 of FIG. 2A, according to various embodiments. The same components are numbered the same for clarity, and additional components are given 400-series numbers. The system diagrams of FIGS. 4A-4E generally exclude some components such as the computing system 201 and the signal tap 230. The components that have been discussed in detail will not be further discussed in similar detail. The following terms are illustrated within the more-detailed circuit diagrams of FIGS. 4A-4E. An "SMA" is a "sub miniature version A," which is an RF connector type that works at DC-18 GHz or with the precision SMA, up to 22 GHz. A "CPLD" is a "complex programmable logic device," which may be a simple processor or computing device for light-weight processing. An "(F)" symbol indicates a female-type connector and a "(M)" symbol indicates a male-type connector between components.

Figure 4A:
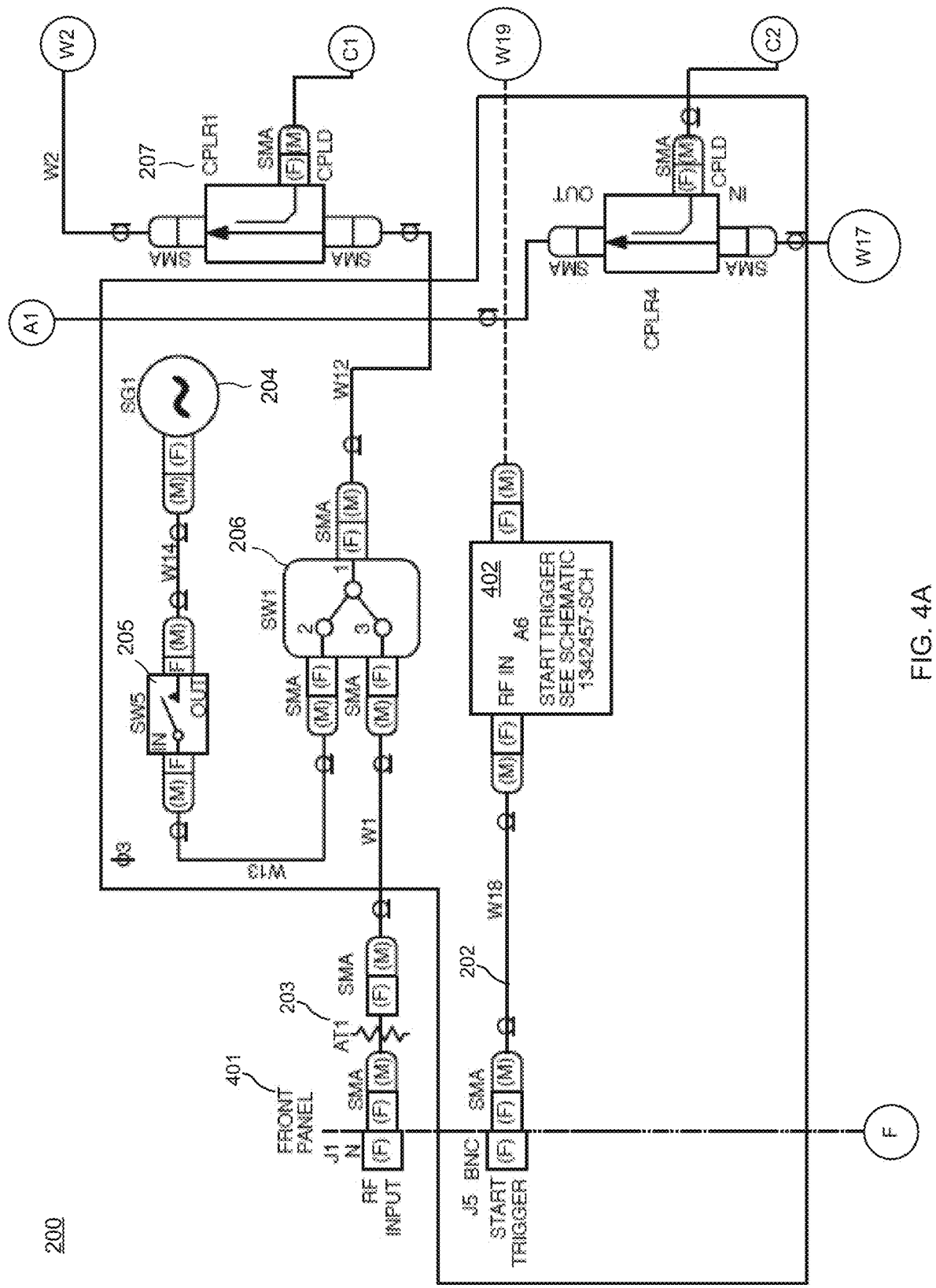
FIGS. 4A, 4B, 4C, 4D, and 4E are a more-detailed circuit diagram of the radar test system of FIG. 2A, according to various embodiments.
Figure 4B:
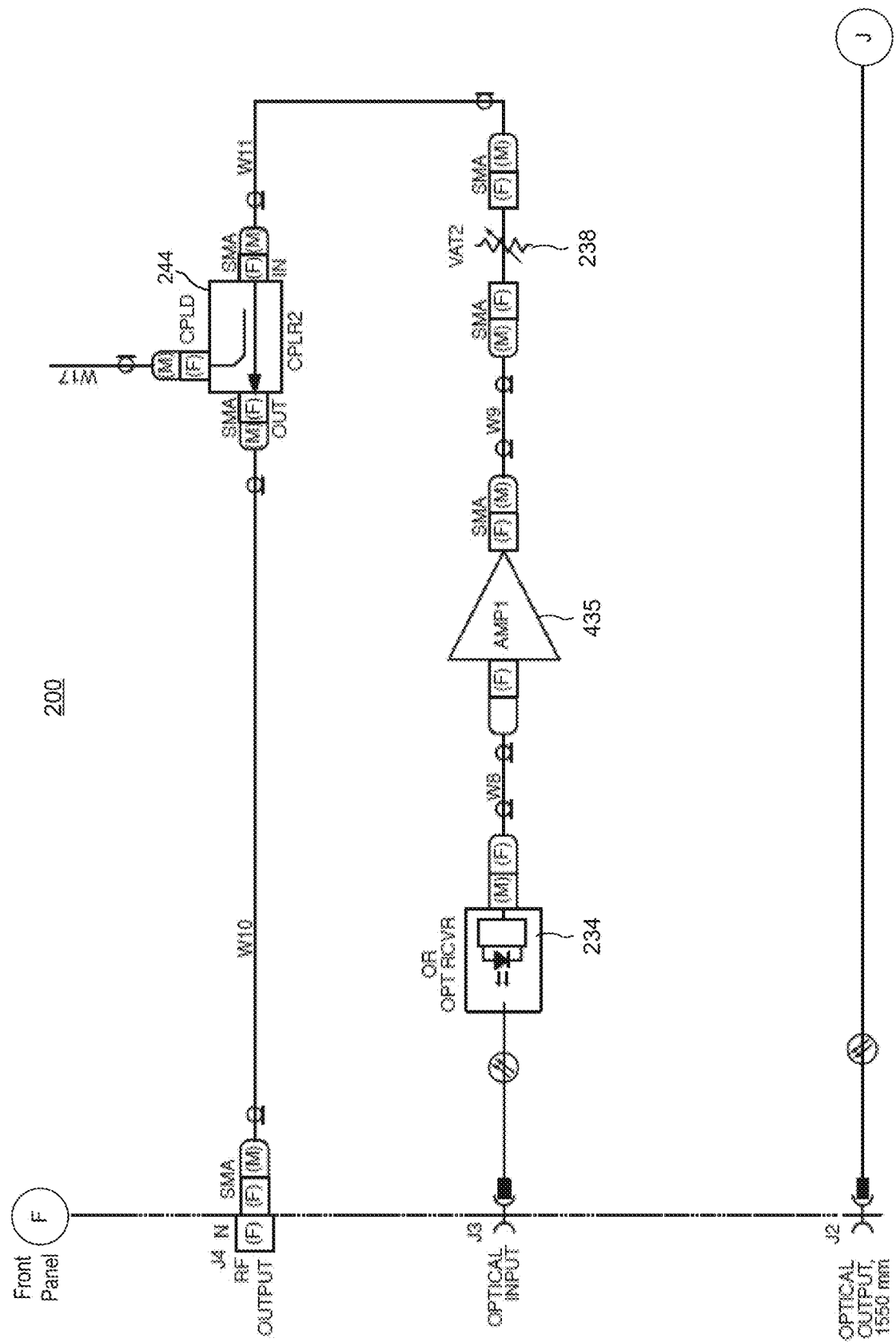

With reference to FIG. 4A, the radar test system 200 may further include a front panel 401 (FP), to which are attached connectors for the RF input (J1), the start trigger (e.g., Start Pulse) (J5), and with reference to FIG. 4B, RF output (J4), optical input (J3), and optical output (J2). In one embodiment, in FIG. 4B, the optical input and outputs (J3 and J2) are simply connected with an optical jumper cable, but are provided separately for optional insertion of the signal tap 230. Again referencing FIG. 4A, the radar test system 200 may further include a start trigger detector 402 to detect a Start Pulse on the RF start trigger line 202 (FIG. 2A). The start trigger detector 402 may generate a trigger pulse in response to detecting the Start Pulse, and send the trigger pulse through line W19 into the programmable I/O controller 240, to cause the start of a new test scenario.

With further reference to FIG. 4B, an amplifier 435 may be positioned between the optical-to-RF receiver 234 and the second signal attenuator 238, in case the updated RF signal (from the signal delay sub-system 224) needs to be amplified before being acted on by the second signal attenuator 238, as controlled by the programmable I/O controller 240. The amplifier 435 may be in lieu or in addition to the amplifier 245 of FIG. 2A.

Figure 4C:
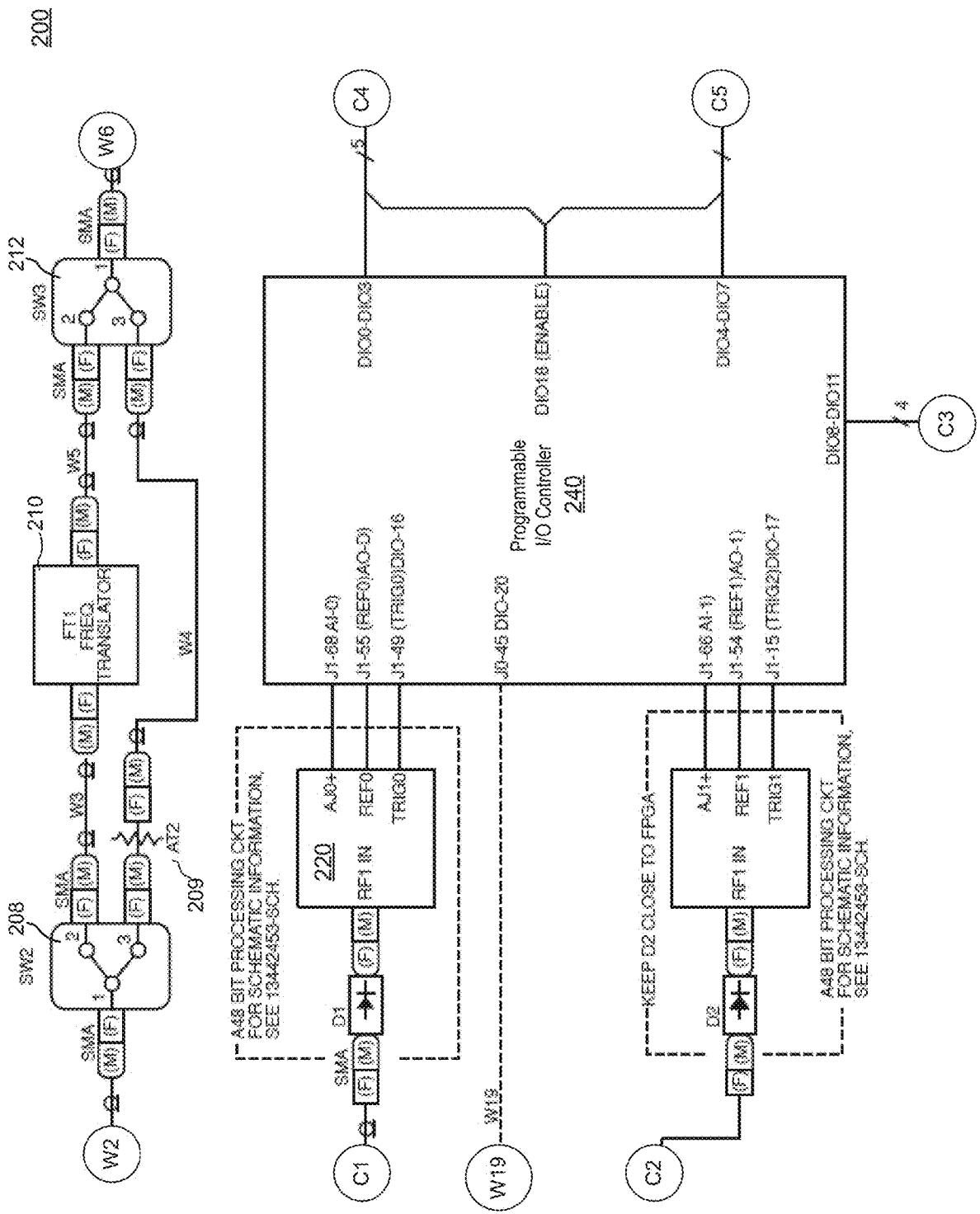
Figure 4D:
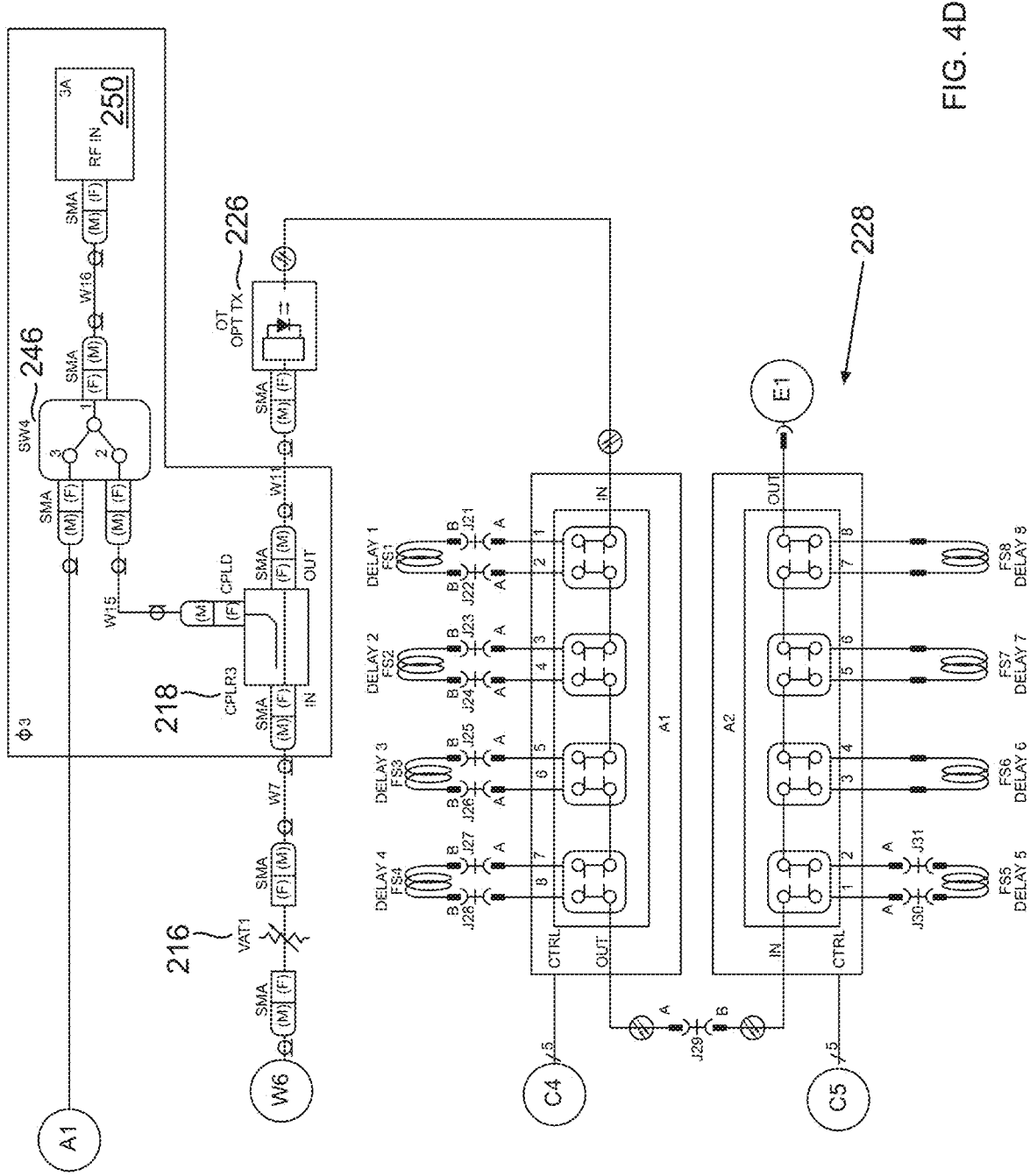
Figure 4E:
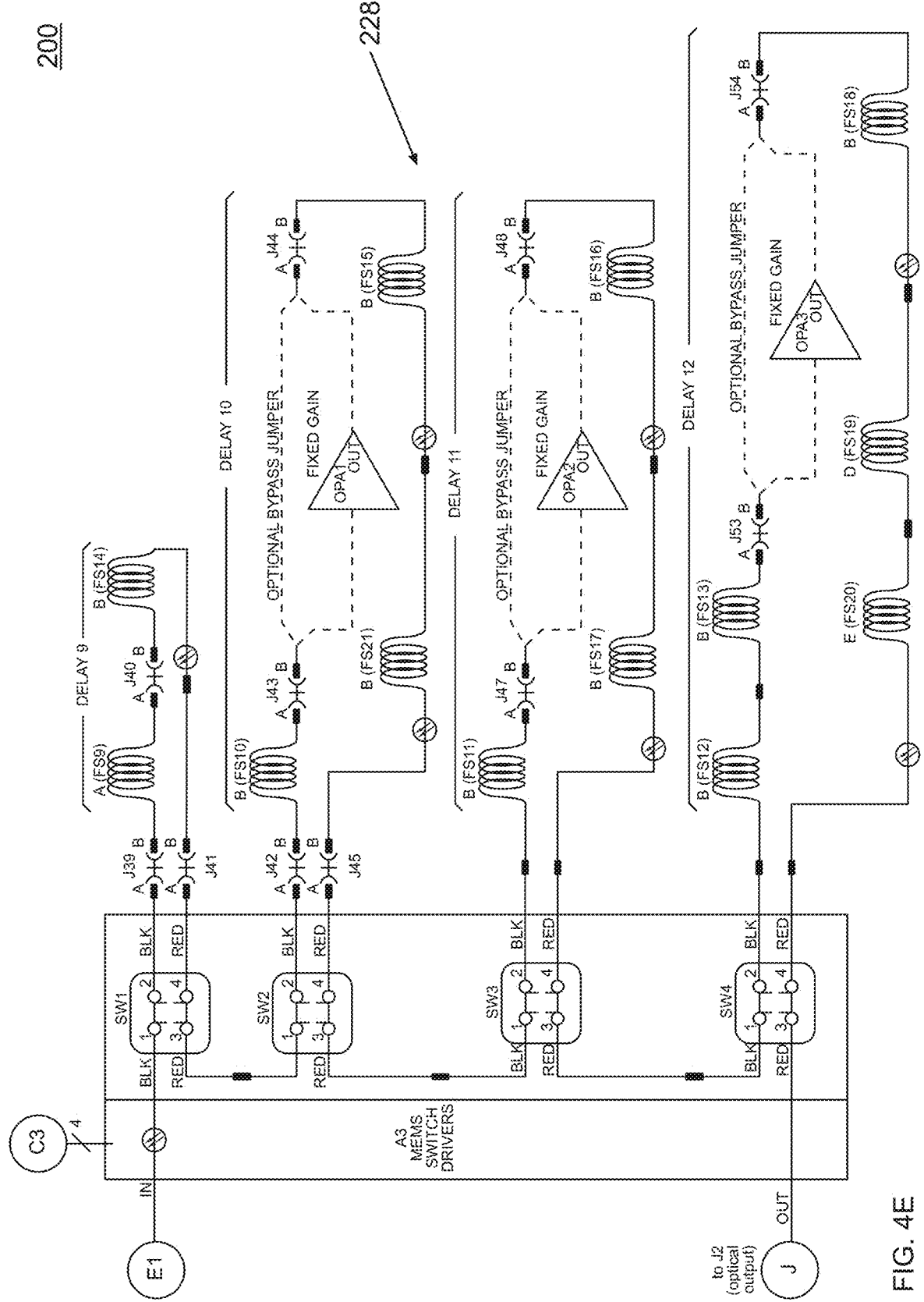

With reference to FIGS. 4D and 4E, the multiple fiber optic delay cells 228 may be composed of 12 total delay cells, although fewer or more are envisioned. As illustrated, the multiple fiber optic delay cells 228 may be a set of different-length fiber optic spools. The multiple fiber optic delay cells 228 may produce 4,096 discrete delay states using a 12-cell binary weighed architecture in which each delay cell (or fiber optic spool) may be independently inserted into or removed from the optical signal path. Each delay cell may be implemented with an optical transfer switch and trimmed length of fiber, e.g., in the form of a fiber optic spool. The optical switches may be controlled by buffered digital outputs from programmable I/O controller 240. In one embodiment, the nominal cell delays may be designed as follows: 0.3 µs, 0.6 µs, 1.2 µs, 2.4 µs, 4.8 µs, 9.6 µs, 153.6 µs, 307.2 µsand 614.4 µs. The delay cells for Delay 10, Delay 11, and Delay 12 involve longer delays and may be equipped with optional bypass jumper and fixed gain operational amplifiers, to optionally amplify the optical signal in some cases.

With reference to FIG. 4C, the programmable I/O controller 240, particularly implemented as an FPGA, offers programmability and greater speed and programming space than other programmable controllers or logic circuits. Some of the components of the radar test system 200 may also be implemented with an application specific integrated circuit (ASIC), which is not reprogrammable. In various embodiments, the FPGA manages and oversees many operations of the PPR circuitry of the radar test system 200, which includes delay control (to simulate distance), RF attenuator control (to simulate loss), Start Pulse and RF input pulse detection (for scenario start and RF pulse input timing), Doppler rate (to simulate speed), depth pattern playback, and others. Upon system boot of the computing system 201, the computing system 201 may start the main application program, written in LabVIEW or the like. The main application program may send the VHDL (FPGA hardware description language or object code) to the FPGA and start the FPGA.

In various embodiments, the user interface 201D may launch from the computing system 201 and wait for an operator to either select a scenario to run or other low-level function such as a built-in self-test (BIT). When a scenario is selected for control to perform testing of the radar system 10, the FPGA may dominate interaction with the hardware of the PPR circuitry. When, however, the BIT is selected for performing a self-test, the spectrum analyzer of the signal analyzer circuit 250 may be used in conjunction with the FPGA to validate the instrument operational integrity of the radar test system 200.

In embodiments, the radar test system 200 may also include self-calibration capabilities, e.g., can measure and record variation in the time delay and propagation loss over time, and then use that information to compensate for the changes in these parameters, thereby ensuring that the overall performance remains substantially constant. These self-test and calibration capabilities will be discussed in more detail with referenced to FIGS. 8, 13-16, and 18. Additionally, the radar test system 200 has the ability to ignore missing radar pulses (that were expected but not generated), yet set the expected target characteristics based on the elapsed time of the scenario, which is discussed in more detail with reference to FIG. 7.

Figure 5:
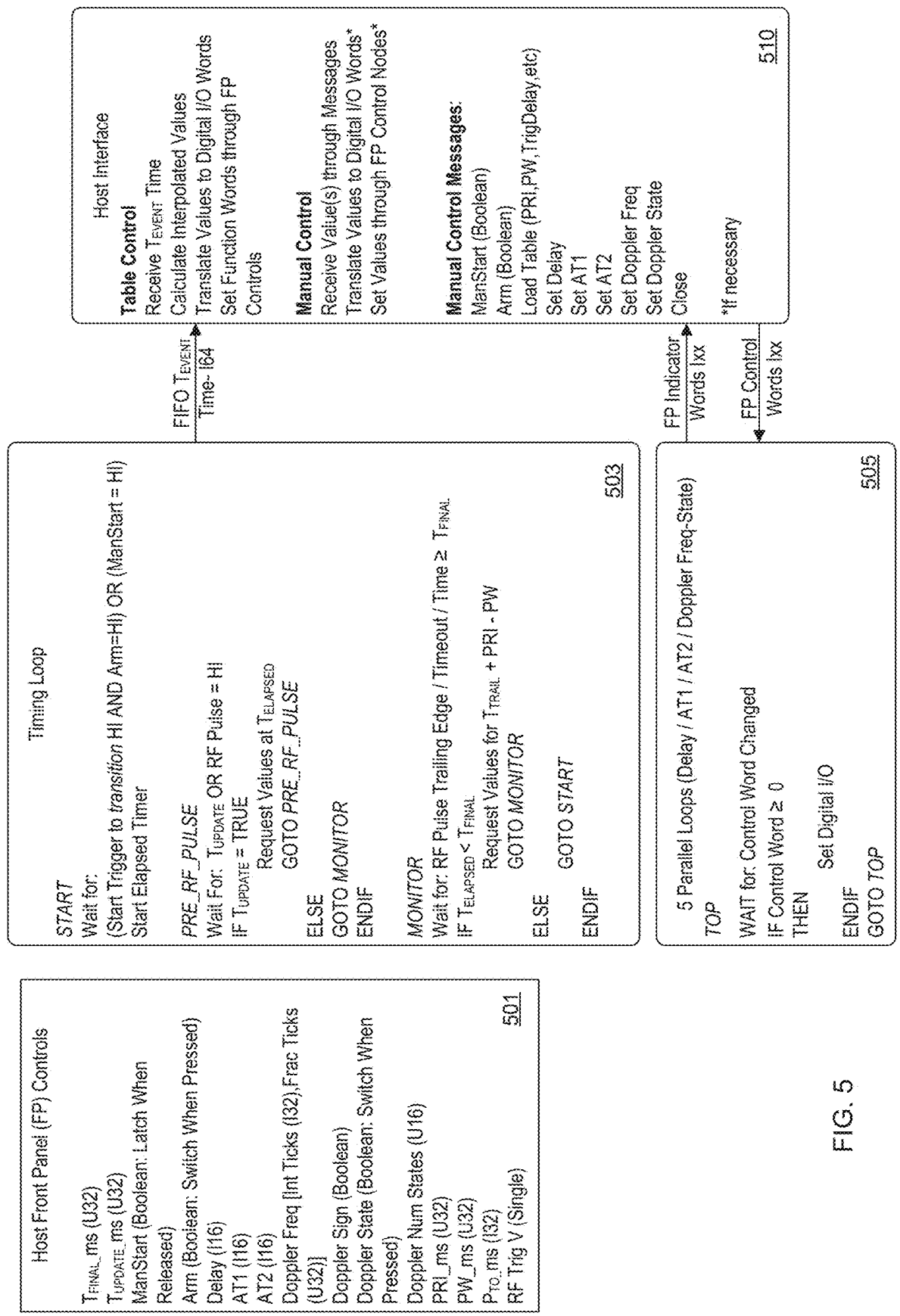
FIG. 5 illustrates code structure for control, timing, and host interface features of the programmable I/O controller of the high speed radar test system of FIG. 2A, according to an embodiment.

FIG. 5 illustrates code structure for control, timing, and host interface features of the programmable I/O controller 240 of the radar test system 200 of FIG. 2A, according to an embodiment. The programmable I/O controller 240 may be controlled by way of a number of host computer front panel (FP) controls 501 as listed in FIG. 5, which illustrates each of these controls with a corresponding designator.

A host interface 510 of the programmable I/O controller 240 receives, from the coupled computing system 201, various values of parameters with which the programmable I/O controller 240 is to be programmed. Timing loop code 503 detailed in FIG. 5 may be programmed into the programmable I/O controller 240 and may dictate whether to trigger pulse detection according to a transition to a high voltage (RF pulse trailing edge) or manually started by a user ($T_{UPDATE}$=True), and the timing controls of request and receipt of updated values. If the manual start, the trigger for making parameter updates may be further based on an elapsed timer, e.g., that repeatedly counts down the PRI-PW time (the system switch period 303). If the start of trigger transition is based on monitoring pulse edges, the timing loop 503 may wait for the pulse trailing edge, a time out period, and determine whether the time is greater than or equal to the total available time ($T_{FINAL}$) for updating. As long as the elapsed time is less than the total available time, the programmable I/O controller requests updated values for $T_{TRAIL}$+PRI-PW. Updated values may include those required by the programmable I/O controller for pulse timing, pulse interval, pulse spacing, amplitudes, Doppler values, and other settings used to simulate the moving target and to be received from the computing system 201. The host interface 510 illustrates functions for performing "table control" and opposed to "manual control," and manual control messages used for the latter.

FIG. 5 also illustrates control code 505 for setting digital input/output (DIO) of the programmable I/O controller 240. The control code 505 includes a set of five parallel loops that include delay, first attenuation (AT1), second attenuation (AT2), and a Doppler frequency and Doppler state. These variables are sent in front panel (FP) indicators to the host interface 510 in response to a front panel (FP) control instruction.

Figure 6:
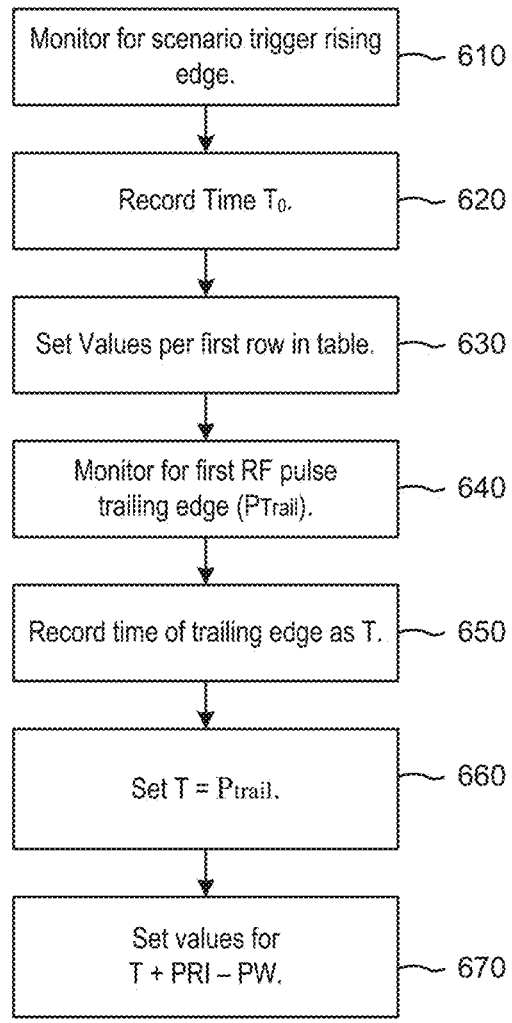
FIG. 6 illustrates a flow chart of a method for monitoring incoming radio frequency (RF) pulses and recording trailing edges of the RF pulses, according to various embodiments.

FIG. 6 illustrates a flow chart of a method 600 for monitoring incoming radio frequency (RF) pulses and recording trailing edges of the RF pulses, according to various embodiments. The steps of the method 600 may be performed by a controller such as a programmable logic device such as the programmable I/O controller 240, an ASIC, or other processor. In particular, the method 600 may be performed by the pulse detection circuit 220, for pulse detection capabilities, in conjunction with the programmable I/O controller 240, which together may be referred to as a detection controller. Not all of these steps need be performed nor need the steps be performed in the same ordered as illustrated.

In various embodiments, the method 600 may begin with the detection controller monitoring for scenario trigger rising edge, which may come from an RF input pulse of the radar system 10 (610). The method 600 may continue with the detection controller recording an initial time, $T_0$, of the rising edge of the RF input pulse (620). The method 600 may continue with the detection controller setting values according to a first row in a table that is populated with values for parameters that drive the scenario (e.g., received from a host computer such as the computing device 201) (630). These values may be user-defined and be populated from entries received from a user through host computer software (see FIG. 9 et seq.).

With continued reference to FIG. 6, the method 600 may continue with the detection controller monitoring for a first RF input pulse trailing edge, $P_{Trail}$ (640). The method 600 may continue with the detection controller recording the time of the trailing edge, T, of the RF input pulse (650). The method 600 may continue with the detection controller setting the variable T to the pulse detected trailing edge, $P_{Trail}$ (see also FIG. 7) (660). The method 600 may continue with the programmable I/O controller 240 further setting values for the parameters corresponding to T plus PRI minus PW, which may be a second row of the parameters table (670).

Figure 7:
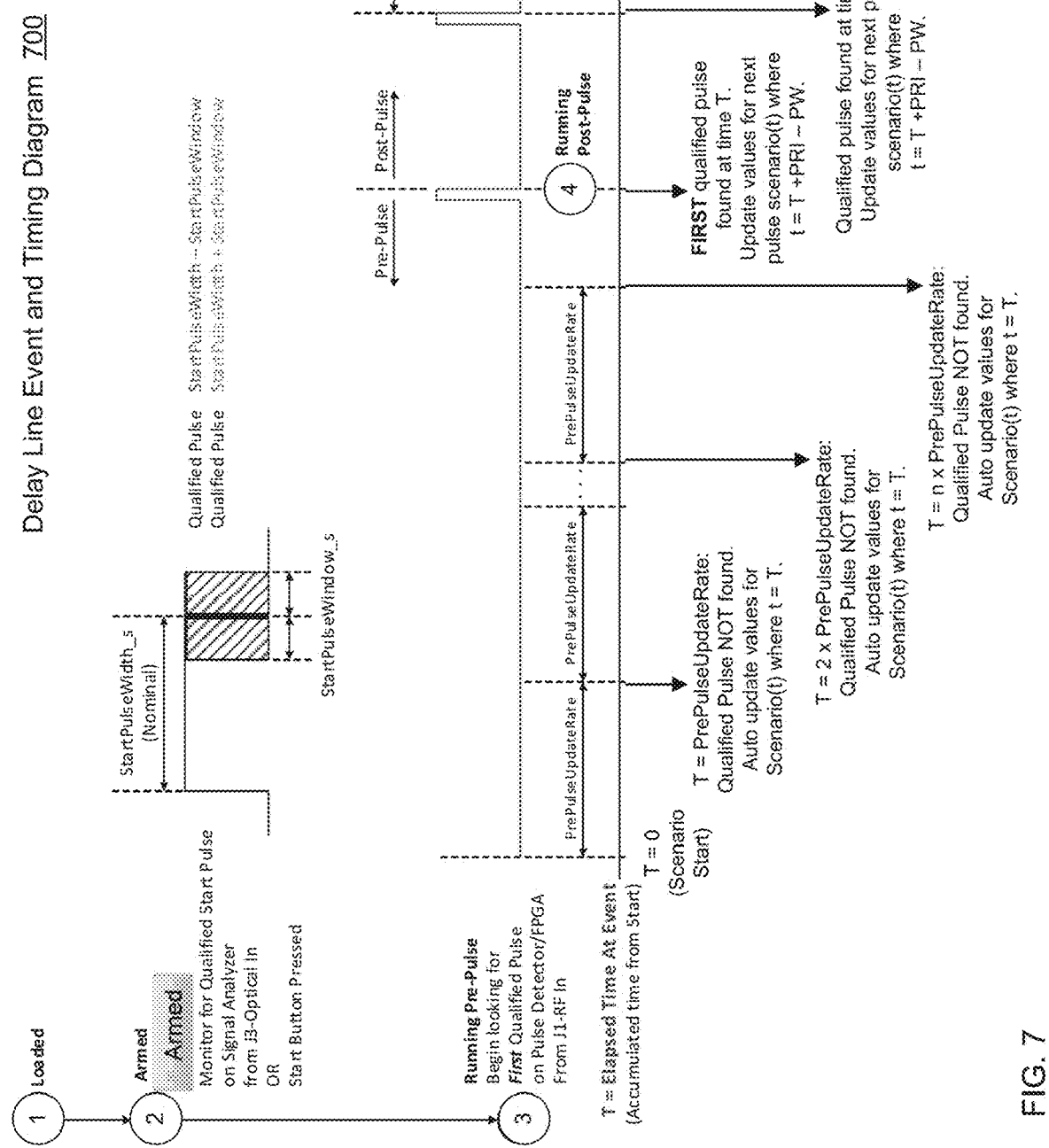
FIG. 7 illustrates delay line event and timing diagram associated with functionality of the radar test system of FIG. 2A, according to various embodiments.

FIG. 7 illustrates delay line event and timing diagram 700 associated with functionality of the radar test system 200 of FIG. 2A, according to various embodiments. At a first step, the radar test system 200 may load a test scenario, e.g., via execution of the application 201B on the computing system 201 and the loading of firmware and initial values into the programmable I/O controller 240. At a second step, the radar test system 200 is armed, during which time the radar test system 200 monitors for a qualified Start Pulse on any of: (1) from a start button being pressed, e.g., via the J5 input; (2) received on the incoming RF signal at J1, e.g., that has a distinctive pattern to distinguish the Start Pulse from a first RF pulse; or (3) that is detected by the signal analyzer circuit 250 received from the J3 optical input. In various embodiments, the distinctive pattern may be a series of short pulses of certain type, or a pulse of certain amplitude and pulse width, or the some combination thereof. The qualified Start Pulse may trigger the start of a pre-programmed test scenario and may include characteristics of at least a pulse width (PW) high limit, a PW low limit (to govern a range of acceptable pulse width), and a minimum amplitude.

With continued reference to FIG. 7, at a third step, the radar test system 200 may begin monitoring for a first RF pulse (e.g., a first qualified RF pulse) as detected by the pulse detection circuit 220. While this monitoring occurs, a number of updates may be performed at a pre-pulse-update rate before the first qualified RF pulse. Elapsed time at an event is accumulated from the start of the scenario at T being equal to zero ("0"). Between the times of the pre-pulse-update rate, the parameter values for Doppler, loss, and delay (and others) may be updated according to the pre-programmed test scenario. Thus, the pre-programmed test scenario effectively begins and updates are made to the programmable I/O controller 240 and to the PPR circuitry while waiting for the first RF pulse. This will keep a test scenario synchronized and on track for a proper start to the test scenario.

At a fourth step, the pulse detection circuit 220 may detect the first RF pulse that is qualified and signal to the programmable I/O controller 240 that the first RF pulse has been received. In response to receipt of the first RF pulse, the radar test system 200 may update the values for the PPR circuitry for an anticipated next pulse at time, t, which is equal to T+PRI-PW. In the example of FIG. 7, a second RF pulse that is qualified indeed has been received at that anticipated time, and thus the values for the PPR circuitry are again updated for a third RF pulse expected to be received at time, t, which is equal to T+PRI-PW, as before.

This time, however, the anticipated pulse was not received within a timeout period (PulseTimeOut in FIG. 7). The falling edge of the pulse (hereinafter "missing pulse") that should have arrived during that time but did not may be set as $T=T_{prev}$ PRI, which provides the programmable I/O controller 240 a time (T) from which to calculate the new timeout period. Regardless of the fact that there was a missing pulse, the values of the PPR circuitry (e.g., Doppler, loss, delay) are still updated for t equal to T+PRI-PW, so that the scenario will stay on track and as synchronized as possible to an expected RF pulse train. In the example of FIG. 7, the next RF pulse does arrive that is qualified before reaching the end of the new timeout period, so the values of the PPR circuitry are again updated for yet a next pulse. Note that time, t, is set to T+PRI-PW, which allows resynchronization of the new newly received RF pulse for purposes calculating the next timeout period. At step five, the scenario may end for any number of reasons, such as the user ending the scenario, or the scenario reaching a natural end.

FIGS. 8A-8E illustrate various flow charts, 800A, 800B, 800C, 800D, and 800E, comprising method 800, of software and firmware functionality associated with the computing system 201, the user interface 201D, the programmable I/O controller 240, and the signal analyzer circuit 250 of the radar test system 200 of FIG. 2A, according to various embodiments. Each of these major components communicates with the others via messaging, and using an architecture known as asynchronous actor architecture. Messaging that takes place is indicated with thicker lines and generally with off-page indicators to another major component or process. A message may also be viewed as an event that will trigger an action in the other component and/or for which a response is expected. This approach provides flexibility in which some processes may be shut down while other may still continue, and thus a customized approach to the radar system testing and one that also provides a number of self-testing options for testing the radar test system 200.

Figure 8A:
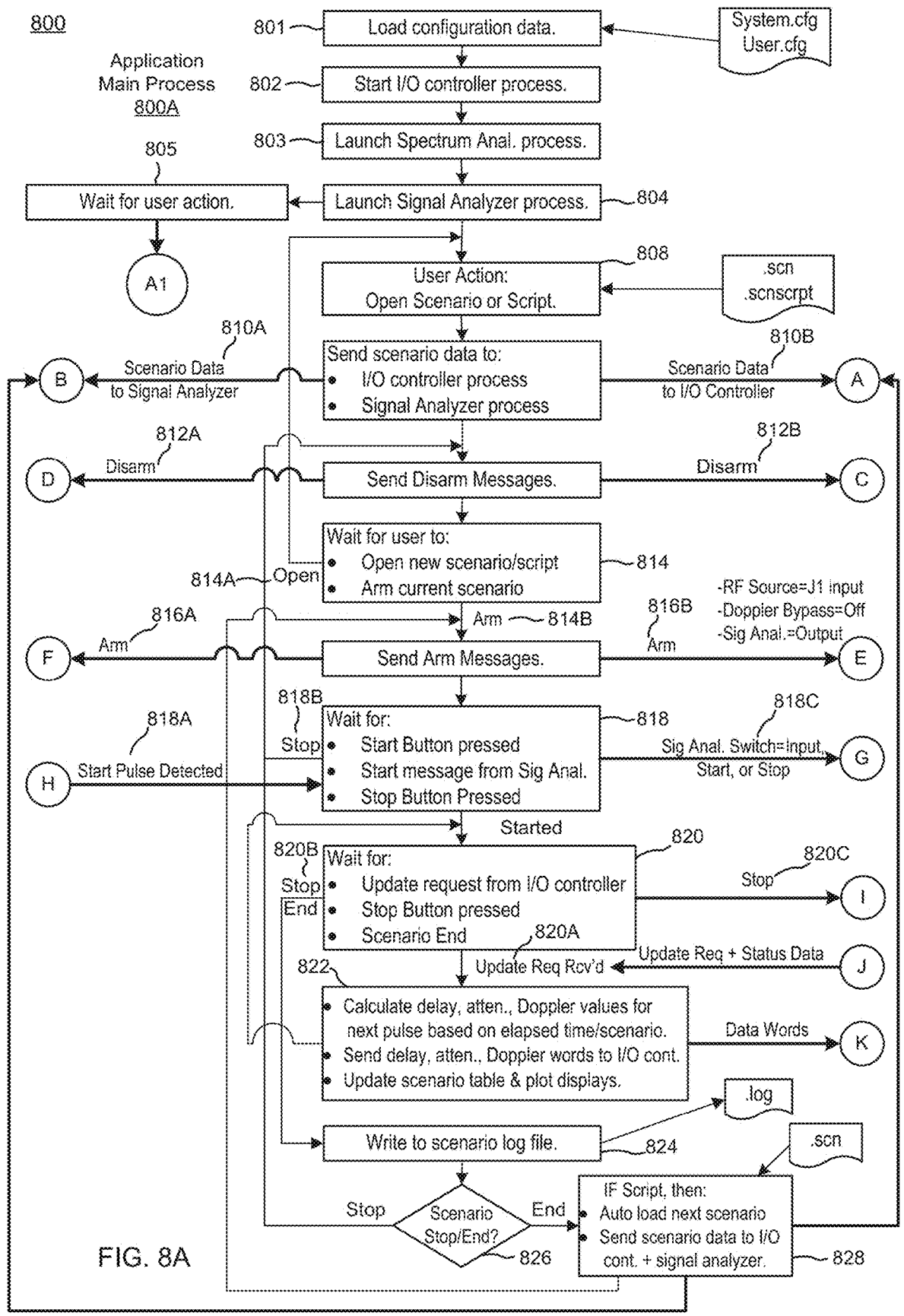
FIGS. 8A, 8B, 8C, 8D, and 8E are a flow chart for a method of software and firmware functionality associated with a computing system, a user interface, a signal analyzer circuit, a spectrum analyzer circuit, and a programmable I/O controller of the radar test system of FIG. 2A, according to various embodiments.

FIG. 8A begins with the Application Main Process 800A, e.g., details of execution of the application 201B by the computing system 201, as introduced with respect to FIG. 2A. Various aspects of the computing system 201 may be involved with executing of the Application Main Process 800A, including processing logic of hardware, software, firmware, or a combination thereof, and may be implemented by a state machine in one embodiment. The application 201B may, in one embodiment, be Windows® Remote Desktop client running on default port 3389.

With reference to FIG. 8A, the method 800 may begin with the processing logic loading configuration data into memory of the computing system 201 (801). The configuration data may be data for use in configuring the programmable I/O controller 240, the signal analyzer circuit 250, the spectrum analyzer process of the signal analyzer circuit 250, and different functionalities supported via the user interface 201D. With more particularity, the system.cfg file may contain at least the following parameters: delay, AT1 and AT2 correction tables, default value for the pulse detector trigger voltage. The system.cfg may also include FPGA parameters such as clocks rates, pulse detector filter taps, and the maximum number of phase shifter states used by the Doppler simulation circuit 210. Furthermore, the user.cfg file may contain the following: folder where the Log (.log) files are to be saved; folder where the scenario files (.scn) are located; folder where the Scenario Script files (.scnscript) are located; and folder where screen captures (.png) files are to be saved.

The method 800 may continue with the processing logic starting the process for the programmable I/O controller 240, e.g., an FPGA process (802). In one embodiment, the main application may send the VHDL (FPGA hardware description language or object code) to the FPGA and start the FPGA. The method 800 may continue with the processing logic launching the spectrum analyzer process (803) and the signal analyzer process (804) of the signal analyzer circuit 250. Once the signal analyzer process is executing, the processing logic may detect, at any time, user action through the user interface 201D (805). Examples of user actions will be discussed in more detail with reference to a User Interface Process 800B of the method 800.

The method 800 may continue with receipt of a user action, to open a scenario or script file received from a user (through the user interface 201D) or retrieved from memory of the computing system 201 (808). With more particularity, a scenario file (.scn) may contain the information which defines a scenario. Although these files may be created and edited manually, using an editor tool in the application software is recommended. The contents of the scenario file may include information included in the header (894 of FIG. 8F), which defines pulse timing parameters that will be discussed below, as well as a table populated with a pre-pulse definition of the following PPR-related values: time in seconds (T in FIG. 7), delay in seconds, path loss in decibels, Doppler shift in hertz, and attenuation at the second signal attenuator 238 in decibels (optional). A scenario script file (.scnscript) may be a tab delimited file that contains the information which defines a script. Script files contain a numbered list of scenario pathnames that will run consecutively when the script is loaded and armed. Although these files may be created and edited manually, using the editor tool in the application software is recommended.

FIG. 8F illustrates an example header 894 of a message or code word between the computing system 201 and either of the signal analyzer circuit 250 or the programmable I/O controller 240 of the radar test system of FIG. 2A, according to one embodiment. The PW_s is the nominal pulse width used for RF pulse detection and is less than PRI_s. The PulseWindow_s is used for RF pulse detection. A qualified pulse has a width that is within PW_s+/−PulseWindow_s. The PRI_s is the RF pulse repetition interval used for RF pulse detection, and is to be greater than PW_s. The Pulse-Timeout_s, which is to be greater than PRI_s, specifies how long to wait for a qualified pulse after the trailing edge of the previous pulse. If a qualified pulse is not detected before PulseTimeout_s expires, the values for the PPR circuitry are updated automatically. The TrigDelay_s (for trigger delay) delays or advances the scenario by the specified amount of time after the start pulse is detected or the scenario is manually started. The PrePulseUpdateRate_s specifies the automatic update rate to use after the scenario is started and before the first pulse is detected, and may be greater or equal to 100 ms. The StartPulseWidth_s is the nominal pulse width used for Start Pulse detection. The StartPulse Window_s is used for Start Pulse detection. A qualified Start Pulse has a width that is within StartPulseWidth_2+/−PulseWindow_s.

With continued reference to FIG. 8F, the StartPulseReflLevel_dBm specifies the reference level for the signal analyzer circuit 250 when detecting a Start Pulse. This may be empirically determined based on signal level and noise, and may be between 10 dBm and negative 30 dBm. The value for StartPulseRefLevel_dBm may be coerced to a valid value without error. The StartPulseTrigLevel_dBm specifies the trigger level in dBm for the signal analyzer circuit 250 for Start Pulse detection. The CenterFreq_Hz specifies the center frequency at which the signal analyzer circuit 250 is tuned during Start Pulse detection. The CenterFreq_Hz may be between 2 GHz-12.4 GHz, and maybe be coerced to a valid value without error.

With continued reference to FIG. 8A, the method 800 may continue with the processing logic sending scenario data to the signal analyzer circuit 250 (810A) and to the programmable I/O controller 240 (810B). The method 800 may continue with the processing logic sending a disarm message to the signal analyzer circuit 250 (812A) and to the programmable I/O controller 240 (812B), which is to disarm the processing logic associated with a given process. This is because if the major components of the radar test system 200 are still armed, a spurious signal could trigger the start of a scenario before intended and before the radar system 10 has started to send RF radar signals.

The method 800 may continue with the processing logic waiting for, via the user interface 201D, the opening of a new scenario or script file and the arming of a current scenario (814). If a new scenario or script file is opened (814A), the method 800 may cycle back to block 808 to retrieve scenario data from the .scn and .scnscrpt files. If the current scenario is armed (814B), the method 800 may continue with the processing logic sending arm messages to the signal analyzer circuit 250 (816A) and to the programmable I/O controller 240 (816B). In one embodiment, the arm message to the programmable I/O controller 240 may also include sending values for parameters such as RF source (e.g., J1 input), Doppler bypass (e.g., OFF), and a signal analyzer status (e.g., output).

The method 800 may continue with the processing logic waiting for the start button to be pressed on the user interface 201D, a start message to be sent from the signal analyzer circuit 250 or the stop button to be pressed (818). In the different situations, in response to receipt of the Start Pulse in a start message from the signal analyzer circuit 250, the method 800 may continue with the processing logic detecting the Start Pulse (818A). In response to receipt of an indication that the stop button has been pushed (818B), the method 800 may continue with the processing logic stopping the scenario and looping back to sending disarm messages (812A, 812B). The method 800 may continue with the processing device sending indication of the Start Pulse from the signal analyzer circuit 250, or of the start or stop being pushed, to the programmable I/O controller (818C).

In response to the detection of the Start Pulse or the start button being pressed, the method 800 may continue with the processing logic waiting for any one of: receiving an update request from the programmable I/O controller 240, receiving an indication of the stop button being pressed, or reaching the end of the scenario (820). In response to receipt of an update request with status data from the programmable I/O controller (820A), the method 800 may continue with the processing logic performing scenario updates before the programmable I/O controller 240 detects the next RF pulse (822). The status data may include timing data associated with the incoming RF pulses from the radar system 10, such as values associated with the parameters included in the scenario summary (FIG. 8G). These updates performed may include calculating the delay, attenuation, and Doppler values for the next pulse based on the elapsed time and other scenario data. The updates may further include sending the delay, attenuation, and Doppler words to the programmable I/O controller 240, which can update the corresponding PPR circuitry, e.g., the signal delay sub-system 224, the first signal attenuator 216, and the Doppler simulation circuit 210, respectively. The updates may also include updating the scenario table and plot displays as will be discussed with reference to FIGS. 9-12.

At block 820, in response to receiving an indication of the stop button being pressed (e.g., or some other stop indicia) or reaching the end of the scenario (820B), the method 800 may continue with the processing logic writing to a scenario log file from cache to a storage disk (824). In response to the stop button being pushed, the processing logic may further send a stop signal to the programmable I/O controller 240 (820C). Log files are tab delimited files that are generated automatically when a test scenario is started, and are cached in cache and/or memory while the test scenario runs. In one embodiment, the filename format for the log files may be identical to the one used by Screen Capture Files with the exception that the extension is .log. These files may be opened directly by or pasted into Excel by Microsoft®. The default folder where log files are saved may be specified by the ScenarioFileFolder parameter in the User.cfg file. Log Files contain information and data about a scenario that was run and contain three main sections, including the scenario header (FIG. 8F), the scenario summary (FIG. 8G), and a data table.

FIG. 8G illustrates an example scenario summary file that may be written to a log file in response to completion (stop or end) of a test scenario, according to various embodiments. The Arm Time may be a timestamp indicating when the scenario was armed. The Start Time may be a timestamp indicating when the scenario was started. The Stop Time may be a timestamp indicating when the scenario was stopped. The Final Status (e.g., Complete/Incomplete) may indicate whether the scenario ran to completion (Complete) or was stopped by the user (Incomplete). The Elapsed Time_s may be the actual run time in seconds for the scenario. The Pre-Pulse Updates may be the number of times the Values (Delay, Attenuation, Doppler) were updated automatically after the scenario was Started and before the occurrence of the first pulse. The Pulse Count may be the number Qualified Pulses detected, with pulse width criteria as follows: Qualified PW≥PW_s−PulseWindow_s and Qualified PW≤PW_s+PulseWindow_s. When the trailing edge of a qualified pulse is detected at time (T), new values are calculated and applied based on the predicted time (t) for rising edge of the next pulse, where t=T+PRI_s−PW_s.

With continued reference to FIG. 8G, the Missing Pulses may be the number of times a Qualified Pulse was not detected within the timeout period (PulseTimeout_s). The timeout period may run from the time of the previous falling edge ($T_{PREV}$). When a missing pulse is detected, the time of its trailing (or falling) edge (T) is calculated as: $T=T_{PREV}+$ PRI_s. New values are calculated and applied based on the predicted time (t) for rising edge of the next pulse. This algorithm may keep the sequence synchronized over multiple sequential missing pulses by applying updates where pulses should have been detected.

With continued reference to FIG. 8G, the Last PW_s may be the pulse width in seconds of the last qualified pulses that was detected, and is not applicable if no pulses were detected. The Mean PW_s may be the mean pulse width of the combination qualified pulses that were detected, and is not applicable if no pulses were detected. The StdDev PW_s may be the pulse width standard deviation for a combination of qualified pulses that were detected and is not applicable if no pulses were detected. The Last PRI_s may be the pulse repetition interval in seconds of the last qualified pulses that was detected, and is not applicable if no pulses were detected. The Mean PRI_s may be the mean pulse repetition interval of a combination of qualified pulses that were detected, and is not applicable if no pulses were detected. The StdDev PRI_S may be the pulse repetition interval standard deviation for the qualified pulses that were detected, and is not applicable if no pulses were detected.

With renewed reference to FIG. 8A, after writing to the scenario log file, the method 800 may continue with the processing logic determining whether the scenario has ended or has been stopped (826). If stopped, the method 800 may loop back to send disarm messages (812A, 812B). If ended and a script is being executed, the method 800 may continue with the processing logic auto-loading the next scenario data and sending the next scenario data to the programmable I/O controller 240 and the signal analyzer circuit 250, as indicated by the darkened lines (828). For example, a portion of second scenario data (for the next scenario) may be sent to the programmable I/O controller 240 to perform a second test scenario.

Figure 8B:
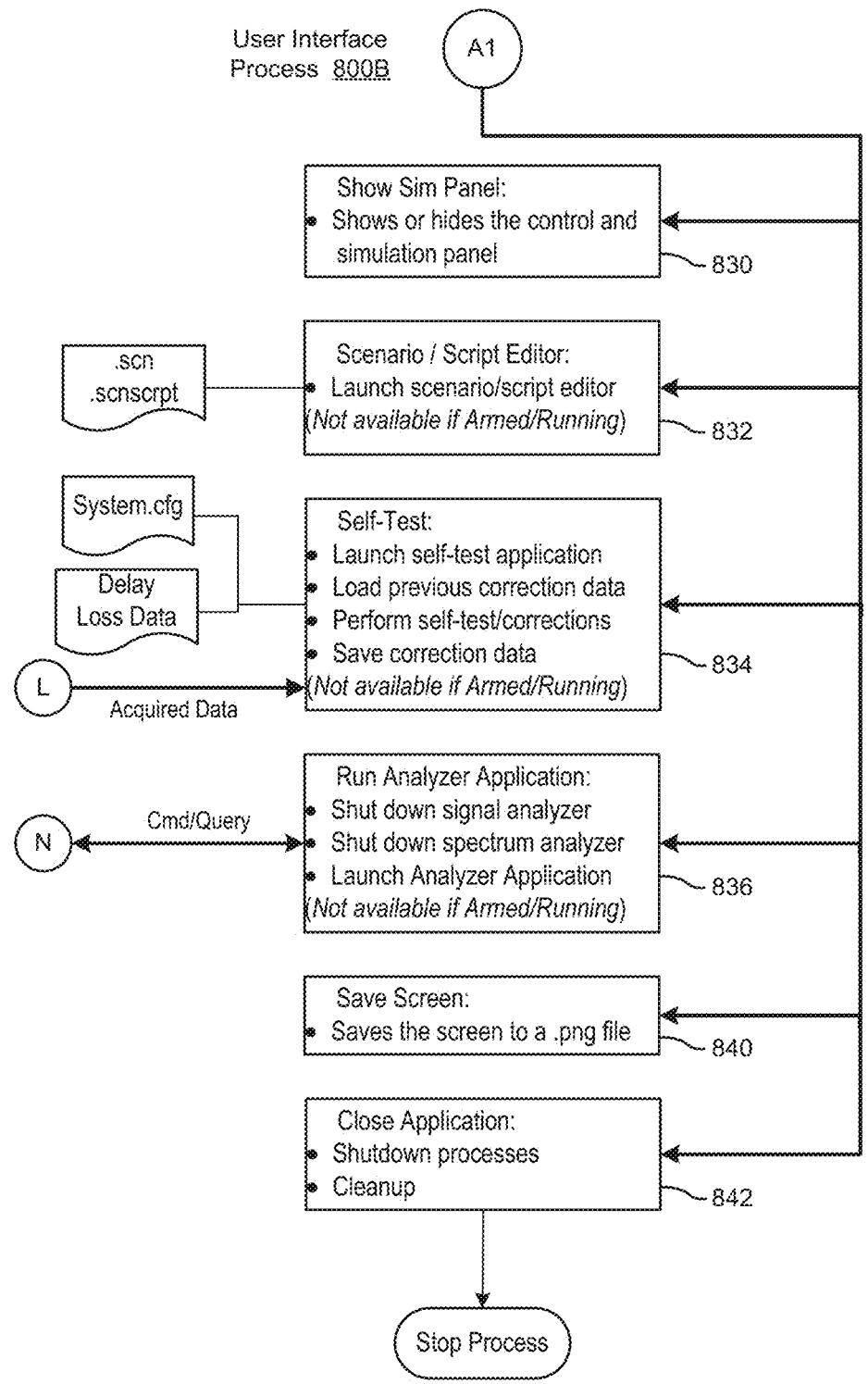

With reference to FIG. 8B, the User Interface Process 800B, the method 800 may continue with the processing logic executing the user interface 201D and responding to any number of user actions detected through the user interface, a portion of which may also be linked to functionality of the signal analyzer circuit 250. The following is a description of some of the more likely user actions that would be detected. For example, the method 800 may continue with the processing logic executing the user interface to show the simulation panel, which is selectively displayed or hidden and includes relevant controls and options (830). The method 800 may continue with the processing logic executing the scenario/script editor, which his launched assuming no test scenario is armed (already running) (832).

The method 800 may continue with the processing logic performing a self-test by, for example, launching a self-test application, loading previously determined correction data, performing self-test and determining corrections to some values of the PPR circuitry, and saving correction data (834). The correction data may be located in one or more files in the application folder in memory. One correction data file may contain the loss in dB for each of the 4096 delay states (or some other number of delay states in another embodiment). The losses may be relative to the 0 State (0.0 s) delay setting. The file contents are tab delimited and may be pasted into or loaded directly using Excel by Microsoft®. This delay loss data file may be loaded when the application starts and its values are used when calculating path attenuation (e.g., loss).

The method 800 may continue with the processing logic shutting down the signal analyzer and spectrum analyzer processes native to the signal analyzer circuit 250, and launching the native analyzer application (e.g., Spike for the Signal Hound) to run on the signal analyzer circuit 250 (836). The method 800 may continue with the processing logic saving a screenshot of the screen of the user interface 201D as seen on a display device, which saves the screenshot to a .png file (840). The method 800 may continue with the processing device closing the application 201B and performing cleanup (842).

Figure 8C:
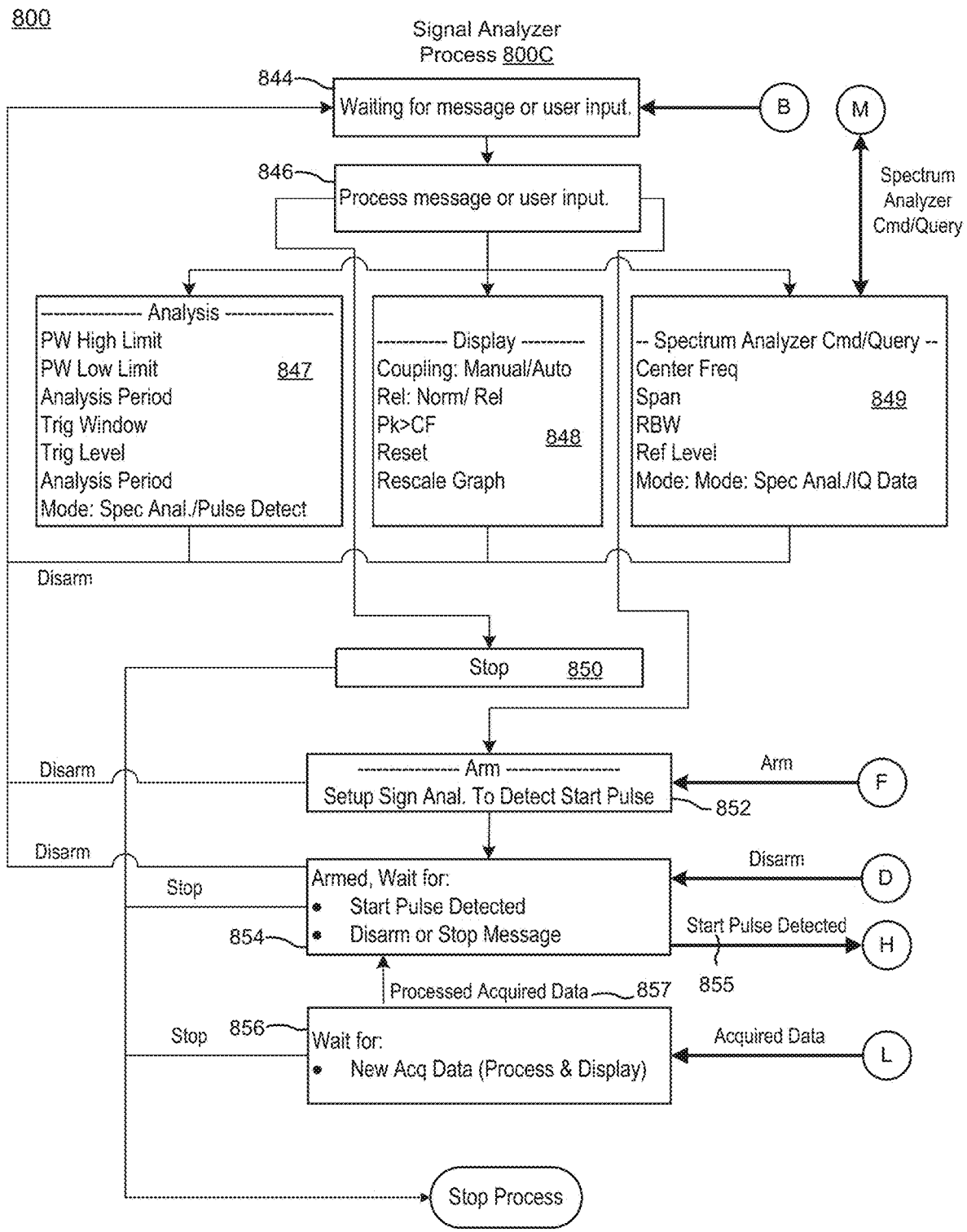

With reference to FIG. 8C, the Signal Analyzer Process 800C, the method 800 may continue with the processing logic waiting for a message (e.g., from 810A of the Application Main Process 800A) or a user input through the user interface 201D (844). The method 800 may continue with the processing logic processing the message or the user input (846). This processing may involve analyzing various parameters received in the message (or user input), including PW high limit, PW low limit, analysis period, trigger window, trigger level, analysis period, and mode (e.g., either spectrum analyzer mode or pulse detection mode of a set of analyzer modes) (847). The spectrum analyzer mode is to utilize the signal analyzer circuit 250 as a swept tuned spectrum analyzer. The pulse detection mode is to detect a Start Pulse on the J3 output from the signal delay sub-system 224.

With continued reference to the Signal Analyzer Process 800C, the method 800 may continue with the processing logic displaying certain mode options for selection, including coupling (e.g., manual or auto), relative (Rel) (norm or relative), peak (Pk) greater than the center frequency (CF) (Pk>CF button), rest, and rescale graph (848). The method 800 may also continue with the processing logic sending a command or query to the spectrum analyzer of the signal analyzer circuit 250, where the command may include center frequency, span (e.g., frequency range), resolution bandwidth (RBW), reference level, and mode (whether spectrum analyzer mode or IQ data mode) (849).

With reference to these actions, the auto mode of coupling sets the RBW automatically based on the value of span, and the manual mode allows span and RBW to be set independently. Rel has two modes: Norm and Relative. When Relative is selected, a peak search is performed the values for amplitude and frequency are saved. With Relative selected, subsequent sweeps display the peak amplitude (blue) and frequency (red) relative to the saved values. In Norm mode, peak amplitude and frequency are calculated and displayed on each sweep. Furthermore, pressing Pk>CF button may perform a peak search and changes the center frequency to the frequency where the peak was found.

With continued reference to the Signal Analyzer Process 800C, the method 800 may continue to detect a stop selection at any time (850). In response to the stop selection, the method 800 may stop the Signal Analyzer Process 800C. The method may continue with the processing logic arming itself in response to an arm message received from the Application Main Process 800A (852). Arming may include a setup or configuration of the signal analyzer circuit 250 to detect the Start Pulse. After being armed, the method 800 may continue with the processing logic waiting for detection of the Start Pulse or a disarm message or a stop message (854). If a stop message is detected, the method 800 may stop the Signal Analyzer Process 800C. If a disarm message is detected, the method 800 may loop back to wait for a new message or new user input (844). If a Start Pulse is detected, the method 800 may continue with outputting the detection of the Start Pulse to the Application Main Process 800A of the computing device 201 (855). The method 800 may continue with the processing logic waiting for newly acquired data (e.g., process and display data) from the Spectrum Analyzer Process 800D (856). When received, the method 800 may continue with sending the processed acquired data to processing at block 855 (857).

In Pulse Detect mode, in one embodiment, the IQ data may be continuously acquired and processed (amplitude demodulation) with zero dead time. The IQ bandwidth may be fixed at 250 kHz (or other appropriate frequency), which is the maximum for the Sound Hound analyzer. This mode may be used to detect RF pulses that meet specific criteria as defined by the following controls: PW Hi Limit, PW Low Limit, Trig Level, and Trig Window. Pulse Detect mode may be used to detect the Start Pulse but may be used to examine pulses on the RF input as well. After a Start Pulse is detected, the graph is automatically switched to the Scenario Graph. In one embodiment, the user may manually select the signal analyzer of the signal analyzer circuit 250 to view the Start Pulse. The parameters relevant to Pulse Detect mode are discussed below.

(1) Center Freq/Ref Level: These parameters are set automatically during Start Pulse detection. These parameters may be changed when the Scenario is running to examine RF Input pulses.

(2) PW Hi Limit/PW Low Limit: These values may set the upper and lower limits for a qualified pulse and are loaded automatically during Start Pulse detection.

(3) Trig Level: The power level in dBm through which the RF pulse must transition. This is set automatically during Start Pulse detection. This level can be changed by clicking on the cursor tool on the graph palette and using the mouse to drag.

(4) Trig Window: The hysteresis in dB that is applied to the Trig Level. For a valid trigger, the RF level transitioned from:

(1) Trig Level−Trig Window TO Trig Level+Trig Window.

(2) The default value is 3.0 dB and contained in the User.cfg file.

Figure 8D:
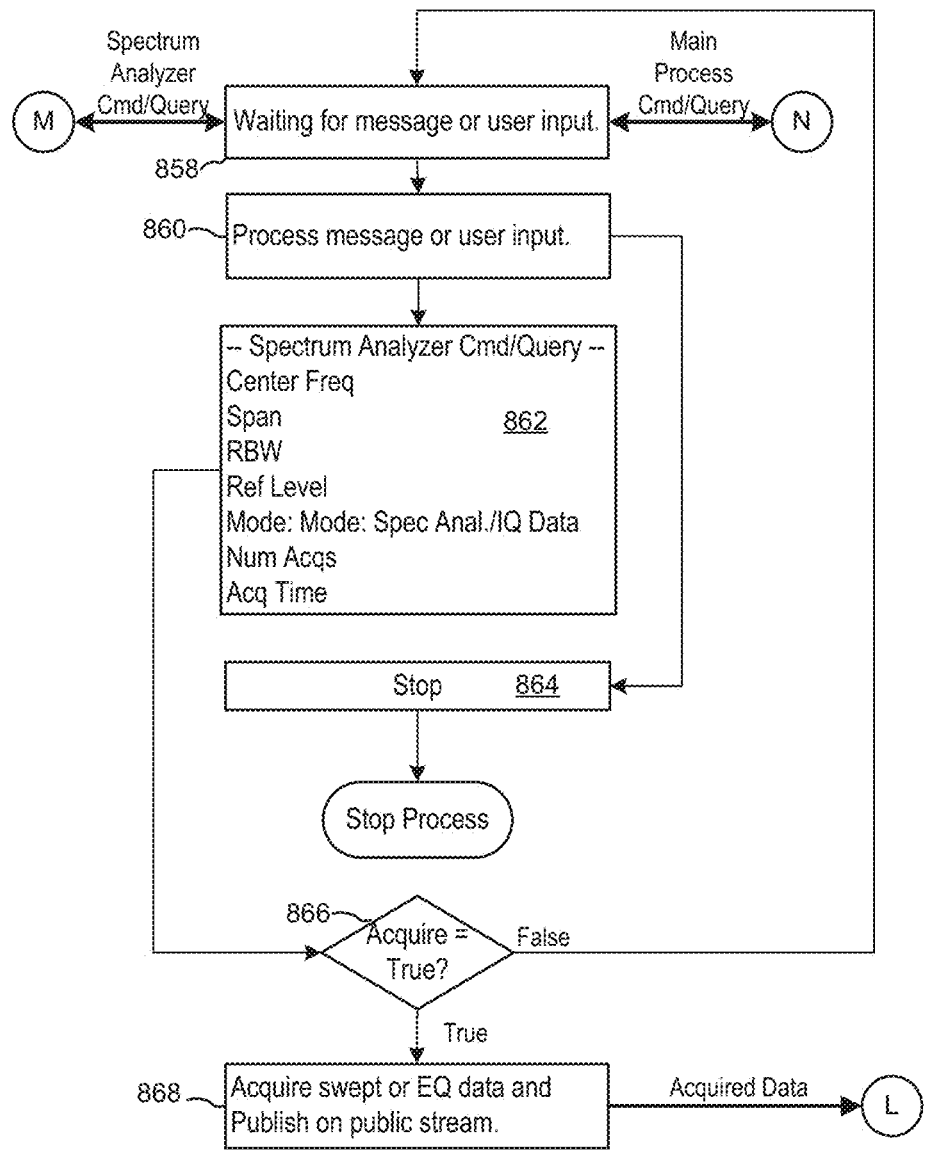

With reference to FIG. 8D, the Spectrum Analyzer Process 800D, the method 800 may continue with the processing logic waiting for a message or user input impacting the spectrum analyzer of the signal analyzer circuit 250 (858). The user input may include a spectrum analyzer command or query from the Signal Analyzer Process 800C (FIG. 8C) or a Main Process Command or Query from the Main Application Process 800A (FIG. 8A). The method 800 may continue with the processing logic processing the message or the user input (860). This processing may include executing a spectrum analyzer command or query to perform swept tune analyzer steps using the following parameters: center frequency, span, RBW, reference level, mode (whether spectrum analyzer or IQ data), number of acquisitions, and acquisition time (862). The method 800 may alternatively continue to stop the process in response to receipt of a stop message (864), such as when the user selects a stop button on the user interface or at the end of a scenario.

With continued reference to the Spectrum Analyzer Process 800D, the method 800 may continue with the processing device determining whether data has been acquired from the swept tune processing (866). If acquire equals false, the method 800 may loop back to block 858 and continue waiting for an input message or user input directed the spectrum analyzer of the signal analyzer circuit 250 (858). If acquire equal true, the method 800 may continue with the processing device acquiring swept or equalizer (EQ) data and publish the results on the public stream, e.g., sending the swept and/or EQ data to the Signal Analyzer Process 800C.

Figure 8E:
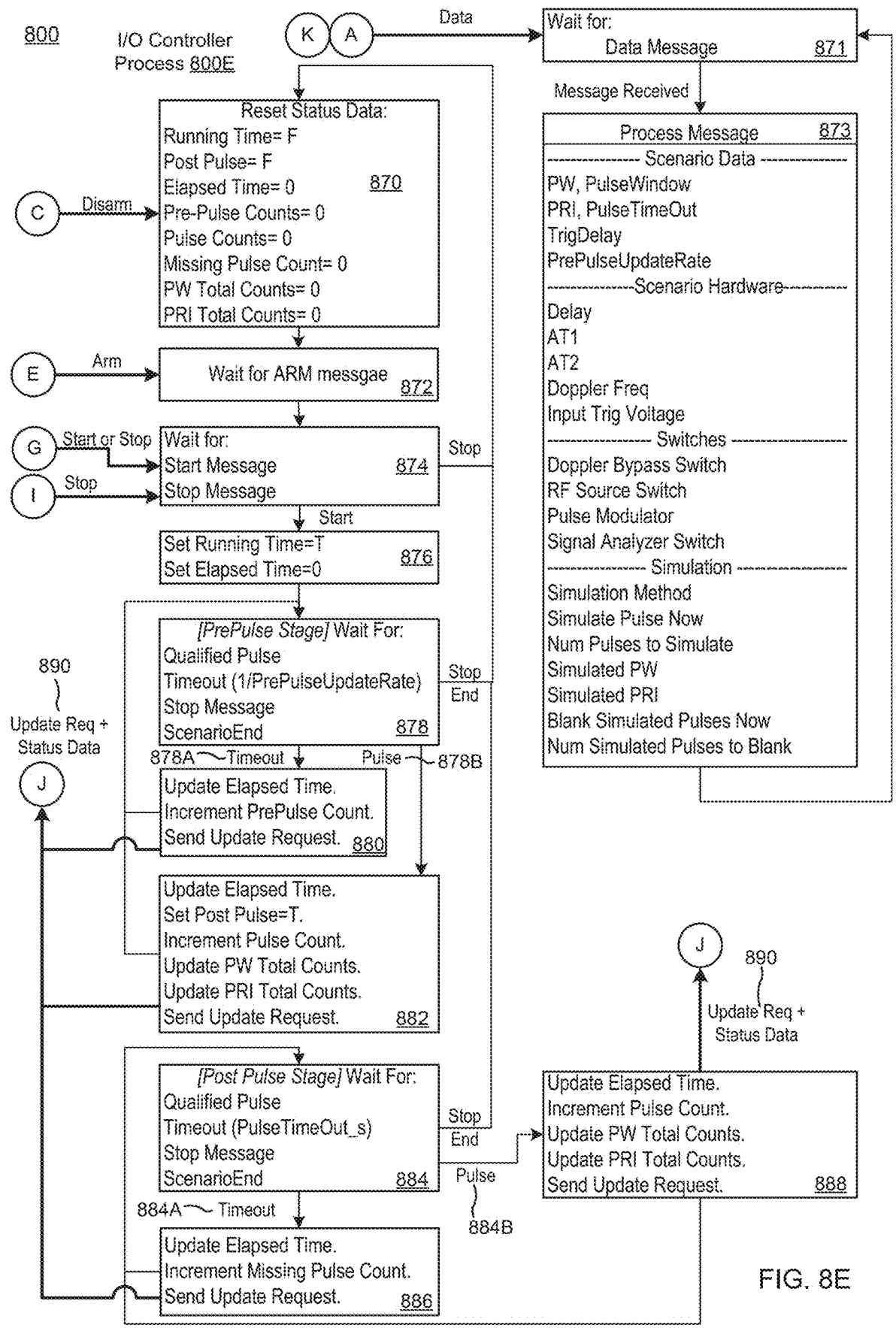

With reference to FIG. 8E, the I/O Controller Process 800E, the programmable I/O controller 240 may execute a number functions to properly time a test scenario based on messages received from the Main Application Process 800A of the computing device 201, as introduced and explained with reference to FIG. 7. In parallel with receipt of scenario messages, the method 800 may continue with waiting for one or more data message (in data word format) from the Main Application Process 800A (871). When received, the method 800 may continue with the processing logic processing the data word(s), to include values for updating scenario data, scenario hardware, switches, and simulation, as illustrated (873). These values will be used to run the test scenario on the PPR circuitry of the radar test system 200 according to a customized test scenario that has been preprogrammed into the computing device 201 and for which the programmable I/O controller 800E may be continuously updated.

More specifically, the method 800 may continue with the processing logic of the programmable I/O controller 240 performing the following exemplary functions. For example, the method 800 may continue with the processing logic resetting status data values related to timing of RF pulses received on a RF signal from the radar system under test in response to receipt of a disarm message (870). These status data values may include values for a running time, a post pulse time, an elapsed time, pre-pulse counts, pulse counts, missing pulse count, pulse width total counts, and PRI total counts, although other or different ones are envisioned. The illustrated values may be the reset values in one implementation.

The method 800 may continue with the processing logic waiting for an arm message (872). Upon arming (in response to receipt of an arm message), the method 800 may continue with the processing logic waiting for a start message or a stop message (874). The method 800 may continue, in response to receipt of a stop message, with looping back to block 870. The method 800 alternatively may continue, in response to receipt of a start message, to start the test scenario by setting running time equal to the current time (T) and the elapsed time equal to zero (876).

With continued reference to the I/O Controller Process 800E, the method 800 may continue with the processing logic, within a pre-pulse stage, waiting for detecting one of the following: a first qualified pulse; reaching the end of a timeout period; a stop message; or the end of the test scenario (878). In response to receipt of a stop message or an end message, the method 800 may loop back to reset status data and start over (870). In response to reaching the end of the timeout period (based on pre-pulse update rate) before receipt of a qualified RF pulse (878A), the method 800 may continue with the processing logic updating the elapsed time and incrementing the pre-pulse counts (880). The method 800 may continue with the processing logic sending values for the elapsed time and pre-pulse counts to the radar test computing system, and sending an update request to the radar test computing system to request values of a frequency shift, a signal delay, and a signal attenuation for the first qualified pulse anticipated within a subsequent timeout period (890).

In response to detecting a first qualified pulse (878B), the method 800 may continue with the processing logic updating the following status data values as follows: update elapsed time; set post pulse time to T, increment the pulse count, and update PW total counts and PRI total counts (882). The method 800 may continue with the processing logic sending the status data values to the radar test computing system, and sending an update request to the radar test computing system to request values of a second frequency shift, a second signal delay, and a second signal attenuation for a second qualified pulse anticipated within a second subsequent timeout period (890).

With continued reference to the I/O Controller Process 800E, the method 800 may continue with the processing logic waiting, during a post-pulse stage, detection of the second qualified pulse, of the end of a timeout period (PulseTimeOut_s), of receipt of a stop message, or of the end of the test scenario (882). In response to receipt of the stop message or detecting the end of the test scenario, the method 800 may loop back to reset status data and start over (870). In response to reaching the end of the timeout period before receiving the second qualified pulse (884A), the method 800 may continue with the processing logic updating the value for elapsed time and incrementing the value for the missing pulse counts (886). The method 800 may continue with the processing logic sending the values for the elapsed time and the missing pulse counts to the radar test computing system, and sending an update request to the radar test computing system to request values of a third frequency shift, a third signal delay, and a third signal attenuation for an third qualified pulse anticipated within a third subsequent timeout period (890).

In response detection of a receipt of the second qualified RF pulse (884B), the method 800 may continue with the processing logic updating the following status data values as follows: update elapsed time; increment the value for the pulse counts; update the value for the pulse width total counts; update the value for the PRI total counts (888). The method 800 may continue with the processing logic sending the updated status data values to the radar test computing system, and sending an update request to the radar test computing system to request values of a third frequency shift, a third signal delay, and a third signal attenuation for a third qualified pulse anticipated within a third subsequent timeout period (890). In this way, once the programmable I/O controller 240 has entered into the post-pulse stage, the method 800 may continue on performing updates and sending data status values and update requests depending on whether a timeout period has been reached or a next qualified pulse has been received in time (FIG. 7).

Figure 9:
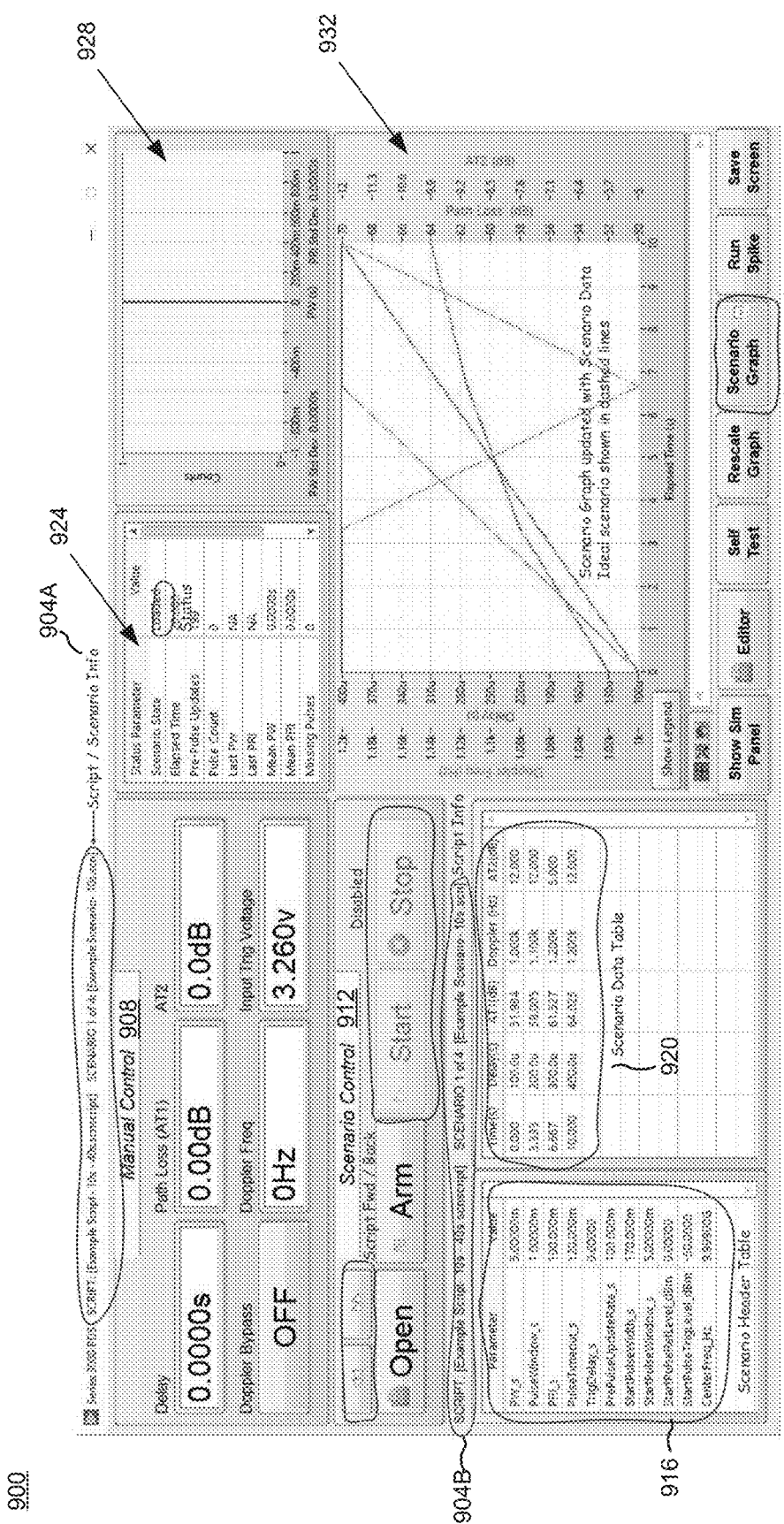
FIG. 9 is an image of a control status user interface for opening a test scenario or script of the computing system of the radar test system of FIG. 2B, according to embodiments.

FIG. 9 is an image of a control status user interface 900 for opening a test scenario or script of the computing system of the radar test system 200 of FIG. 2B, according to embodiments. The control status user interface 900 may be a screen or window of the overall user interface 201D (FIG. 2A), and may include a number of different sections illustrating information related to the test scenario, and status data values as received from the programmable I/O controller 240.

In one embodiment, the control status user interface 900 includes a database title 904A that includes script and scenario information and a script title 904B with the current script information. The control status user interface 900 may further include a manual control section 908, a scenario control section 912, a scenario header table 916, a scenario data table 920, a status parameter table 924, a status parameter plot 928, and a scenario plot 932. In various embodiments, the manual control section 908 enables a bypass of any script or scenario and to manually input values for delay, path loss (signal attenuation at the first signal attenuator 216), optional attenuation at the second signal attenuator 238, Doppler bypass selection, Doppler frequency shift, and input trigger voltage for qualified pulses, which is set at a default value of 3.26 volts, but can be adjusted manually or programmed differently within a scenario.

With further reference to FIG. 9, the scenario control section 912 may provide interactive selection indicators (e.g., buttons, drop-down menus, or the like) available to a user to open a script file containing one or more scenarios, to arm a current scenarios, to browse forward or backwards through a script file containing multiple scenarios, and to start or stop a current scenario. The forward and back buttons and the start and stop buttons may be disabled because a scenario or script containing multiple scenarios has not yet been armed.

In embodiments, the scenario header table 916 may include current values of the header information (FIG. 8B) during the scenario. The scenario data table 920 may include values for times, delays, signal attenuation (at the first signal attenuator 216), Doppler frequency shifts, and optional attenuation at the second signal attenuator 238. The status parameter table 924 may include statues of various data status values or statistics-based values based on the data status values, examples of which are illustrated. The status parameter plot 928 may facilitate plotting one or more of the values in the status parameter table 924 for better visual tracking of selected status parameters. The scenario plot 932 may graph ideal values in dashed lines for the scenario status data within the scenario data table 920.

Figure 10:
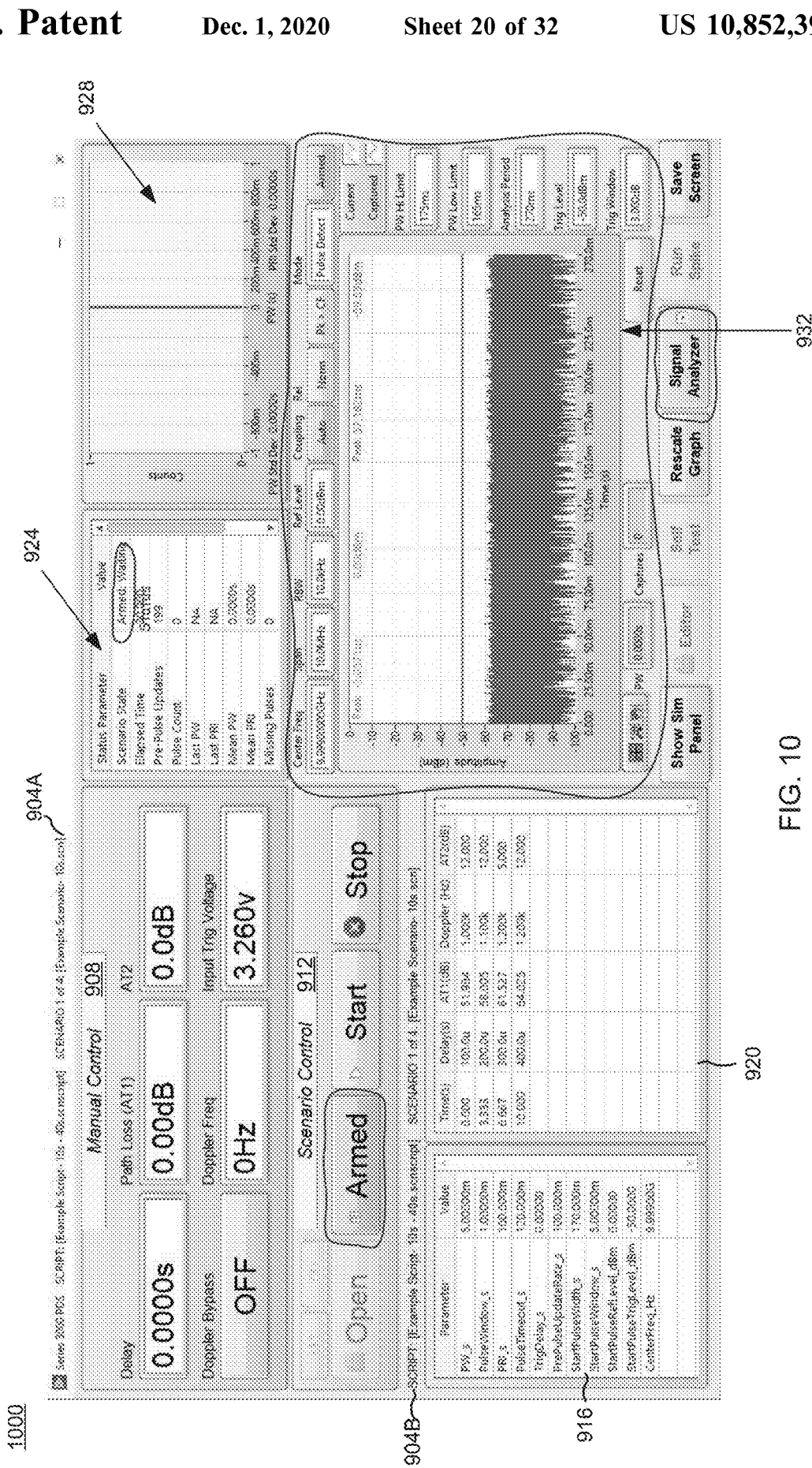
FIG. 10 is a screenshot of a test scenario armed screen of the control status user interface of FIG. 9, according to embodiments.

FIG. 10 is a screenshot of a test scenario armed screen 1000 of the control status user interface of FIG. 9, according to embodiments. The control status user interface 900 of FIG. 9 now illustrates the status of the buttons in the scenario control section 912 now that the Armed button has been selected. Note also that the a signal analyzer plot 932 is illustrated so that a user may monitor for a Start Pulse coming from the signal analyzer circuit 250. In alternative embodiments, this plot can instead be a plot illustrating the incoming RF signal (J1 input) or of the RF start trigger line 202 (J5 input), which are at least two other ways a scenario may be triggered after arming.

When the arm button is selected, the current sequence may perform the following actions. The control values and states are changed as shown in Table 1.

TABLE 1

| Control Name(s) | State/Value | Enabled State |
|---|---|---|
| Delay, Path Loss (AT1) AT2, Doppler Freq | 0.00 | Disabled |
| Doppler Bypass | OFF | Enabled |
| Open | NA | Disabled |
| Arm | Armed | Disabled |
| Start | NA | Enabled |
| Stop | NA | Enabled |
| Graph Selector | Signal Analyzer | Enabled |
| Graph | Signal Analyzer | Enabled |
| RF Source Switch | J1 Input | Enabled |
| Signal Analyzer Switch | Output | Enabled |
| Editor | NA | Disabled |
| Run Spike | NA | Disabled |

Furthermore, the user interface for the signal analyzer circuit 250 may be displayed and the Signal Hound may be set up to detect a Start Pulse injected on J3 Optical In.

Criteria for the Start Pulse may be set up automatically based on the values in the scenario header. The Status Table: Scenario State may be changed to "Armed: Waiting." The I/O Controller Process 800E (FIG. 8E) may be armed and begins waiting for a Start message. The scenario may stay in this armed state indefinitely until one of the following occurs: (1) Start Button is pressed, and the scenario runs; (2) Qualified Start Pulse is detected, and scenario runs; (3) Stop Button is pressed and scenario/script aborts and waits to be armed; and (4) Close is pressed, and all processes are shut down and application terminates.

An "Armed" scenario may be Started in one of several ways: (1) the Start Button is pressed; or (2) a qualified Start Pulse is detected on the signal analyzer; or (3) a Start Pulse is detected on the RF input signal (J1 input); or (4) a Start Pulse is detected on the RF start trigger line 202. Once a Scenario has been started, the following actions may occur, beginning with the changing control values and states as shown in Table 2.

TABLE 2

| Control Name(s) | State/Value | Enabled State |
|---|---|---|
| Delay, Path Loss (AT1) AT2, Doppler Freq | Updated by actual Scenario Values | Disabled |
| Arm | Armed | Disabled |
| Start | Running | Disabled |
| Stop | NA | Enabled |
| Graph Selector | Scenario Graph | Enabled |
| Graph | Scenario Graph | Enabled |
| Signal Analyzer Switch | Input | Enabled |

Figure 11:
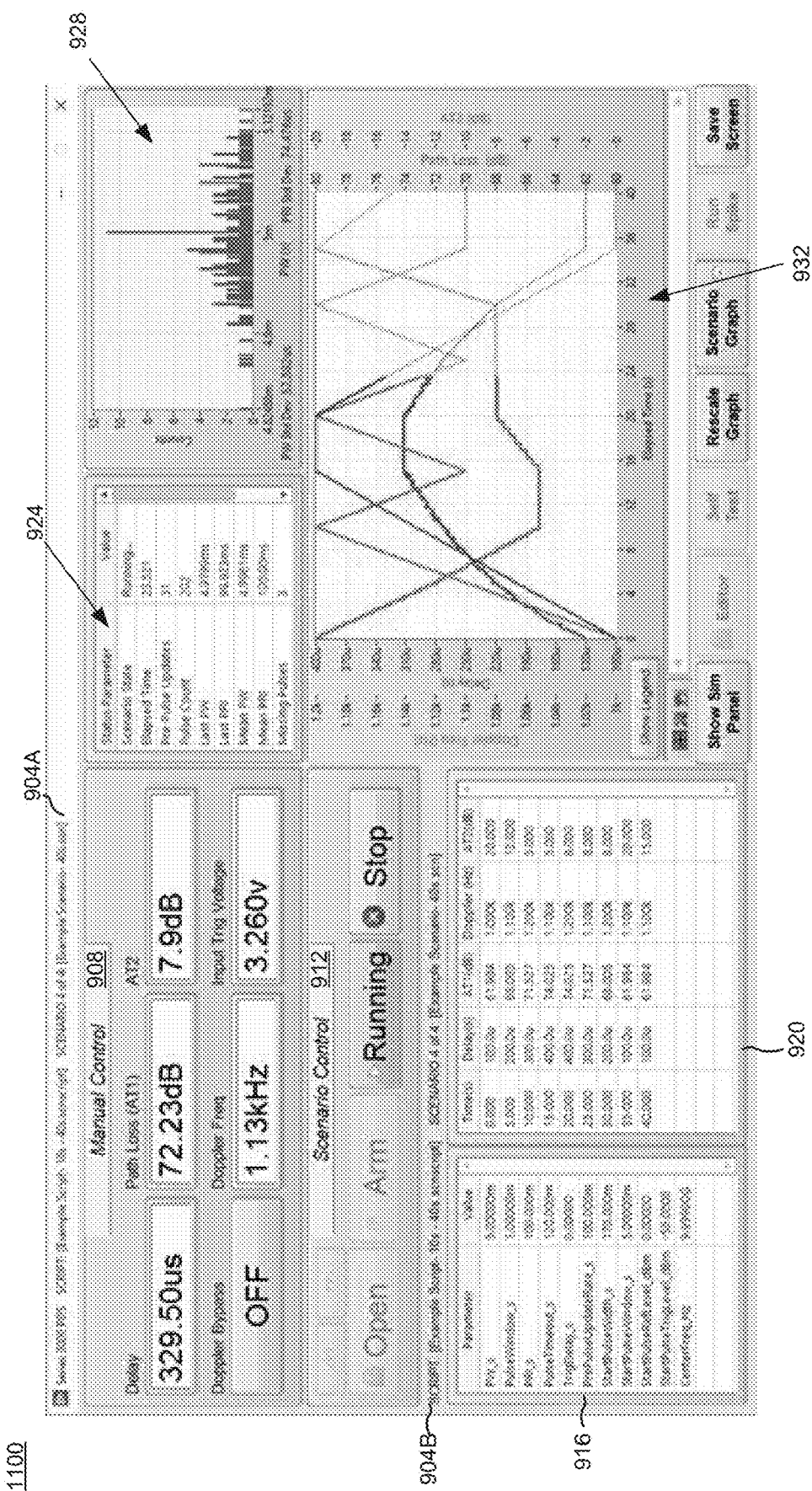
FIG. 11 is a screenshot of a running test scenario of the control status user interface of FIG. 9, according to embodiments.

Furthermore, a start message may be sent to the I/O Controller Process 800E. The programmable I/O controller 240 may begin waiting for a qualified RF pulse. Before the first qualified pulse is detected, the scenario values are automatically updated at the pre-pulse update rate. The log file is also created, and the scenario plots and controls are updated in real time. The actual values are plotted over the ideal values on the scenario plot 932, as illustrated in FIG. 11, which also illustrates updates, in real time, to the scenario data table 920 and the status parameter plot 928. As illustrated, the status parameter plot 928 includes a pulse histogram plot illustrating PW standard deviation and PRI standard deviation.

The scenario may run until one of the following events occur:

(1) The scenario runs to completion. When this occurs, the next scenario in the script may be loaded and armed automatically. If a script file is not running, then the current scenario is armed automatically. If the last scenario in the script ran to completion (e.g., 4 of 4), then the script may wrap to the first Scenario in the Script i.e. (1 of 4).

(2) The Stop button is pressed. When this occurs, the current scenario is terminated immediately, and data is written to the log file. The Script is not advanced to the next Scenario and automatic Arming may not occur.

(3) The application is closed. If the user attempts to close the application while a scenario is running, a confirmation prompt is displayed allowing the user to "Cancel" or "Save Log File and Exit."

Figure 12:
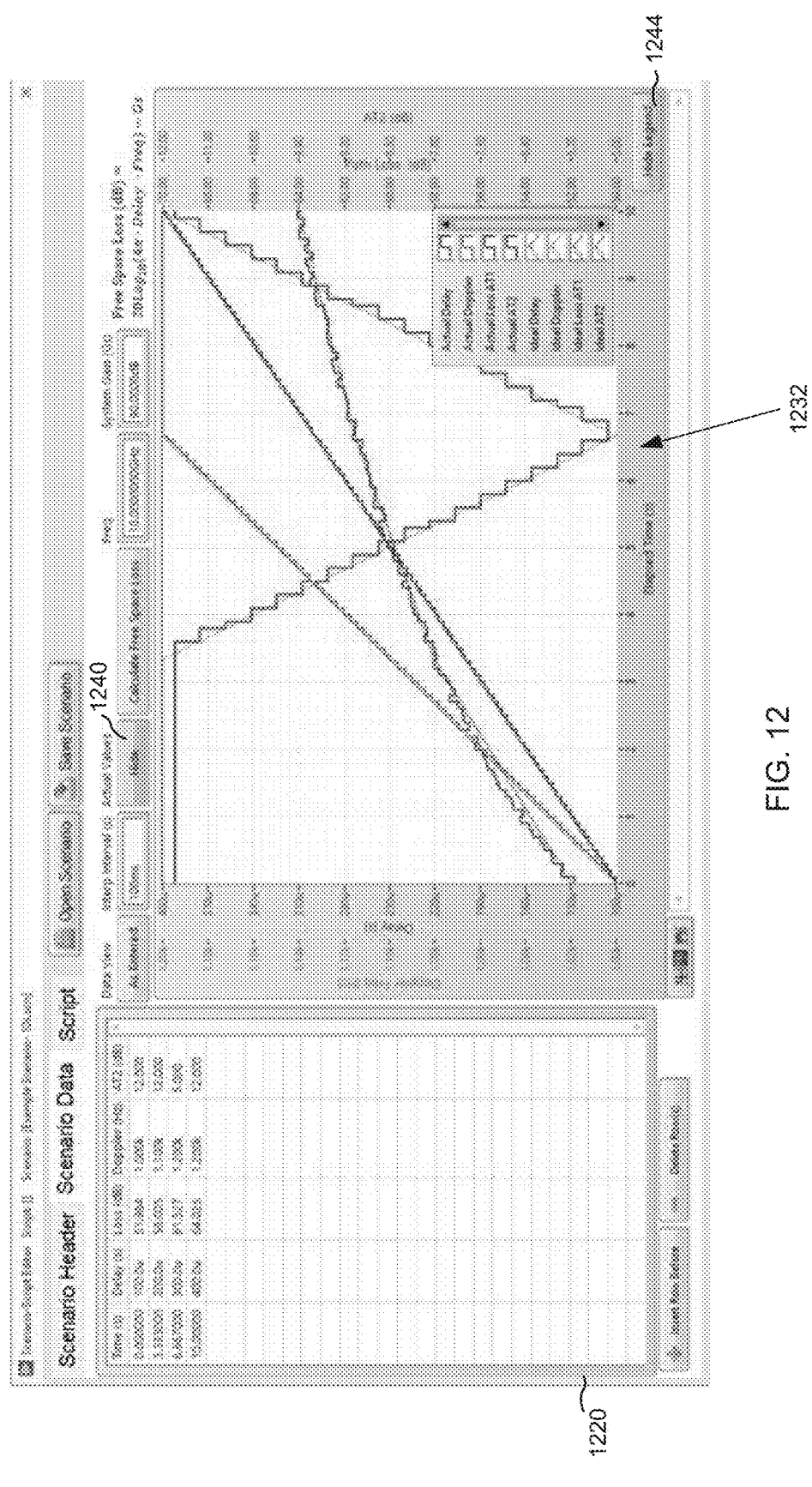
FIG. 12 is a screenshot of a scenario data tab of the control status user interface of FIG. 9 illustrating a scenario data table and a scenario plot with actual values of test scenario parameters, according to embodiments.

FIG. 12 is a screenshot of a scenario data tab 1200 of the control status user interface 900 of FIG. 9 illustrating a scenario data table 1220 and a scenario plot 1232 with actual values of test scenario parameters (e.g., values that resulted from running the test scenario with the radar system 10), according to embodiments. The scenario data tab 1200 further includes a Hide button 1240, selectable to hide the actual values, in which case the Hide button reads Actual Values. When hiding the actual values, the ideal values may be illustrated as in FIG. 9. The scenario data tab 1200 may further include a Show Legend 1244 tab, which is being shown, so now reads Hid Legend, indicating that the legend is selectively viewable.

Execution of the application 201B by the computing device 201 may further enable automated generation of a test scenario. A user may input some point along a proposed flight path for a target to be tested, which may be accepted as vectors (distance, time, and Doppler values, for example). The speed may be calculated based on the distance over time. The application 201B may then fill in the rest of the points using interpolation rules for free space loss, linear interpolation, and the like, to complete the scenario data that may be needed to run a full test scenario along that proposed flight path. Another way to do this may be to insert way point on a GPS-based electronic map, and then generate the values for the testing parameters that will be sent to the programmable I/O controller during radar system testing.

Figure 13:
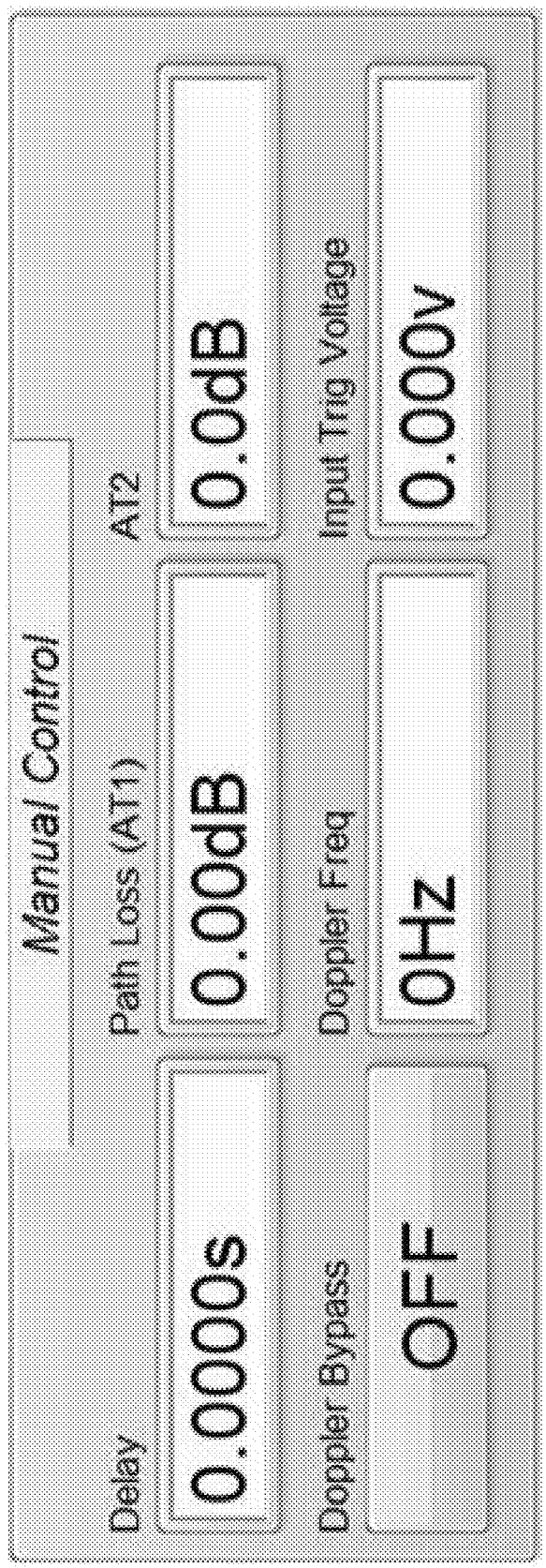
FIG. 13 is a screenshot of a manual control panel of the control status user interface of FIG. 9, according to embodiments.

FIG. 13 is a screenshot of a manual control panel 1300 of the control status user interface of FIG. 9, according to embodiments. When a test scenario is not running, the system's manual controls may be used to set values for delay, path loss (signal attenuation at the first signal attenuator 216, or AT1), optional attenuation at the second signal attenuator 238 (AT2), Doppler Bypass, Doppler frequency shift, and input trigger voltage (e.g., reference voltage for triggering qualified input pulses). When a scenario is running, these are controls that may be updated in real time reflect the actual applied values. These values that may be set manually, for fine tuning a test, which are now discussed in more detail.

Delay: Sets the delay to the closest available value. Delay values may be relative to the 0.0 s setting. The range is approximately Os to 1.2 ms with 300 ns resolution.

Path Loss (AT1): Sets the total Path Loss (dB) between the RF input (J1) and the optical output (J2) using pin diode attenuator AT1. Path Loss values are relative to the 0.00 dB setting. Path Loss is a function of the delay loss and AT1 loss. The range is approximately 0 db to 130 dB with 0.3 dB resolution. The loss at each delay settings varies considerably and therefore is determined in order to provide an accurate Path Loss simulation. The corrections for Loss versus Delay are contained in the file Delay Loss.data.

When setting Path Loss, the computing system 201 may first look up the loss contribution of the current Delay and then attempt to achieve the desired Path Loss by adjusting the signal attenuation of AT1. The closest achievable value to the desired value may be used. These rules apply under both Manual and Scenario control of Path Loss. The Path Loss is not to be lower than the loss contribution of the current Delay setting. If the Delay value is manually changed, the computing system 201 may attempt to maintain the Path Loss by using the closest achievable value.

Optional Attention (AT2): Adjusts the loss (dB) between the optical input (J3) and the RF output (J4) using pin diode attenuator AT2. Loss values are relative to the 0.00 dB setting. AT2 loss may not be considered in Path Loss (AT1).

Doppler Bypass: This control inserts or bypasses the Doppler simulation circuit 210 in the RF input signal path. When a scenario is run, the Doppler bypass is set automatically to "OFF."

Doppler Frequency Shift: This control sets the amount of carrier frequency offset produced by the Doppler simulation circuit 210, which was designed to operate over a range of ±50 kHz, but is operational to approximately ±200 kHz with degraded performance (e.g., reduced carrier and sideband suppression). The closest available frequency may be used and displayed. The frequency resolution is approximately ±1 Hz±0.1%.

Input Trigger Voltage: This is an analog voltage generated on the programmable I/O controller 240. It is the reference voltage for the comparator 270 in the pulse detection circuit 220 (FIGS. 2A-2B). The default voltage of 3.26V is optimal for a 0 dBm signal at J1, but may be adjusted. The default value may be changed by modifying the TriggerVoltage, which is an input parameter in System.cfg. The input trigger voltage may be adjusted if incoming RF pulses are not being reliably detected.

Figure 14:
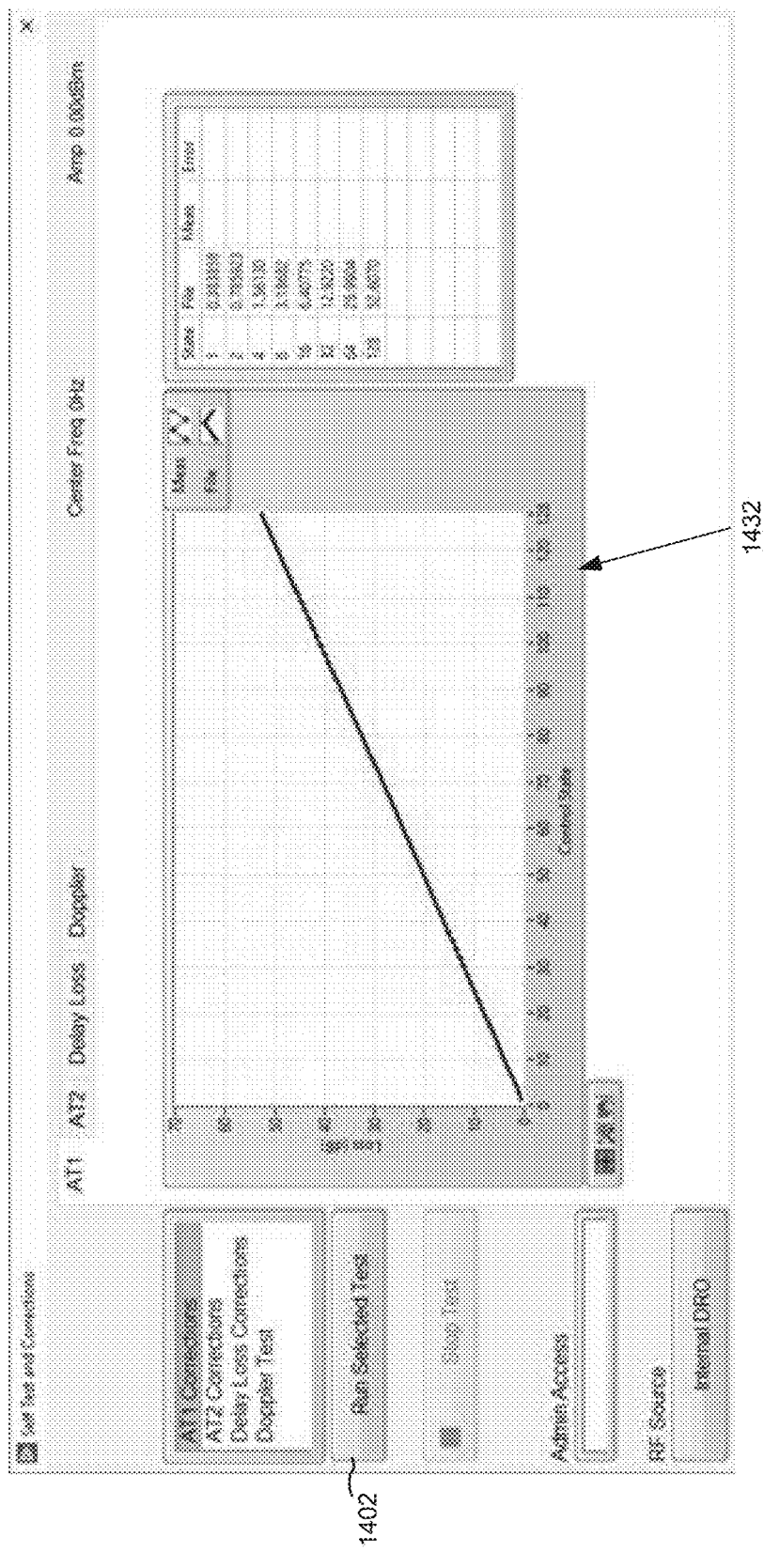
FIG. 14 is a screenshot of a self-test and corrections user interface of the computing system of the radar test system of FIG. 2B, according to embodiments.

FIG. 14 is a screenshot of a self-test and corrections user interface 1400 of the computing system of the radar test system 200 of FIG. 2B, according to embodiments. Upon connecting connectors J2 and J3 with a short optical jumper cable, a self-test may be run. The self-test and correction user interface 1400 illustrate a test plot 1432 that maps states against test values put through the radar test system 200. In various embodiments, the user interface 201D of the computing device 201 may include a selection option 1402 (like a button or a pull-down menu) to run a selected test. The results may be saved to storage disk to be referenced later.

Figure 15:
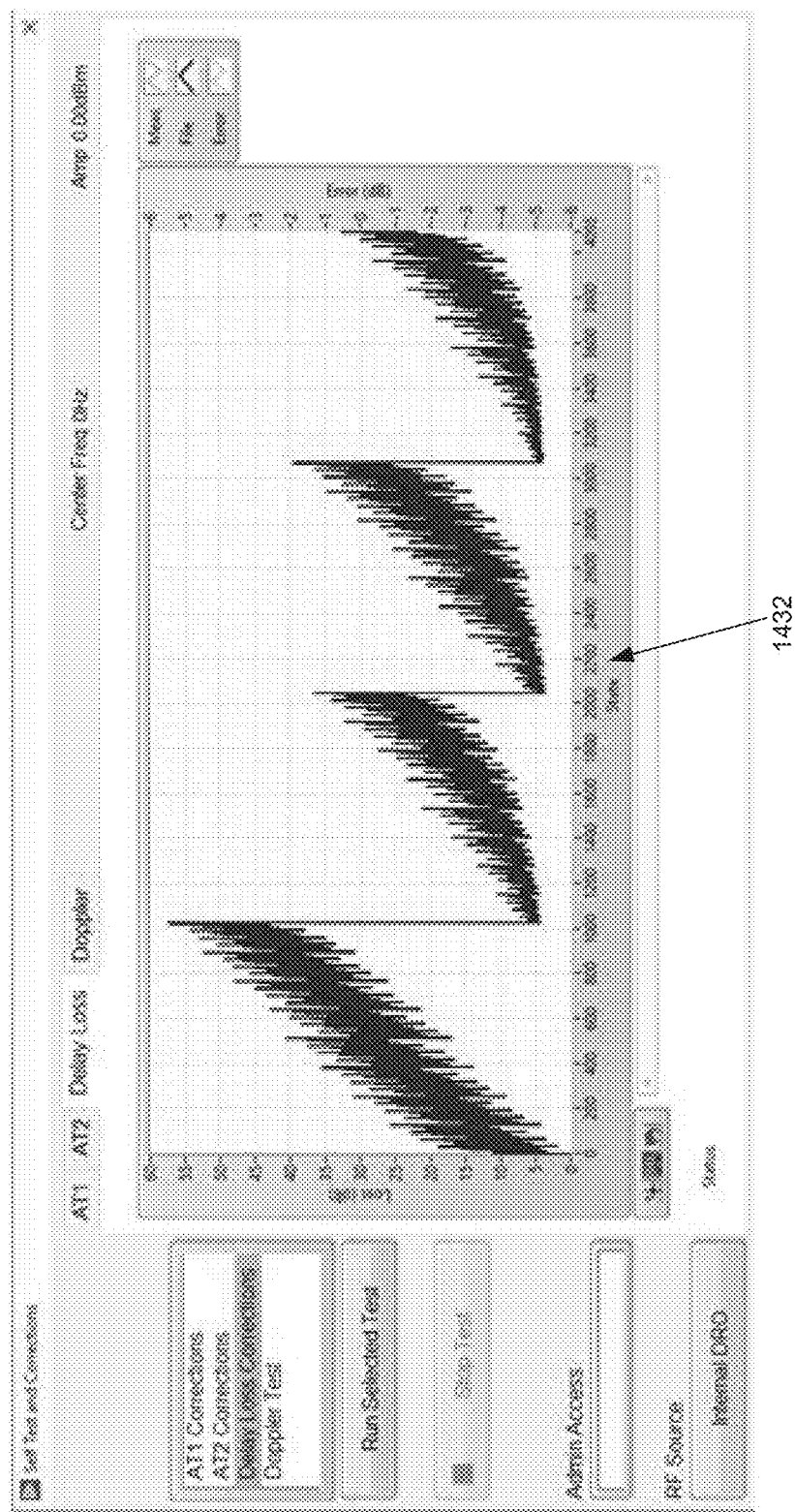
FIG. 15 is a screenshot of the self-test and corrections user interface of FIG. 14 for correcting propagation loss associated with multiple possible delay settings of the computing system of the high speed radar test system of FIG. 2B, according to embodiments.

FIG. 15 is a screenshot of the self-test and corrections user interface of FIG. 14 for correcting propagation loss associated with multiple possible delay settings of the computing system of the high speed radar test system of FIG. 2B, according to embodiments. The radar test system 200 may perform self-tests and self-recalibration using primarily the signal source 204, the pulse modulator 205, the programmable I/O controller 240, and the signal analyzer circuit 250. For example, values of parameters used for target simulation may be taken with the attenuation set to zero, and then again for a non-zero attenuation, and the results of the two may be compared. This may be performed for delay, Doppler frequency shifts, and the like.

AT1/AT2 Corrections: These corrections measure the loss of each attenuation cell of AT1 or AT2 using the signal source 204 and the signal analyzer circuit 250. The test plot 1432 of FIG. 15 displays the last saved measurements (from a file) and the current measurements.

Delay Loss Corrections: The variation in loss between delay settings can be large. In order to accurately set the Path Loss, the computing system 201 may determine the loss at each delay setting to generate a table of loss correction values. A delay loss correction algorithm measures the loss at each of the 4096 states of delay using the signal source 204 and the signal analyzer circuit 250. The test plot 1432 displays the last saved measurements (from a file) and the current measurements of loss correction values that may be used to adjust the signal attenuation of the first signal attenuator 216 (AT1) for different loss values.

Figure 16:
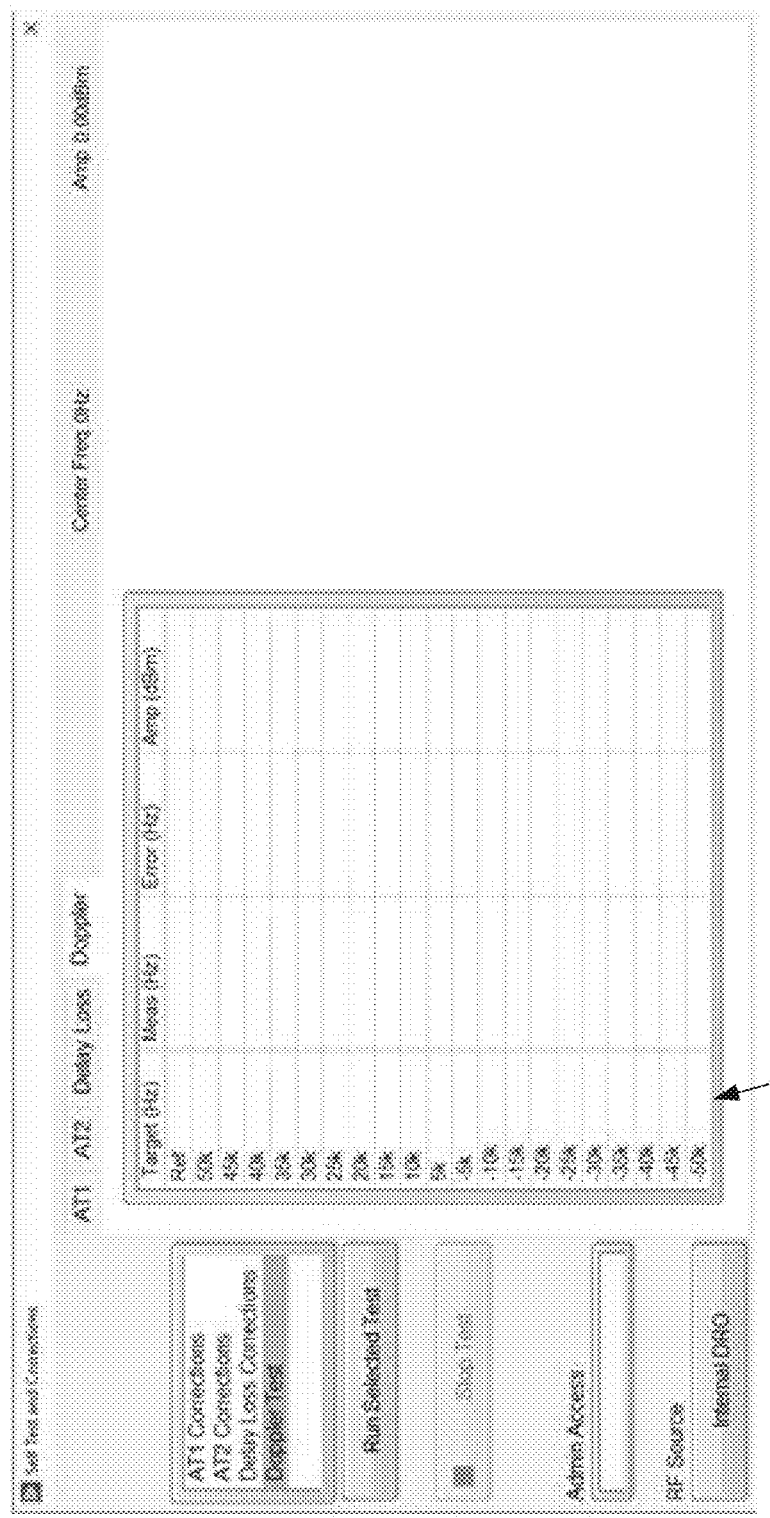
FIG. 16 is a screenshot of the self-test and corrections user interface for performing a Doppler self-test, according to embodiments.

FIG. 16 is a screenshot of the self-test and corrections user interface 1400 for performing a Doppler self-test, according to embodiments. The Doppler self-test may measure the Doppler frequency offset that is applied to the signal source 204 using the signal analyzer circuit 250. The test is performed with frequency shift (or offsets) from 50 kHz to −50 GHz in 5 kHz steps. This test may be for reference only and no data need be saved.

Figure 17:
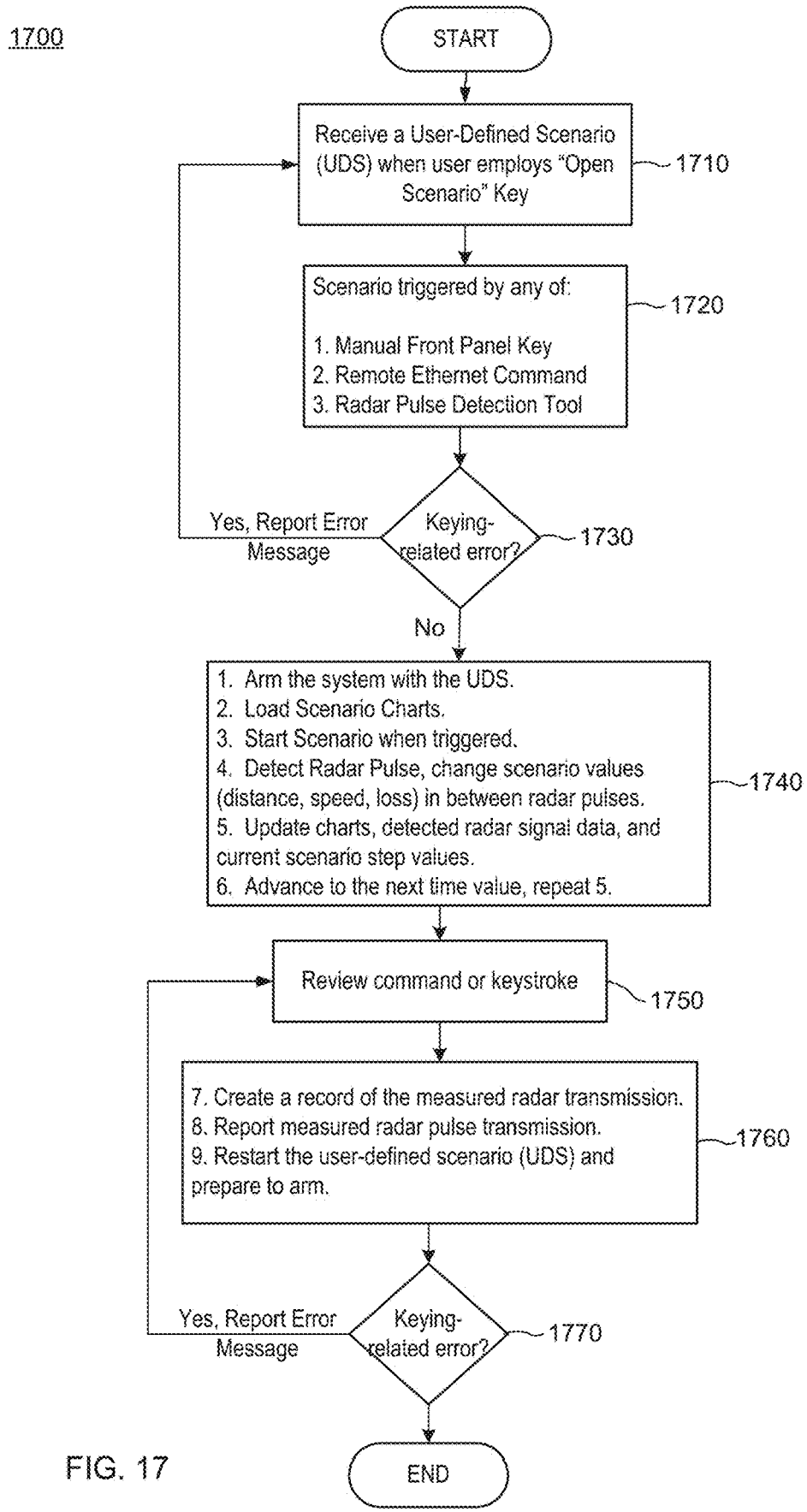
FIG. 17 illustrates a flow chart of a method for execution of a user-defined, moving target scenario with three possible triggering methods, according to an embodiment.

FIG. 17 illustrates a flow chart of a method 1700 for execution of a user-defined, moving target scenario with three possible triggering methods, according to an embodiment. The method 1700 may be performed by processing logic that may comprise hardware (e.g., circuitry, dedicated logic, programmable logic, microcode, etc.), software (such as instructions executed by processors 112), firmware (including microcode) or a combination thereof. For example, the processing logic may be located within the computing system 201 (or computer system 2200 illustrated in FIG. 22), the programmable I/O controller 240, the PPR circuitry for testing the radar system 10, or a combination thereof. Not all of these steps need be performed nor need the steps be performed in the same ordered as illustrated.

The method 1700 may begin with the processing logic receiving a user-defined scenario (UDS) when a user employs an open-scenario key (1710). The method 1700 may continue with the processing logic triggering a flight scenario according to one of: (1) a manual front panel key; (2) a remote Ethernet command; or (3) a radar pulse detection tool in conjunction with the pulse detection circuit 220 (1720). The method 1700 may continue with the processing logic determining whether a keying-related error has been detected (1730). If detected, the method 1700 may continue with the processing logic reporting the error message and looping back to block 1710. If not error has been detected, the method 1600 may continue with the processing logic executing multiple functions to perform the testing, including: (1) arming the test system 100 with the UDS; (2) loading scenario charts; (3) starting scenario when triggered; (4) detecting radar pulse and change scenario values (distance, speed, loss) in between radar pulses; (5) updating charts, detected radar signal data, and current scenario step values; and (6) advancing to the next time value, and repeating feature 5.

With further reference to FIG. 17, the method 1700 may continue with the processing logic reviewing command or keystrokes entered into the user interface 201D of the computing system 201 (1750). The method 1700 may continue with the processing logic performing the additional functions of: (7) creating a record of the measured radar transmission; (8) reporting measured radar pulse transmission; and (9) restarting the UDS and preparing to arm the system with the restarted UDS (1760). The method 1700 may continue with the processing logic determining whether a keying-related error has been detected (1770). If detected, the method 1700 may loop back to block 1750. If not detected, the method 1700 may end.

Figure 18:
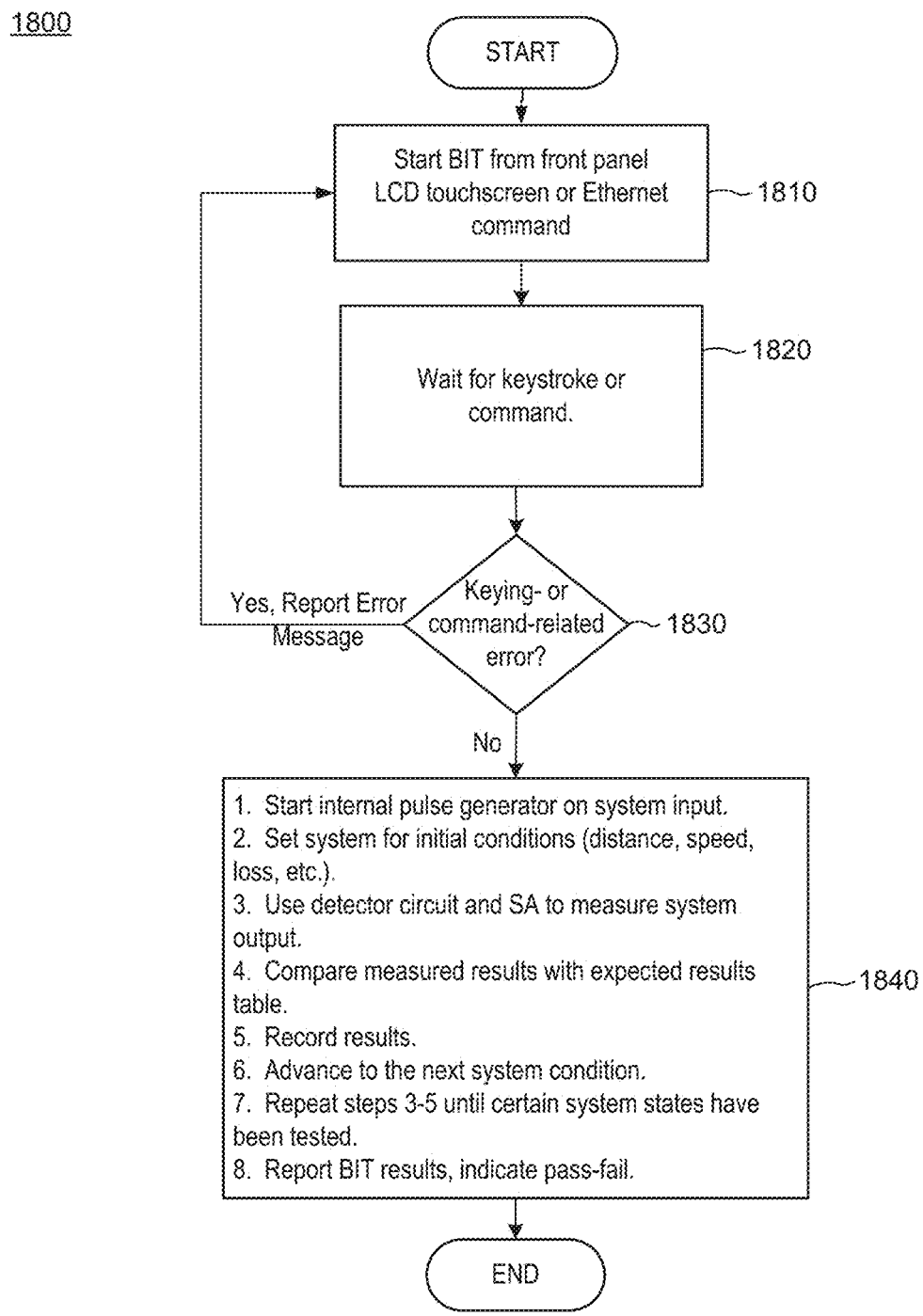
FIG. 18 illustrates a flow chart of a method for execution of built-in-self-tests (BIT) of the high speed radar system of FIG. 2A, according to embodiments.

FIG. 18 illustrates a flow chart of a method 1800 for execution of built-in-self-tests (BIT) of the radar system 200 of FIG. 2A, according to embodiments. The method 1800 may be performed by processing logic that may comprise hardware (e.g., circuitry, dedicated logic, programmable logic, microcode, etc.), software (such as instructions executed by processors 112), firmware (including microcode) or a combination thereof. For example, the processing logic may be located within the computing system 201 (or computer system 2200 illustrated in FIG. 22), the programmable I/O controller 240, the PPR circuitry for testing the radar system 10, or a combination thereof. Not all of these steps need be performed nor need the steps be performed in the same ordered as illustrated.

With further reference to FIG. 18, the method 1800 may begin with the processing logic starting the BIT from the front panel LCD touchscreen or based on receipt of an Ethernet command (1810). The method 1800 may continue with the processing logic waiting for a keystroke or command (1820). The method 1800 may continue with the processing logic determining whether a key-related or command-related error has been detected (1830). If detected, the method 1800 may continue with the processing logic reporting the error message (e.g., through the user interface 201D) (1830).

If no error is detected, the method 1800 may continue with the processing logic performing a number of functions, including but not limited to: (1) starting internal pulse generator upon detecting a qualified RF pulse at the RF input (J1, J3, or J5); (2) setting the radar test system 200 for initial conditions (distance, speed, loss, Doppler frequency shift, and the like); (3) using the pulse detection circuit 220 and the signal analyzer circuit 250 to measure the system output; (4) comparing measured results with expected results from the UDS table; (5) recording results; (6) advancing to the next system condition; (7) repeating steps 3-5 until certain system states have been tested; and (8) reporting BIT results, including to indicate whether the tests results are a pass or fail (1840).

Figure 19:
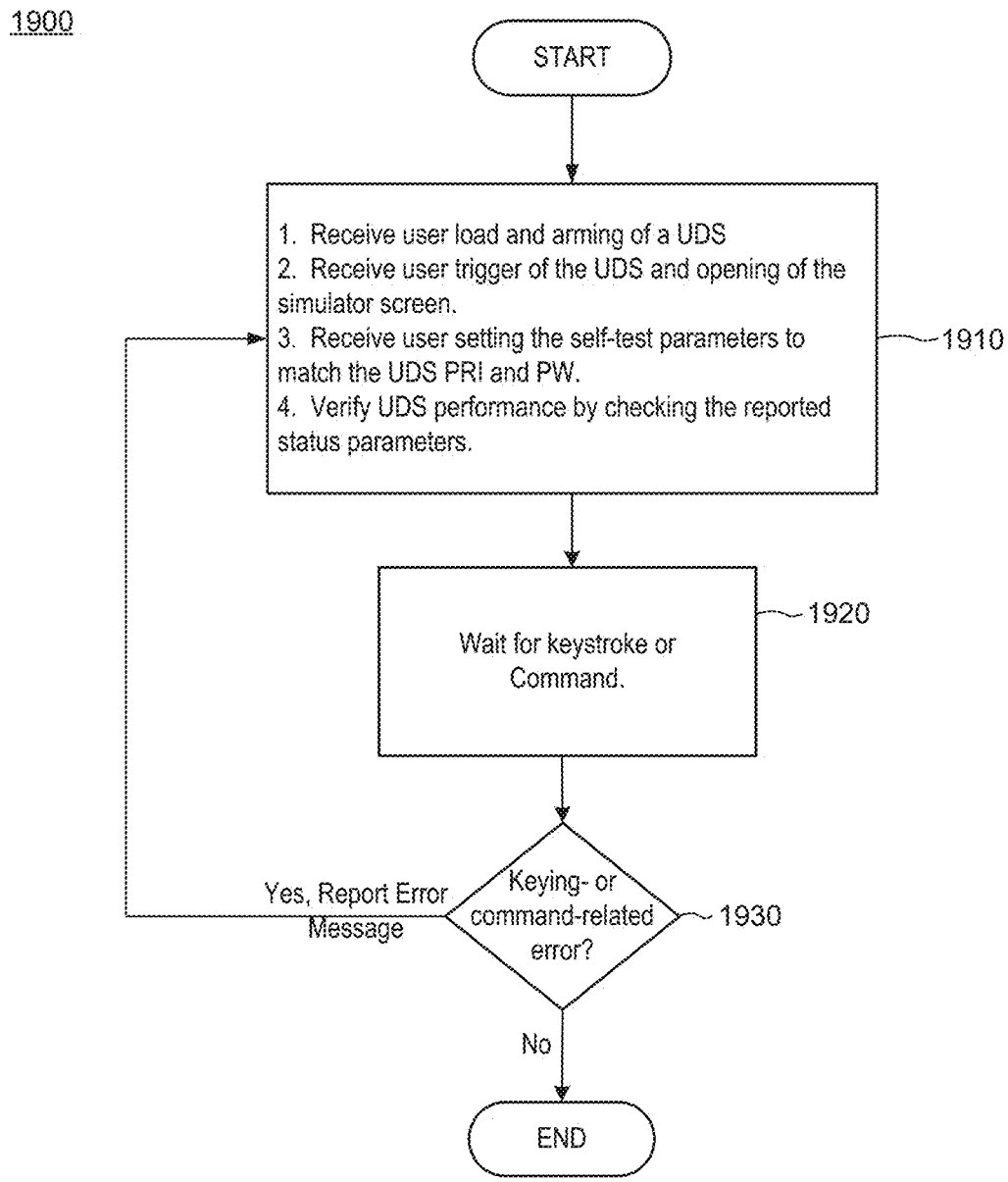
FIG. 19 illustrates a flow chart of a method for using the built-in-self-tests of the high speed radar system of FIG. 2A, according to additional embodiments.

FIG. 19 illustrates a flow chart of a method 1900 for using the built-in self-tests of the high speed radar system of FIG. 2A, according to additional embodiments. The method 1900 may be performed by processing logic that may comprise hardware (e.g., circuitry, dedicated logic, programmable logic, microcode, etc.), software (such as instructions executed by processors 112), firmware (including microcode) or a combination thereof. For example, the processing logic may be located within the computing system 201 (or computer system 2200 illustrated in FIG. 22), the programmable I/O controller 240, the PPR circuitry for testing the radar system 10, or a combination thereof. Not all of these steps need be performed nor need the steps be performed in the same ordered as illustrated.

With further reference to FIG. 19, the method 1900 may begin with the processing logic performing multiple functions in response to user inputs, including, but not limited to: (1) receiving user load and arming of a UDS; (2) receiving user trigger of the UDS and opening of the simulator screen; (3) receiving user setting the self-test parameters to match the user-defined system PRI and PW; and (4) verifying UDS performance by checking the reported status parameters (1910). The method 1900 may continue with the processing logic waiting for a keystroke or command (e.g., through the user interface 201D) (1920). The method 1900 may continue with the processing logic determining whether a keying-related or command-related error has been detected (1930). If detected, the method 1900 may report the error message (e.g., through the user interface 201D). If not detected, the method 1900 may end.

Figure 20:
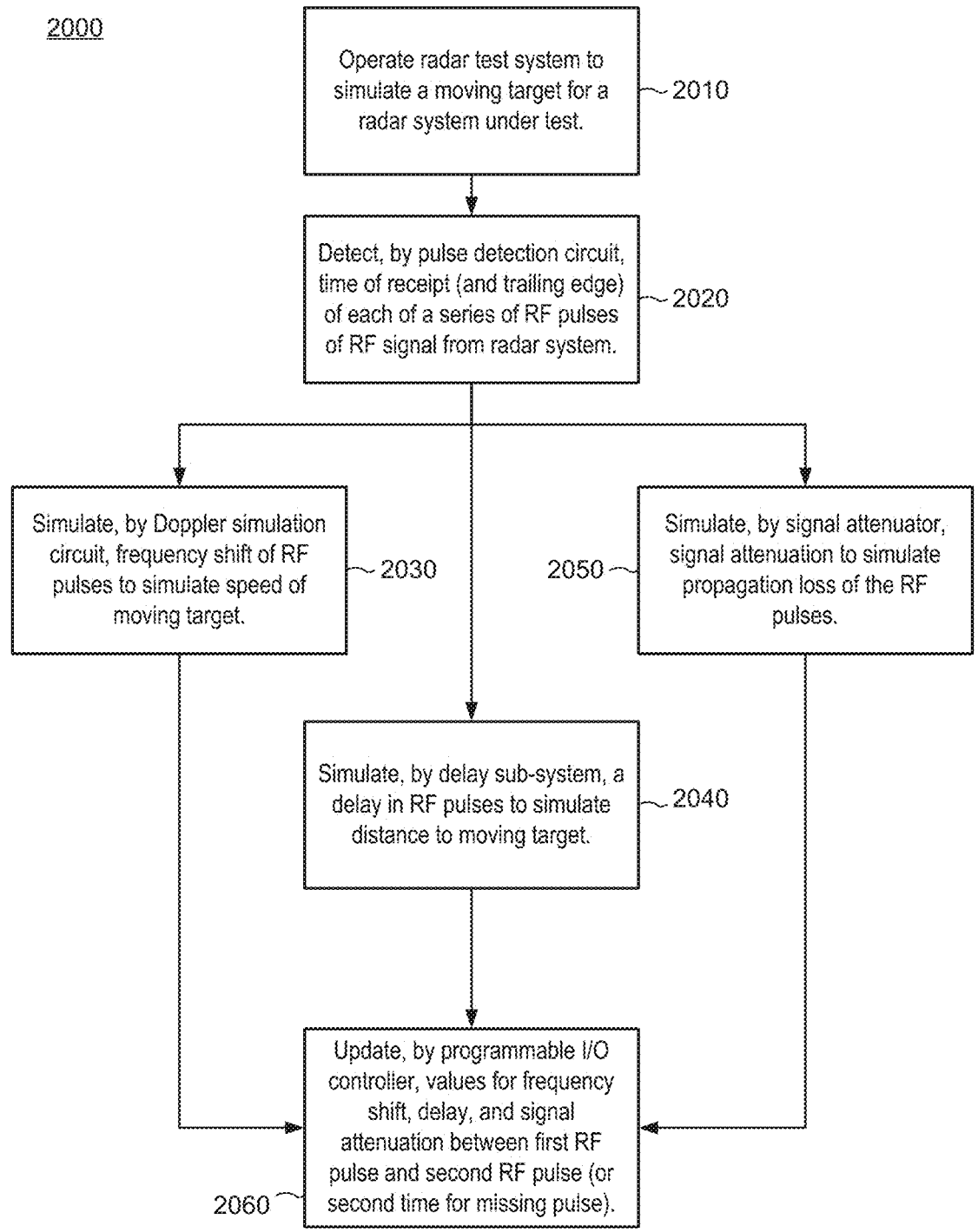
FIG. 20 is a method for operating a high speed radar test system to simulate a moving target a radar system under test, according to various embodiments.

FIG. 20 is a method for operating a high speed radar test system to simulate a moving target a radar system under test, according to various embodiments. The method 2000 may be performed by processing logic that may comprise hardware (e.g., circuitry, dedicated logic, programmable logic, microcode, etc.), software (such as instructions executed by processors 112), firmware (including microcode) or a combination thereof. For example, the processing logic may be located within the computing system 201 (or computer system 2200 illustrated in FIG. 22), the programmable I/O controller 240, the PPR circuitry for testing the radar system 10, or a combination thereof. Not all of these steps need be performed nor need the steps be performed in the same ordered as illustrated.

With further reference to FIG. 20, the method 2000 may begin with the processing logic operating a radar test system to simulate a moving target for a radar system under test, wherein the radar test system includes a Doppler simulation circuit, a signal delay sub-system, a pulse detection circuit, and a programmable input/output (I/O) controller (2010). The operating may include one or more of the following operations.

The method 2000 may include the pulse detection circuit 220 detecting time of receipt of each of a series of RF pulses received on an RF signal from the radar system, including a first time of receipt of a falling edge of a first RF pulse of the RF pulses, wherein the pulse detection circuit is coupled to an input of the radar test system (2020).

The method 2000 may include the Doppler simulation circuit simulating a frequency shift to the RF pulses to simulate speed of the moving target up to multiple times the speed of sound, wherein the Doppler simulation circuit is coupled to the input of the radar test system (2030). The method 2000 may include the delay sub-system simulating a delay in the RF pulses to simulate distance to the moving target, wherein the signal delay sub-system is coupled to the Doppler simulation circuit (2040). The method 2000 may include the signal attenuator simulating signal attenuation due to propagation loss of the RF pulses, wherein the signal attenuator is coupled to the signal delay sub-system and to the programmable I/O controller (2050).

The method 200 may continue with the programmable I/O controller updating a value of the frequency shift for the Doppler simulation circuit, of the signal attenuation for the signal attenuator, and of the delay for the signal delay sub-system during a time period between the first RF pulse and one of a second RF pulse or a second time at which the second RF pulse should have been received in case of a missing pulse, wherein the programmable I/O controller is coupled to the Doppler simulation circuit, to the signal delay sub-system, and to the pulse detection circuit (2060).

Figure 21:
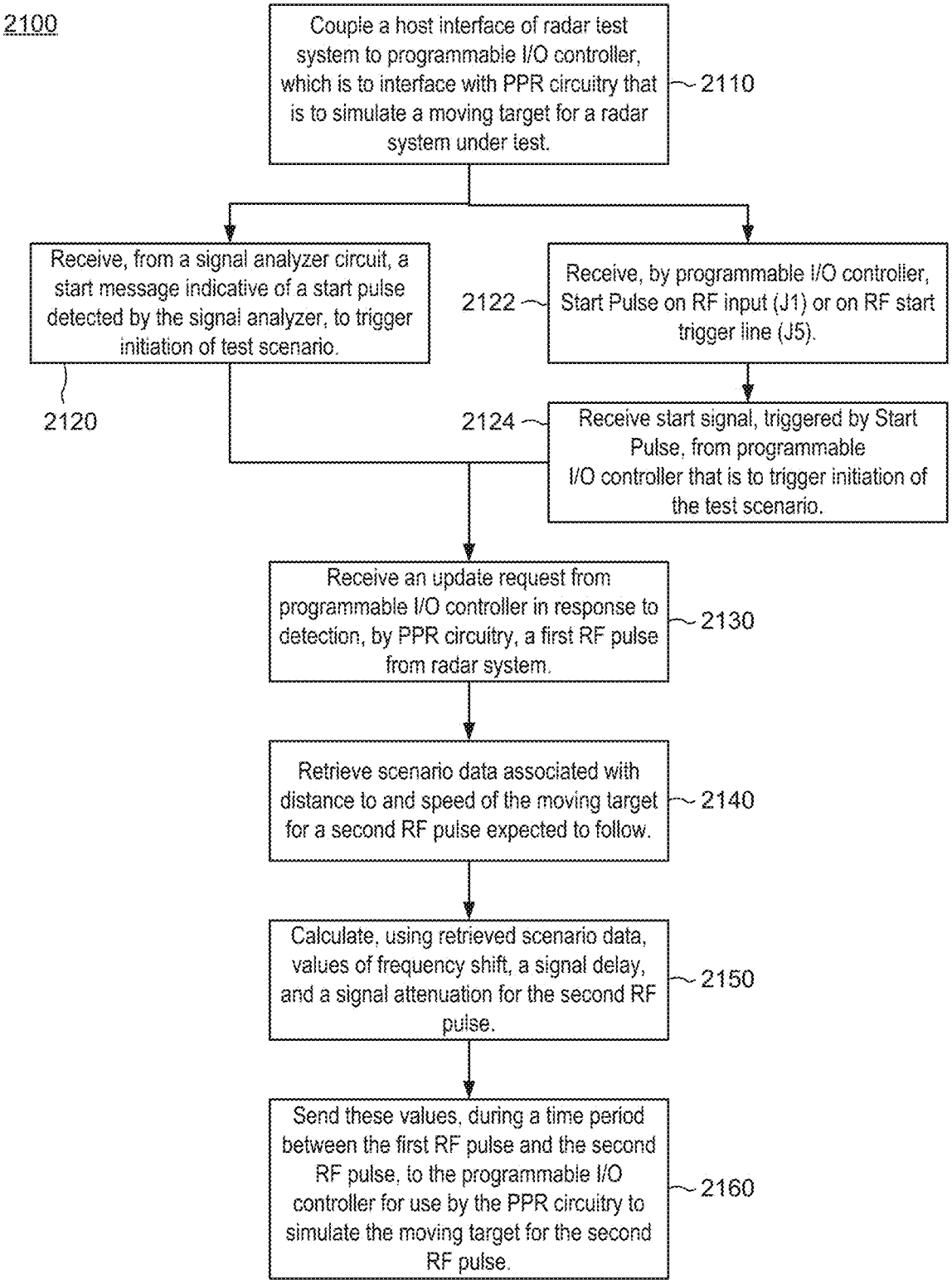
FIG. 21 is a flow chart of a method 2100 for running a test scenario by a radar test computing system to conduct a test of a radar system, according to an embodiment.

FIG. 21 is a flow chart of a method 2100 for running a test scenario by a radar test computing system to conduct a test of a radar system, according to an embodiment. The method 2100 may be performed by processing logic that may comprise hardware (e.g., circuitry, dedicated logic, programmable logic, microcode, etc.), software (such as instructions executed by processors 112), firmware (including microcode) or a combination thereof. For example, the processing logic may be located within the computing system 201 (or computer system 2200 illustrated in FIG. 22), the programmable I/O controller 240, the PPR circuitry for testing the radar system 10, or a combination thereof. Not all of these steps need be performed nor need the steps be performed in the same ordered as illustrated.

With reference to FIG. 21, the method 2100 may begin with the processing logic coupling the host interface to the programmable I/O controller, where the programmable I/O controller is to interface with propagation path replicator (PPR) circuitry that is to simulate a moving target for a radar system under test (2110). The method 2100 may branch to one of two different paths, the first for which the method 2100 may continue with the processing logic receiving, from a signal analyzer circuit, a start message indicative of a start pulse detected by the signal analyzer circuit, which is coupled to the radar test computing system and to the PPR circuitry, wherein the start pulse is to trigger initiation of a test scenario (2120). The method 2100 may alternatively continue along a second path with the processing logic of the programmable I/O controller receiving a Start Pulse on the RF input (on J1) or on the RF start trigger line (J5) (2122). The method 2100 may continue on the second path with the processing logic receiving a start signal, triggered by the Start Pulse, from the programmable I/O controller that is to trigger initiation of the test scenario (2124).

With continued referenced to FIG. 21, the method 2100 may continue with the processing logic receiving an update request from the programmable I/O controller in response to detection, by the PPR circuitry, of a first radio frequency (RF) pulse on a RF signal received from the radar system (2130). The method 2100 may continue with the processing logic retrieving, from a storage disk, scenario data associated with distance to and speed of the moving target for a second RF pulse expected to follow the first RF pulse (2140). The method 2100 may continue with the processing logic calculating values of a frequency shift, a signal delay, and a signal attenuation for the second RF pulse (2150). The method 2100 may continue with the processing logic sending, during a time period between the first RF pulse and the second RF pulse, the values of the frequency shift, the signal delay, and the signal attenuation to the programmable I/O controller for use by the PPR circuitry to simulate the moving target for the second RF pulse (2160).

Figure 22:
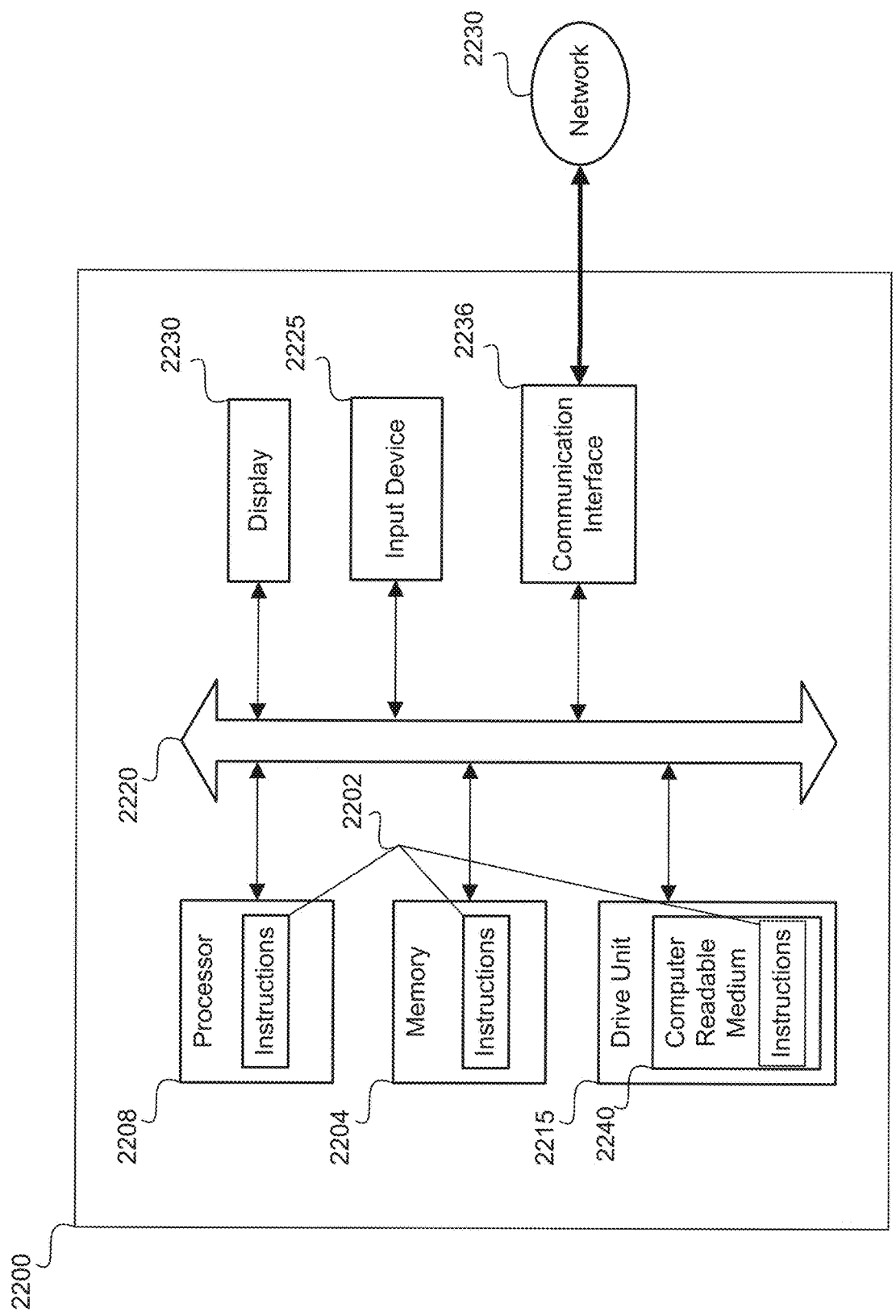
FIG. 22 illustrates a computer system that may represent any of the computing devices referenced herein for execution of the disclosed methods and algorithms, according to an embodiment.

FIG. 22 illustrates a computer system 2200 that may represent any of the computing devices referenced herein for execution of the disclosed methods and algorithms, such as the computing system 101 of FIG. 1, the computing system 201 of FIG. 2, or any other computing devices reference herein, according to an embodiment. The computer system 2200 can include an ordered listing of a set of instructions 2202 that can be executed to cause the computer system 2200 to perform any one or more of the methods or computer-based functions disclosed herein. The computer system 2200 can operate as a stand-alone device or can be connected to other computer systems or peripheral devices, e.g., by using a network 2230.

In a networked deployment, the computer system 2200 can operate in the capacity of a server or as a client-user computer in a server-client user network environment, or as a peer computer system in a peer-to-peer (or distributed) network environment. The computer system 2200 can also be implemented as or incorporated into various devices, such as a personal computer or a mobile computing device capable of executing a set of instructions 2202 that specify actions to be taken by that machine, including and not limited to, accessing the internet or web through any form of browser. Further, each of the systems described can include any collection of sub-systems that individually or jointly execute a set, or multiple sets, of instructions to perform one or more computer functions.

The computer system 2200 can include a memory 2204 on a bus 2220 for communicating information. Code operable to cause the computer system to perform any of the acts or operations described herein can be stored in the memory 2204. The memory 2204 can be a random-access memory, read-only memory, programmable memory, hard disk drive or any other type of volatile or non-volatile memory or storage device.

The computer system 2200 can include a processor 2208 (or other processing device), such as a central processing unit (CPU) and/or a graphics processing unit (GPU). The processor 2208 can include one or more general processors, digital signal processors, application specific integrated circuits, field programmable gate arrays, digital circuits, optical circuits, analog circuits, combinations thereof, or other now known or later-developed devices for analyzing and processing data. The processor 2208 can implement the set of instructions 2202 or other software program, such as manually-programmed or computer-generated code for implementing logical functions. The logical function or any system element described can, among other functions, process and/or convert an analog data source such as an analog electrical, audio, or video signal, or a combination thereof, to a digital data source for audio-visual purposes or other digital processing purposes such as for compatibility for computer processing.

The computer system 2200 can also include a disk or optical drive unit 2215. The disk drive unit 2215 can include a computer-readable medium 2240 in which one or more sets of instructions 2202, e.g., software, can be embedded. Further, the instructions 2202 can perform one or more of the operations as described herein. The instructions 2202 can reside completely, or at least partially, within the memory 2204 and/or within the processor 2208 during execution by the computer system 2200. Accordingly, databases configured to store data generated from execution of the disclosed methods and algorithms can be stored in the memory 2204 and/or the disk unit 2215.

The memory 2204 and the processor 2208 also can include computer-readable media as discussed above. A "computer-readable medium," "computer-readable storage medium," "machine readable medium," "propagated-signal medium," and/or "signal-bearing medium" can include any device that includes, stores, communicates, propagates, or transports software for use by or in connection with an instruction executable system, apparatus, or device. The machine-readable medium can selectively be, but not limited to, an electronic, magnetic, optical, electromagnetic, infrared, or semiconductor system, apparatus, device, or propagation medium.

Additionally, the computer system 2200 can include an input device 2225, such as a keyboard or mouse, configured for a user to interact with any of the components of system 2200. It can further include a display 2230, such as a liquid crystal display (LCD), a cathode ray tube (CRT), or any other display suitable for conveying information. The display 2230 can act as an interface for the user to see the functioning of the processor 2208, or specifically as an interface with the software stored in the memory 2204 or the drive unit 2215.

The computer system 2200 can include a communication interface 2236 that enables communications via the communications network 2230. The network 2230 can include wired networks, wireless networks, or combinations thereof. The communication interface 2236 network can enable communications via any number of communication standards, such as 802.11, 802.22, 802.20, WiMax, cellular telephone standards, or other communication standards.

Accordingly, the method and system can be realized in hardware, software, or a combination of hardware and software. The method and system can be realized in a centralized fashion in at least one computer system or in a distributed fashion where different elements are spread across several interconnected computer systems. Different kinds of computer system or other apparatus adapted for carrying out the methods described herein is suited. A typical combination of hardware and software can be a general-purpose computer system with a computer program that, when being loaded and executed, controls the computer system such that it carries out the methods described herein. Such a programmed computer can be considered a special-purpose computer programmed with a special-purpose program.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The method and system can also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

What is claimed is:

1. A radar test computing system comprising:
   a storage disk to store scenario data for a test scenario;
   a host interface to be coupled to a programmable input/output (I/O) controller, wherein the programmable I/O controller is to interface with propagation path replicator (PPR) circuitry that is to simulate a moving target for a radar system under test; and
   a processing device coupled to the storage disk and the host interface, wherein the processing device is to:
      detect a start signal received from the programmable I/O controller, the start signal received by the programmable I/O controller from the radar system to trigger initiation of the test scenario;
      receive an update request from the programmable I/O controller in response to detection, by the PPR circuitry, of a first radio frequency (RF) pulse on a RF signal received from the radar system;
      retrieve the scenario data associated with distance to and speed of the moving target for a second RF pulse expected to follow the first RF pulse;
      calculate, using retrieved scenario data, values of a frequency shift, a signal delay, and a signal attenuation for the second RF pulse; and
      send, during a time period between the first RF pulse and the second RF pulse, the values of the frequency shift, the signal delay, and the signal attenuation to the programmable I/O controller for use by the PPR circuitry to simulate the moving target for the second RF pulse.

2. The radar test computing system of claim 1, wherein to calculate a value of:
   the frequency shift, the processing device is to determine, based on the retrieved scenario data, the speed of the moving target at a time of the second RF pulse;
   the signal delay, the processing device is to determine, based on the retrieved scenario data, the distance to the moving target at the time of the second RF pulse; and
   the signal attenuation, the processing device is to determine, based on the retrieved scenario data, a position of and the distance to the moving target at the time of the second RF pulse.

3. The radar test computing system of claim 1, further comprising a user interface coupled to the processing device and viewable through a display device, wherein the processing device is further to:
   detect, through the user interface, opening of the test scenario;
   in response to detection of the opening of the test scenario, send a portion of the scenario data to the programmable I/O controller; and
   send a disarm message to the programmable I/O controller.

4. The radar test computing system of claim 3, wherein the processing device is further to:
   detect, through the user interface, a command to arm the test scenario; and arm the test scenario comprising to send an arm message to the programmable I/O controller, wherein once armed, the programmable I/O controller is to monitor for the start signal through an RF start trigger line coupled to the radar system.

5. The radar test computing system of claim 1, wherein to receive the update request further comprises to receive status data from the programmable I/O controller, the status data comprising values for timing data associated with the first RF pulse, further comprising a user interface coupled to the processing device and viewable through a display device, and wherein the processing device is further to:
update a scenario table, within the user interface, with the status data; and
update a scenario plot, within the user interface, with the values of the frequency shift, the signal delay, and the signal attenuation for the second RF pulse.

6. The radar test computing system of claim 5, wherein the storage disk is further to store second scenario data for a second test scenario, wherein the processing device is further to:
detect an end of the test scenario;
write the status data to a log file in the storage disk;
auto-load the second scenario data; and
send a portion of the second scenario data to the programmable I/O controller in preparation to perform the second test scenario.

7. The radar test computing system of claim 5, wherein the processing device is further to:
detect, through the user interface, selection of a stop indicia to stop the test scenario;
write the status data to a log file in the storage disk; and
send a disarm message to the programmable I/O controller.

8. The radar test computing system of claim 5, wherein the status data indicates the second RF pulse did not arrive within a timeout period, and the processing device is further to update the scenario table and the scenario plot with a missing pulse for the second RF pulse.

9. A programmable input/output (I/O) controller coupled to a radar test computing system and comprising a programmable logic device to:
reset status data values related to timing of radio frequency (RF) pulses received on a RF signal from a radar system under test with respect to a moving target, wherein the status data values comprise at least values for a running time, an elapsed time, and pre-pulse counts;
in response to detection of an arm message from the radar test computing system, monitor for one of a start message or a stop message;
in response to receipt of the start message from the radar test computing system, set the running time to a current time and the elapsed time to zero; and
in response to reaching a timeout period before detecting a first qualified pulse on the RF signal from the radar system:
update a value for the elapsed time;
increment a value for the pre-pulse counts;
send values for the elapsed time and pre-pulse counts to the radar test computing system; and
send an update request to the radar test computing system to request values of a frequency shift, a signal delay, and a signal attenuation for the first qualified pulse anticipated within a subsequent timeout period, wherein the frequency shift is to simulate speed of the moving target, the signal delay to simulate a distance from the moving target, and the signal attenuation is to simulate an amount of atmospheric propagation loss.

10. The programmable I/O controller of claim 9, wherein the programmable logic device is further to:
receive a reference voltage in scenario data from the radar test computing system before receipt of the start message; and
provide the reference voltage to a comparator of a pulse detection circuit, which detects the qualified pulse on behalf of the programmable logic device.

11. The programmable I/O controller of claim 9, wherein the programmable logic device is further to, before receipt of the first qualified pulse:
receive values from the radar test computing system for the frequency shift, the signal delay, and the signal attenuation;
update a Doppler simulation circuit, coupled to the programmable logic device, with the frequency shift;
update a signal attenuator, coupled to the programmable logic device, with the signal attenuation; and
update a signal delay sub-system, coupled to the programmable logic device, with the signal delay.

12. The programmable I/O controller of claim 9, wherein the status data values further comprise values for a post pulse time, pulse counts, pulse width total counts, and a pulse repeating interval (PRI) total counts, and wherein the programmable logic device is further to, in response to detection of the first qualified pulse on the RF signal from the radar system:
update the value for the elapsed time;
set a value for the post pulse time to the current time;
increment a value for the pulse counts;
update a value for the pulse width total counts;
update a value for the PRI total counts;
send the status data values to the radar test computing system; and
send an update request to the radar test computing system to request values of a second frequency shift, a second signal delay, and a second signal attenuation for a second qualified pulse anticipated within a second subsequent timeout period.

13. The programmable I/O controller of claim 12, wherein the programmable logic device is further to, before receipt of the second qualified pulse:
receive values from the radar test computing system for the second frequency shift, the second signal delay, and the second signal attenuation;
update a Doppler simulation circuit, coupled to the programmable logic device, with the second frequency shift;
update a signal attenuator, coupled to the programmable logic device, with the second signal attenuation; and
update a signal delay sub-system, coupled to the programmable logic device, with the second signal delay.

14. The programmable I/O controller of claim 12, wherein the status data values further comprise a value for missing pulse counts, and wherein the programmable logic device is further to, in response to reaching a timeout period before receipt of the second qualified pulse:
update the value for the elapsed time;
increment the value for the missing pulse counts;
send the values for the elapsed time and the missing pulse counts to the radar test computing system; and
send an update request to the radar test computing system to request values of a third frequency shift, a third signal delay, and a third signal attenuation for an third qualified pulse anticipated within a third subsequent timeout period.

15. The programmable I/O controller of claim 14, wherein in response to receipt of the third qualified pulse, the programmable logic device is further to synchronize a time for a fourth subsequent timeout period to a trailing edge of the third qualified pulse.

16. The programmable I/O controller of claim 12, wherein the programmable logic device is further to, in response to detection of the second qualified pulse:
update the value for the elapsed time;
increment the value for the pulse counts;
update the value for the pulse width total counts;
update the value for the PRI total counts;
send the status data values to the radar test computing system; and
send an update request to the radar test computing system to request values of a third frequency shift, a third signal delay, and a third signal attenuation for a third qualified pulse anticipated within a third subsequent timeout period.

17. A method comprising:
coupling a host interface, of a radar test computing system, to a programmable input/output (I/O) controller, wherein the programmable I/O controller is to interface with propagation path replicator (PPR) circuitry that is to simulate a moving target for a radar system under test;
receiving, by the radar test computing system from a signal analyzer circuit, a start message indicative of a start pulse detected by the signal analyzer circuit, which is coupled to the radar test computing system and to the PPR circuitry, wherein the start pulse is to trigger initiation of a test scenario;
receiving, by the radar test computing system, an update request from the programmable I/O controller in response to detection, by the PPR circuitry, of a first radio frequency (RF) pulse on a RF signal received from the radar system;
retrieving, by the radar test computing system from a storage disk, scenario data associated with distance to and speed of the moving target for a second RF pulse expected to follow the first RF pulse;
calculating, by a processing device of the radar test computing system, using retrieved scenario data, values of a frequency shift, a signal delay, and a signal attenuation for the second RF pulse; and
sending, by the radar test computing system, during a time period between the first RF pulse and the second RF pulse, the values of the frequency shift, the signal delay, and the signal attenuation to the programmable I/O controller for use by the PPR circuitry to simulate the moving target for the second RF pulse.

18. The method of claim 17, wherein the calculating:
the frequency shift based on the scenario data comprises determining the speed of the moving target at a time of the second RF pulse;
the signal delay based on the scenario data comprises determining the distance to the moving target at a time of the second RF pulse; and
the signal attenuation based on the scenario data comprises determining a position of and the distance to the moving target at a time of the second RF pulse.

19. The method of claim 17, further comprising:
detecting, through a user interface of the radar test computing system, opening of the test scenario;
in response to detection of the opening of the test scenario, sending a portion of the scenario data to the programmable I/O controller and to the signal analyzer circuit; and
sending a disarm message to the programmable I/O controller and the signal analyzer circuit.

20. The method of claim 19, further comprising:
detecting, through the user interface, a command to arm the test scenario; and
arming the test scenario comprising sending an arm message to the programmable I/O controller and to the signal analyzer circuit, wherein once armed, the signal analyzer circuit is to monitor for the start pulse received from the PPR circuitry.

21. The method of claim 17, further comprising:
detecting, through a user interface, a selection to execute an analyzer application associated with the signal analyzer circuit;
receive, through the user interface, selection of a set of analyzer modes; and
executing, by the processing device, the analyzer application to cause the signal analyzer circuit to perform functions, based on the set of analyzer modes and associated with a swept tuned spectrum analyzer, on the RF signal received from the PPR circuitry.

22. The method of claim 17, wherein receiving the update request further comprises receiving status data from the programmable I/O controller, the status data comprising values for timing data associated with the first RF pulse, further comprising:
updating a scenario table with the status data;
updating a scenario plot with the values of the frequency shift, the signal delay, and the signal attenuation for the second RF pulse; and
displaying the scenario table and the scenario plot within a user interface of a display device of the radar test computing system.

23. The method of claim 22, further comprising:
detecting an end of the test scenario;
writing the status data to a log file in the storage disk;
auto-loading second scenario data from the storage disk for a second test scenario; and
sending a portion of the second scenario data to the programmable I/O controller and the signal analyzer circuit in preparation to perform the second test scenario.

24. The method of claim 22, further comprising:
detecting, through the user interface, selection of a stop indicia to stop the test scenario;
writing the status data to a log file in the storage disk; and
sending a disarm message to the programmable I/O controller and the signal analyzer circuit.

25. The method of claim 22, wherein the status data indicates the second RF pulse did not arrive within a timeout period, the method further comprising updating the scenario table and the scenario plot with a missing pulse for the second RF pulse.

* * * * *